(12) United States Patent
Pradhan

(10) Patent No.: US 12,153,321 B2
(45) Date of Patent: *Nov. 26, 2024

(54) CONTROLLING TRANSITIONS IN OPTICALLY SWITCHABLE DEVICES

(71) Applicant: View, Inc., Milpitas, CA (US)

(72) Inventor: Anshu A. Pradhan, Collierville, TN (US)

(73) Assignee: View, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,917

(22) Filed: Apr. 21, 2023

(65) Prior Publication Data

US 2023/0251542 A1 Aug. 10, 2023

Related U.S. Application Data

(60) Division of application No. 17/163,202, filed on Jan. 29, 2021, now Pat. No. 11,668,991, which is a (Continued)

(51) Int. Cl.
*G02F 1/163* (2006.01)
*E06B 9/24* (2006.01)
(Continued)

(52) U.S. Cl.
CPC ............ *G02F 1/163* (2013.01); *E06B 9/24* (2013.01); *G09G 3/19* (2013.01); *E06B 3/6722* (2013.01); *E06B 2009/2464* (2013.01); *G02F 1/0018* (2013.01); *G02F 1/0121* (2013.01); *G09G 2310/066* (2013.01); *G09G 2320/0686* (2013.01); *G09G 2360/145* (2013.01)

(58) Field of Classification Search
CPC ................. G02B 1/163; E06B 2009/2464
USPC ........................................... 359/275
See application file for complete search history.

(56) References Cited

U.S. PATENT DOCUMENTS 4,217,579 A 8/1980 Hamada et al.
5,124,832 A 6/1992 Greenberg et al.
(Continued)

FOREIGN PATENT DOCUMENTS

AU 2003232073 A1 11/2003
CN 1402067 A 3/2003
(Continued)

OTHER PUBLICATIONS

"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
(Continued)

*Primary Examiner* — Zachary W Wilkes
(74) *Attorney, Agent, or Firm* — Weaver Austin Villeneuve & Sampson LLP; Brian D. Griedel

(57) ABSTRACT

The embodiments herein relate to methods for controlling an optical transition in an optically switchable device, and optically switchable devices configured to perform such methods. In various embodiments, non-optical (e.g., electrical) feedback is used to help control an optical transition. The feedback may be used for a number of different purposes. In many implementations, the feedback is used to control an ongoing optical transition.

12 Claims, 28 Drawing Sheets

Related U.S. Application Data continuation of application No. 15/685,624, filed on Aug. 24, 2017, now Pat. No. 10,948,797, which is a division of application No. 14/489,414, filed on Sep. 17, 2014, now Pat. No. 9,778,532, which is a continuation-in-part of application No. 13/309,990, filed on Dec. 2, 2011, now Pat. No. 8,864,321, which is a continuation of application No. 13/049,623, filed on Mar. 16, 2011, now Pat. No. 8,254,013, said application No. 14/489,414 is a continuation-in-part of application No. PCT/US2014/043514, filed on Jun. 20, 2014, which is a continuation-in-part of application No. 13/931,459, filed on Jun. 28, 2013, now Pat. No. 9,412,290.

(51) Int. Cl.
  *G09G 3/19* (2006.01)
  *E06B 3/67* (2006.01)
  *G02F 1/00* (2006.01)
  *G02F 1/01* (2006.01)

(56) References Cited

U.S. PATENT DOCUMENTS

| | | |
|---|---|---|
| 5,124,833 A | 6/1992 | Barton et al. |
| 5,170,108 A | 12/1992 | Peterson et al. |
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,598,000 A | 1/1997 | Popat |
| 5,621,526 A | 4/1997 | Kuze |
| 5,673,028 A | 9/1997 | Levy |
| 5,694,144 A | 12/1997 | Lefrou et al. |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,039,850 A | 3/2000 | Schulz |
| 6,055,089 A | 4/2000 | Schulz et al. |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,317,248 B1 | 11/2001 | Agrawal et al. |
| 6,362,806 B1 | 3/2002 | Reichmann et al. |
| 6,386,713 B1 | 5/2002 | Turnbull et al. |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,707,590 B1 | 3/2004 | Bartsch |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,965,813 B2 | 11/2005 | Granqvist et al. |
| 7,085,609 B2 | 8/2006 | Bechtel et al. |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 * | 9/2011 | Gustavsson ............ G02F 1/163 359/296 |
| 8,080,987 B1 | 12/2011 | Qiu et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,292,228 B2 | 10/2012 | Mitchell et al. |
| 8,456,729 B2 | 6/2013 | Brown et al. |
| 8,547,624 B2 | 10/2013 | Ash et al. |
| 8,705,162 B2 | 4/2014 | Brown et al. |
| 8,723,467 B2 | 5/2014 | Berman et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,081,247 B1 | 7/2015 | Pradhan et al. |
| 9,335,602 B2 | 5/2016 | Chung et al. |
| 9,412,290 B2 | 8/2016 | Jack et al. |
| 9,454,056 B2 | 9/2016 | Pradhan et al. |
| 9,477,131 B2 | 10/2016 | Pradhan et al. |
| 9,482,922 B2 | 11/2016 | Brown et al. |
| 9,638,978 B2 | 5/2017 | Brown et al. |
| 9,778,532 B2 | 10/2017 | Pradhan |
| 9,885,935 B2 | 2/2018 | Jack et al. |
| 9,921,450 B2 | 3/2018 | Pradhan et al. |
| 10,120,258 B2 | 11/2018 | Jack et al. |
| 10,401,702 B2 | 9/2019 | Jack et al. |
| 10,451,950 B2 | 10/2019 | Jack et al. |
| 10,503,039 B2 | 12/2019 | Jack et al. |
| 10,514,582 B2 | 12/2019 | Jack et al. |
| 10,520,785 B2 | 12/2019 | Pradhan et al. |
| 10,895,796 B2 | 1/2021 | Pradhan et al. |
| 10,935,865 B2 | 3/2021 | Pradhan et al. |
| 10,948,797 B2 | 3/2021 | Pradhan |
| 10,969,646 B2 | 4/2021 | Jack et al. |
| 11,030,929 B2 | 6/2021 | Pradhan et al. |
| 11,112,674 B2 | 9/2021 | Jack et al. |
| 11,397,360 B2 | 7/2022 | Greer et al. |
| 11,482,147 B2 | 10/2022 | Pradhan et al. |
| 11,579,509 B2 | 2/2023 | Jack et al. |
| 11,592,724 B2 | 2/2023 | Pradhan et al. |
| 11,630,367 B2 | 4/2023 | Pradhan et al. |
| 11,640,096 B2 | 5/2023 | Brown et al. |
| 11,668,991 B2 | 6/2023 | Pradhan |
| 11,829,045 B2 | 11/2023 | Jack et al. |
| 11,835,834 B2 | 12/2023 | Jack et al. |
| 11,927,867 B2 | 3/2024 | Pradhan et al. |
| 12,061,404 B2 | 8/2024 | Jack et al. |
| 12,073,752 B2 | 8/2024 | Pradhan et al. |
| 2002/0030891 A1 | 3/2002 | Schierbeek |
| 2002/0075472 A1 | 6/2002 | Holton |
| 2002/0152298 A1 | 10/2002 | Kikta et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |

(56) References Cited

U.S. PATENT DOCUMENTS

| | | |
|---|---|---|
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0209007 A1 | 9/2006 | Pyo et al. |
| 2006/0245024 A1 | 11/2006 | Greer |
| 2007/0002007 A1 | 1/2007 | Tam |
| 2007/0067048 A1 | 3/2007 | Bechtel et al. |
| 2007/0162233 A1 | 7/2007 | Schwenke |
| 2007/0206263 A1 | 9/2007 | Neuman et al. |
| 2007/0285759 A1 | 12/2007 | Ash et al. |
| 2008/0018979 A1 | 1/2008 | Mahe et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0243732 A1 | 10/2009 | Tarng et al. |
| 2009/0243802 A1 | 10/2009 | Wolf et al. |
| 2009/0296188 A1 | 12/2009 | Jain et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0085624 A1 | 4/2010 | Lee et al. |
| 2010/0172009 A1 | 7/2010 | Matthews |
| 2010/0172010 A1* | 7/2010 | Gustavsson ............ G02F 1/163 359/265 |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0261293 A1 | 10/2011 | Kimura |
| 2011/0266419 A1 | 11/2011 | Jones et al. |
| 2011/0285930 A1 | 11/2011 | Kimura et al. |
| 2011/0286071 A1 | 11/2011 | Huang et al. |
| 2011/0292488 A1 | 12/2011 | McCarthy et al. |
| 2011/0304898 A1 | 12/2011 | Letocart |
| 2012/0026573 A1 | 2/2012 | Collins et al. |
| 2012/0062975 A1 | 3/2012 | Mehtani et al. |
| 2012/0062976 A1 | 3/2012 | Burdis |
| 2012/0133315 A1 | 5/2012 | Berman et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0268803 A1 | 10/2012 | Greer et al. |
| 2012/0293855 A1 | 11/2012 | Shrivastava et al. |
| 2013/0003157 A1 | 1/2013 | Wang et al. |
| 2013/0057937 A1 | 3/2013 | Berman et al. |
| 2013/0157493 A1 | 6/2013 | Brown |
| 2013/0158790 A1 | 6/2013 | McIntyre, Jr. et al. |
| 2013/0194250 A1 | 8/2013 | Amundson et al. |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278988 A1 | 10/2013 | Jack et al. |
| 2014/0016053 A1 | 1/2014 | Kimura |
| 2014/0067733 A1 | 3/2014 | Humann |
| 2014/0148996 A1 | 5/2014 | Watkins |
| 2014/0160550 A1 | 6/2014 | Brown et al. |
| 2014/0236323 A1 | 8/2014 | Brown et al. |
| 2014/0259931 A1 | 9/2014 | Plummer |
| 2014/0268287 A1 | 9/2014 | Brown et al. |
| 2014/0300945 A1 | 10/2014 | Parker |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0062975 A1 | 3/2015 | Shet |
| 2015/0070745 A1 | 3/2015 | Pradhan |
| 2015/0116808 A1 | 4/2015 | Branda et al. |
| 2015/0116811 A1 | 4/2015 | Shrivastava et al. |
| 2015/0122474 A1 | 5/2015 | Petersen |
| 2015/0185581 A1 | 7/2015 | Pradhan et al. |
| 2015/0214374 A1 | 7/2015 | Hara et al. |
| 2015/0293422 A1 | 10/2015 | Pradhan et al. |
| 2015/0346574 A1 | 12/2015 | Collins et al. |
| 2015/0346576 A1 | 12/2015 | Pradhan et al. |
| 2015/0355520 A1 | 12/2015 | Chung et al. |
| 2016/0062206 A1 | 3/2016 | Paolini, Jr. et al. |
| 2016/0139477 A1 | 5/2016 | Jack et al. |
| 2016/0202590 A1 | 7/2016 | Ziebarth et al. |
| 2016/0342061 A1 | 11/2016 | Pradhan et al. |
| 2016/0377949 A1 | 12/2016 | Jack et al. |
| 2017/0097553 A1 | 4/2017 | Jack et al. |
| 2017/0131610 A1 | 5/2017 | Brown et al. |
| 2017/0131611 A1 | 5/2017 | Brown et al. |
| 2017/0146884 A1 | 5/2017 | Vigano et al. |
| 2017/0371223 A1 | 12/2017 | Pradhan |
| 2018/0039149 A1 | 2/2018 | Jack et al. |
| 2018/0067372 A1 | 3/2018 | Jack et al. |
| 2018/0143501 A1 | 5/2018 | Nagel et al. |
| 2018/0143502 A1 | 5/2018 | Pradhan et al. |
| 2018/0341163 A1 | 11/2018 | Jack et al. |
| 2019/0025662 A1 | 1/2019 | Jack et al. |
| 2019/0221148 A1 | 7/2019 | Pradhan et al. |
| 2019/0317458 A1 | 10/2019 | Shrivastava et al. |
| 2019/0324342 A1 | 10/2019 | Jack et al. |
| 2020/0061975 A1 | 2/2020 | Pradhan et al. |
| 2020/0073193 A1 | 3/2020 | Pradhan et al. |
| 2020/0089074 A1 | 3/2020 | Pradhan et al. |
| 2021/0080793 A1 | 3/2021 | Pradhan et al. |
| 2021/0116770 A1 | 4/2021 | Pradhan et al. |
| 2021/0181593 A1 | 6/2021 | Pradhan |
| 2021/0208468 A1 | 7/2021 | Jack et al. |
| 2021/0210026 A1 | 7/2021 | Telfer et al. |
| 2021/0294174 A1 | 9/2021 | Brown et al. |
| 2021/0356833 A1 | 11/2021 | Jack et al. |
| 2022/0066250 A1 | 3/2022 | Schleder et al. |
| 2022/0334445 A1 | 10/2022 | Jack et al. |
| 2022/0357626 A1 | 11/2022 | Brown et al. |
| 2023/0019843 A1 | 1/2023 | Pradhan et al. |
| 2023/0108776 A1 | 4/2023 | Jack et al. |
| 2023/0114995 A1 | 4/2023 | Pradhan et al. |
| 2023/0152655 A1 | 5/2023 | Pradhan et al. |
| 2023/0161213 A1 | 5/2023 | Jack et al. |
| 2024/0118578 A1 | 4/2024 | Jack et al. |
| 2024/0142844 A1 | 5/2024 | Pradhan et al. |
| 2024/0248365 A1 | 7/2024 | Pradhan et al. |

FOREIGN PATENT DOCUMENTS

| | | |
|---|---|---|
| CN | 2590732 Y | 12/2003 |
| CN | 1672189 A | 9/2005 |
| CN | 1675585 A | 9/2005 |
| CN | 1813280 A | 8/2006 |
| CN | 1871546 A | 11/2006 |
| CN | 1892803 A | 1/2007 |
| CN | 1997935 A | 7/2007 |
| CN | 101097343 A | 1/2008 |
| CN | 101120393 A | 2/2008 |
| CN | 101512423 A | 8/2009 |
| CN | 101649196 A | 2/2010 |
| CN | 101673018 A | 3/2010 |
| CN | 101707892 A | 5/2010 |
| CN | 101882423 A | 11/2010 |
| CN | 101969207 A | 2/2011 |
| CN | 102033380 A | 4/2011 |
| CN | 102203370 A | 9/2011 |
| CN | 102440069 A | 5/2012 |
| CN | 202563220 U | 11/2012 |

(56) References Cited

FOREIGN PATENT DOCUMENTS

| | | |
|---|---|---|
| CN | 103492940 A | 1/2014 |
| CN | 103676391 A | 3/2014 |
| CN | 104198829 A | 12/2014 |
| CN | 104321497 A | 1/2015 |
| CN | 104504292 A | 4/2015 |
| CN | 104603686 A | 5/2015 |
| CN | 104698663 A | 6/2015 |
| CN | 104806128 A | 7/2015 |
| CN | 105431772 A | 3/2016 |
| CN | 109143714 A | 1/2019 |
| DE | 10124673 A1 | 11/2002 |
| DE | 10343445 A1 | 4/2005 |
| DE | 10017834 A1 | 9/2014 |
| EP | 0445314 A1 | 9/1991 |
| EP | 0445720 A2 | 9/1991 |
| EP | 0869032 A2 | 10/1998 |
| EP | 0920210 A1 | 6/1999 |
| EP | 1055961 A2 | 11/2000 |
| EP | 0835475 B1 | 9/2004 |
| EP | 1510854 A1 | 3/2005 |
| EP | 1417535 B1 | 11/2005 |
| EP | 1619546 A2 | 1/2006 |
| EP | 1626306 A2 | 2/2006 |
| EP | 2161615 A1 | 3/2010 |
| EP | 2357544 A2 | 8/2011 |
| EP | 2755197 A2 | 7/2014 |
| EP | 2764998 A1 | 8/2014 |
| JP | S6081044 A | 5/1985 |
| JP | S6311914 A | 1/1988 |
| JP | S63208830 A | 8/1988 |
| JP | H02132420 A | 5/1990 |
| JP | H0356943 A | 3/1991 |
| JP | H05178645 A | 7/1993 |
| JP | H1063216 A | 3/1998 |
| JP | 2004245985 A | 9/2004 |
| JP | 2007101947 A | 4/2007 |
| JP | 2010060893 A | 3/2010 |
| JP | 2010529488 A | 8/2010 |
| JP | 4694816 B2 | 6/2011 |
| JP | 4799113 B2 | 10/2011 |
| JP | 2013057975 A | 3/2013 |
| JP | 2015530613 A | 10/2015 |
| JP | 2016038583 A | 3/2016 |
| KR | 20050092607 A | 9/2005 |
| KR | 200412640 Y1 | 3/2006 |
| KR | 100752041 B1 | 8/2007 |
| KR | 20080022319 A | 3/2008 |
| KR | 20090026181 A | 3/2009 |
| KR | 100904847 B1 | 6/2009 |
| KR | 100931183 B1 | 12/2009 |
| KR | 20100020417 A | 2/2010 |
| KR | 20100034361 A | 4/2010 |
| KR | 20110003698 A | 1/2011 |
| KR | 20110094672 A | 8/2011 |
| KR | 20120100665 A | 9/2012 |
| TW | 434408 B | 5/2001 |
| TW | 460565 B | 10/2001 |
| TW | 200532346 A | 10/2005 |
| TW | 200736782 A | 10/2007 |
| TW | 200920221 A | 5/2009 |
| TW | 200920987 A | 5/2009 |
| TW | 1336228 B | 1/2011 |
| TW | 201235757 A | 9/2012 |
| TW | 201248286 A | 12/2012 |
| TW | 201248486 A | 12/2012 |
| TW | 201319704 A | 5/2013 |
| TW | 201510605 A | 3/2015 |
| WO | WO-9816870 A1 | 4/1998 |
| WO | WO-0213052 A2 | 2/2002 |
| WO | WO-2004003649 A1 | 1/2004 |
| WO | WO-2005098811 A1 | 10/2005 |
| WO | WO-2005103807 A2 | 11/2005 |
| WO | WO-2007016546 A2 | 2/2007 |
| WO | WO-2007146862 A2 | 12/2007 |
| WO | WO-2008030018 A1 | 3/2008 |
| WO | WO-2008147322 A1 | 12/2008 |
| WO | WO-2009124647 A1 | 10/2009 |
| WO | WO-2010120771 A1 | 10/2010 |
| WO | WO-2011020478 A1 | 2/2011 |
| WO | WO-2011087684 A1 | 7/2011 |
| WO | WO-2011087687 A1 | 7/2011 |
| WO | WO-2011124720 A2 | 10/2011 |
| WO | WO-2011127015 A1 | 10/2011 |
| WO | WO-2012079159 A1 | 6/2012 |
| WO | WO-2012080618 A1 | 6/2012 |
| WO | WO-2012080656 A1 | 6/2012 |
| WO | WO-2012080657 A1 | 6/2012 |
| WO | WO-2012125325 A2 | 9/2012 |
| WO | WO-2012145155 A1 | 10/2012 |
| WO | WO-2013059674 A1 | 4/2013 |
| WO | WO-2013109881 A2 | 7/2013 |
| WO | WO-2013155467 A1 | 10/2013 |
| WO | WO-2013158365 A1 | 10/2013 |
| WO | WO-2014121863 A1 | 8/2014 |
| WO | WO-2014130471 A1 | 8/2014 |
| WO | WO-2014134451 A2 | 9/2014 |
| WO | WO-2014209812 A1 | 12/2014 |
| WO | WO-2015077097 A1 | 5/2015 |
| WO | WO-2015134789 A1 | 9/2015 |
| WO | WO-2017123138 A1 | 7/2017 |
| WO | WO-2017189307 A2 | 11/2017 |
| WO | WO-2017189307 A8 | 3/2018 |
| WO | WO-2018128906 A1 | 7/2018 |

OTHER PUBLICATIONS

APC by Schneider Electric, Smart-UPS 120V Product Brochure, 2013, 8 pp.
CA Office Action dated Dec. 2, 2022 in Application No. CA3001233.
CA Office Action dated Dec. 22, 2021, in Application No. CA2916862.
CA Office Action dated Jan. 20, 2022, in Application No. CA2880920.
CA Office Action dated May 24, 2023, in application No. CA3022490.
Canadian Office Action dated Jun. 9, 2020 issued in CA Application No. 2,880,920.
Canadian Office Action dated May 23, 2019 in CA Application No. 2,880,920.
Chinese Notice of Allowance (w/Search Report) dated Jan. 8, 2019 in CN Application No. 201480042689.2.
Chinese Office Action dated Aug. 27, 2020 in Chinese Application No. 201580055381.6.
Chinese Office Action dated Aug. 5, 2015 in Chinese Application No. 201280020475.6.
Chinese Office Action dated Dec. 14, 2020 in CN Application No. 201680063171.6.
Chinese Office Action dated Feb. 2, 2021 in Chinese Application No. 201580055381.6.
Chinese Office Action dated Jun. 1, 2018 in CN Application No. 201480042689.2.
Chinese Office Action dated Jun. 22, 2016 in CN Application No. 201380046356.2.
Chinese Office Action dated Mar. 20, 2020 in Chinese Application No. 201580055381.6.
Chinese Office Action dated Mar. 26, 2015 in CN Application No. 201280060910.8.
Chinese Office Action dated Mar. 4, 2020 in CN Application No. 201611216264.6.
Chinese Office Action dated May 13, 2021 in Chinese Application No. 201680063171.6.
Chinese Office Action dated May 18, 2021 in Chinese Application No. 201780033674.3.
Chinese Office Action dated May 19, 2016 in Chinese Application No. 201280020475.6.
Chinese Office Action dated Nov. 11, 2015 in Chinese Application No. 201380046356.2.
Chinese Office Action dated Nov. 18, 2020 in Chinese Application No. 201580055381.6.
Chinese Office Action dated Oct. 9, 2020 in Chinese Application No. 201780033674.3.

(56) References Cited

OTHER PUBLICATIONS

CN Office Action dated Jan. 10, 2022, in Application No. CN201780033674.3 with English Translation.
CN Office Action dated Oct. 25, 2021, in application No. CN201910216428.2 with English translation.
CN Office Action dated Sep. 15, 2021, in Application No. CN20178033674 with English translation.
Communication re Third-Party Observation dated Dec. 4, 2014 and Third-Party Observation dated Dec. 3, 2014 in PCT/US2014/016974.
Duchon, Claude E. et al., "Estimating Cloud Type from Pyranometer Observations," Journal of Applied Meteorology, vol. 38, Jan. 1999, pp. 132-141.
EP Office Action dated May 25, 2022, in Application No. EP20120756917.6.
EP Office Action dated Oct. 12, 2021, in Application No. EP17790130.3.
European Extended Search Report dated Jan. 26, 2017 in European Application No. 14818692.7.
European Extended Search Report dated Oct. 19, 2018 in European Application No. 18186119.6.
European Office Action dated Aug. 5, 2020 in EP Application No. 12756917.6.
European Office Action dated Feb. 21, 2023 for EP Application No. EP21165344.9.
European Office Action dated Jul. 12, 2017 in European Application No. 12756917.6.
European Office Action dated Jun. 26, 2019 in EP Application No. 15842292.3.
European Office Action dated Mar. 30, 2023 in Application No. EP21191793.5.
European Office Action dated Nov. 27, 2018 in EP Application No. 12756917.6.
European Office Action dated Nov. 27, 2020 in EP Application No. 17790130.3.
European Office Action dated Sep. 13, 2019 in EP Application No. 13828274.4.
European Office Action dated Sep. 30, 2019 in EP Application No. 18186119.6.
European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 13, 2018 in EP Application No. 15842292.3.
European Search Report dated Mar. 30, 2016 in EP Application No. 13828274.4.
European Search Report dated Mar. 5, 2015 in European Application No. 12841714.4.
European Search Report (extended) dated Apr. 2, 2019 in European Application No. 16854332.0.
European Search Report (extended) dated Jun. 14, 2018 in European Application No. 15842292.3.
European Search Report (extended) dated Sep. 5, 2019 in EP Application No. 17790130.3.
European Summons to Oral Proceedings dated Jun. 12, 2020 in EP Application No. 15842292.3.
European Summons to Oral Proceedings dated May 11, 2020 in EP Application No. 18186119.6.
European Supplemental Search Report dated Jun. 16, 2021 in European Application No. 21165344.9.
Extended European Search Report dated Dec. 6, 2021, in application No. 21191793.5.
Extended European Search Report dated May 27, 2021 in EP Application No. 21155613.9.
Extended European Search Report dated Oct. 19, 2021, in application No. EP21187538.0.
Final Office Action dated Jun. 5, 2015 in U.S. Appl. No. 13/968,258.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
"Halio Rooftop Sensor Kit (Model SR500)," Product Data Sheet, Kinestral Technologies, 2020, 4 pp.
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
"How Cleantech wants to make a 2012 comeback" http://mountainview.patch.com/articles/how-cleantech-wants-to-make-a-2012-comeback, Jan. 23, 2012.
IN Examination Report dated Sep. 15, 2021, in Application No. IN202028000731.
IN First Examination Report dated Sep. 15, 2021, in Application No. IN202048034247.
IN Office Action dated Mar. 2, 2022 in Application No. IN202138033318.
Indian Examination Report dated Dec. 17, 2018 in IN Application No. 242/MUMNP/2015.
Indian Office Action dated Dec. 22, 2020 in IN Appliclation No. 201837009842.
Indian Office Action dated Feb. 12, 2020 in IN Application No. 201647000484.
International Preliminary Report on Patentability dated Apr. 19, 2018, issued in PCT/US2016/055781.
International Preliminary Report on Patentability dated Feb. 19, 2015 issued in PCT/US2013/053625.
International Preliminary Report on Patentability dated Jan. 7, 2016 issued in PCT/US2014/043514.
International Preliminary Report on Patentability dated Mar. 30, 2017, issued in PCT/US2015/050047.
International Preliminary Report on Patentability dated May 1, 2014 in PCT/US2012/061137.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Oct. 30, 2014 issued in PCT/US2013/036235.
International Preliminary Report on Patentability dated Oct. 30, 2018 in PCT/US17/28443.
International Preliminary Report on Patentability dated Sep. 26, 2013, issued in PCT/US2012/027742.
International Preliminary Report on Patentability dated Sep. 26, 2013, issued in PCT/US2012/027828.
International Preliminary Report on Patentability dated Sep. 26, 2013, issued in PCT/US2012/027909.
International Search Report and Written Opinion dated Dec. 26, 2013, issued in PCT/US2013/053625.
International Search Report and Written Opinion dated Feb. 19, 2016, issued in PCT/US2015/050047.
International Search Report and Written Opinion dated Jan. 19, 2017, issued in PCT/US2016/055781.
International Search Report and Written Opinion dated Jul. 11, 2013, issued in PCT/US2013/034998.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Jun. 19, 2017 in PCT/US17/28443.
International Search Report and Written Opinion dated Mar. 28, 2013 in PCT/US2012/061137.
International Search Report and Written Opinion dated May 26, 2014 in PCT/US2014/016974.
International Search Report and Written Opinion dated Nov. 15, 2022 in PCT Application No. PCT/US2022/074221.
International Search Report and Written Opinion dated Oct. 16, 2014, issued in PCT/US2014/043514.
International Search Report and Written Opinion dated Sep. 24, 2012, issued in PCT/US2012/027742.

(56) References Cited

OTHER PUBLICATIONS

International Search Report and Written Opinion dated Sep. 24, 2012, issued in PCT/US2012/027909.
International Search Report and Written Opinion dated Sep. 26, 2012, issued in PCT/US2012/027828.
Japanese Office Action dated Apr. 25, 2017 for JP Application No. 2015-526607.
Japanese Office Action dated Aug. 6, 2019 for JP Application No. 2017-243890.
Japanese Office Action dated Jan. 22, 2019 for JP Application No. 2017-243890.
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Korean Office Action dated Dec. 4, 2019 for KR Application No. 10-2015-7005247.
Korean Office Action dated Jun. 22, 2020 for KR Application No. 10-2020-7014838.
Korean Office Action dated May 31, 2019 for KR Application No. 10-2015-7005247.
KR Office action dated Aug. 22, 2022 in KR Application No. KR10-2022-7027594 with English translation.
KR Office Action dated Aug. 23, 2021 in Application No. KR-10-2021-7013335 with English Translation.
Letter dated Dec. 1, 2014 re Prior Art re U.S. Appl. No. 13/772,969 from Ryan D. Ricks representing MechoShade Systems, Inc.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
National Aeronautics & Space Administration, "Cloud Radar System (CRS)," (known as of Sep. 3, 2014), published date of Jun. 16, 2014, [http://har.gsfc.nasa.gov/index.php?section=12].
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
Notice of Allowance dated Aug. 6, 2021 in U.S. Appl. No. 16/132,226.
Notice of Third-Party Observations dated Mar. 26, 2021 in EP Application No. 12756917.6.
Office Action dated Oct. 6, 2014 in U.S. Appl. No. 13/968,258.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment filed Dec. 8, 2016 for U.S. Appl. No. 15/195,880.
Preliminary Amendment filed May 24, 2016 for U.S. Appl. No. 14/900,037.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
Russian Decision to Grant with Search Report dated Apr. 11, 2018 in Russian Application No. 2016102399.
Russian Office Action dated Aug. 22, 2017 in RU Application No. 2015107563.
Science and Technology Facilities Council. "Cloud Radar: Predicting The Weather More Accurately." ScienceDaily, Oct. 1, 2008. [www.sciencedaily.com/releases/2008/09/080924085200.htm].
Taiwanese Office Action dated Feb. 4, 2021 in TW Appliclation No. 105132659.
Taiwanese Office Action dated Jan. 11, 2016 TW Application No. 101108947.
Taiwanese Office Action dated Jul. 3, 2019 in TW Application No. 107101943.
Taiwanese Office Action dated Sep. 11, 2017 in TW Application No. 103122419.
Taiwanese Office Action dated Sep. 14, 2016 TW Application No. 105119037.
Third-Party Submission dated Feb. 2, 2015 and Feb. 18, 2015 PTO Notice re Third-Party Submission for U.S. Appl. No. 13/772,969.
TW Office action dated Nov. 4, 2021, in TW Application No. TW20110000762 with English translation.
U.S. Corrected Notice of Allowance dated Sep. 23, 2022 in U.S. Appl. No. 16/097,197.
U.S. Notice of Allowance dated Jul. 12, 2022 in U.S. Appl. No. 16/097,197.
U.S. Corrected Notice of Allowance dated Feb. 2, 2023 in U.S. Appl. No. 17/247,088.
U.S. Corrected Notice of Allowance dated Feb. 6, 2023 in U.S. Appl. No. 17/247,825.
U.S. Final Office Action dated Apr. 30, 2012 in U.S. Appl. No. 13/049,750.
U.S. Final Office Action dated Aug. 19, 2013 in U.S. Appl. No. 13/049,756.
U.S. Final Office Action dated Feb. 11, 2021 in U.S. Appl. No. 16/132,226.
U.S. Final Office Action dated Feb. 26, 2015 in U.S. Appl. No. 13/479,137.
U.S. Final Office Action dated Jan. 14, 2020 in U.S. Appl. No. 15/685,624.
U.S. Final Office Action dated Jan. 27, 2014 in U.S. Appl. No. 13/479,137.
U.S. Final Office Action dated Jul. 2, 2015 in U.S. Appl. No. 13/049,756.
U.S. Final Office Action dated May 15, 2014 in U.S. Appl. No. 13/449,251.
U.S. Final Office Action dated May 16, 2014 in U.S. Appl. No. 13/449,248.
U.S. Non Final Office Action dated Feb. 7, 2022 in U.S. Appl. No. 16/097,197.
U.S. Non-Final office Action dated Apr. 7, 2023 in U.S. Appl. No. 18/047,839.
U.S. Non-Final Office Action dated Jun. 14, 2023, in U.S. Appl. No. 18/152,573.
U.S. Non-Final office Action dated Nov. 23, 2022 in U.S. Appl. No. 17/163,202.
U.S. Notice of Allowance (corrected) dated Jul. 12, 2016 in U.S. Appl. No. 13/931,459.
U.S. Notice of Allowance dated Apr. 1, 2019 in U.S. Appl. No. 15/786,488.
U.S. Notice of Allowance dated Apr. 13, 2015 in U.S. Appl. No. 14/657,380.
U.S. Notice of Allowance dated Apr. 17, 2019 in U.S. Appl. No. 15/875,529.
U.S. Notice of Allowance dated Aug. 7, 2019 in U.S. Appl. No. 15/875,529.
U.S. Notice of Allowance dated Dec. 28, 2022 in U.S. Appl. No. 17/339,776.
U.S. Notice of Allowance dated Feb. 15, 2023 in U.S. Appl. No. 17/163,202.
U.S. Notice of Allowance dated Feb. 28, 2023 in U.S. Appl. No. 17/163,202.
U.S. Notice of Allowance dated Jan. 10, 2014 in U.S. Appl. No. 13/449,235.
U.S. Notice of Allowance dated Jan. 19, 2023 in U.S. Appl. No. 17/249,265.
U.S. Notice of Allowance dated Jan. 22, 2015 in U.S. Appl. No. 13/682,618.
U.S. Notice of Allowance dated Jan. 8, 2021 in U.S. Appl. No. 16/459,142.
U.S. Notice of Allowance dated Jul. 19, 2016 in U.S. Appl. No. 14/822,781.
U.S. Notice of Allowance dated Jul. 20, 2012 in U.S. Appl. No. 13/049,623.

(56) References Cited

OTHER PUBLICATIONS

U.S. Notice of Allowance dated Jul. 21, 2016 in U.S. Appl. No. 14/735,043.
U.S. Notice of Allowance dated Jul. 24, 2019 in U.S. Appl. No. 15/286,193.
U.S. Notice of Allowance dated Jul. 28, 2017 in U.S. Appl. No. 14/900,037.
U.S. Notice of Allowance dated Jul. 30, 2019 in U.S. Appl. No. 15/705,170.
U.S. Notice of Allowance dated Jun. 17, 2014 in U.S. Appl. No. 13/309,990.
U.S. Notice of Allowance dated Jun. 22, 2016 in U.S. Appl. No. 14/822,781.
U.S. Notice of Allowance dated Jun. 27, 2016 in U.S. Appl. No. 14/735,043.
U.S. Notice of Allowance dated Jun. 7, 2017 in U.S. Appl. No. 14/489,414.
U.S. Notice of Allowance dated Jun. 8, 2016 in U.S. Appl. No. 13/931,459.
U.S. Notice of Allowance dated Mar. 3, 2023 in U.S. Appl. No. 17/339,776.
U.S. Notice of Allowance dated Mar. 15, 2023 in U.S. Appl. No. 17/339,776.
U.S. Notice of Allowance dated May 14, 2015 in U.S. Appl. No. 13/479,137.
U.S. Notice of Allowance dated May 18, 2018 in U.S. Appl. No. 15/195,880.
U.S. Notice of Allowance dated May 7, 2021 in U.S. Appl. No. 16/132,226.
U.S. Notice of Allowance dated May 8, 2012 in U.S. Appl. No. 13/049,750.
U.S. Notice of Allowance dated Nov. 1, 2022 in U.S. Appl. No. 17/247,825.
U.S. Notice of Allowance dated Nov. 1, 2022 in U.S. Appl. No. 17/249,265.
U.S. Notice of allowance dated Nov. 8, 2022 in U.S. Appl. No. 17/249,265.
U.S. Notice of Allowance dated Nov. 9, 2020 in U.S. Appl. No. 15/685,624.
U.S. Notice of Allowance dated Oct. 15, 2020 in U.S. Appl. No. 16/676,702.
U.S. Notice of Allowance dated Oct. 19, 2017 in U.S. Appl. No. 15/226,793.
U.S. Notice of Allowance dated Oct. 22, 2020 in U.S. Appl. No. 16/676,750.
U.S. Notice of Allowance dated Oct. 31, 2022 in U.S. Appl. No. 17/247,088.
U.S. Notice of Allowance dated Sep. 26, 2017 in U.S. Appl. No. 14/900,037.
U.S. Notice of Allowance (supplemental) dated Jun. 12, 2015 in U.S. Appl. No. 13/479,137.
U.S. Office Action dated Apr. 11, 2017 in U.S. Appl. No. 15/226,793.
U.S. Office Action dated Aug. 14, 2019 in U.S. Appl. No. 15/685,624.
U.S. Office Action dated Dec. 24, 2013 in U.S. Appl. No. 13/309,990.
U.S. Office Action dated Dec. 31, 2018 in U.S. Appl. No. 15/286,193.
U.S. Office Action dated Feb. 24, 2015 in U.S. Appl. No. 14/163,026.
U.S. Office Action dated Feb. 3, 2012 in U.S. Appl. No. 13/049,750.
U.S. Office Action dated Jan. 11, 2018 in U.S. Appl. No. 15/195,880.
U.S. Office Action dated Jan. 11, 2019 in U.S. Appl. No. 16/056,320.
U.S. Office Action dated Jan. 16, 2015 in U.S. Appl. No. 14/468,778.
U.S. Office Action dated Jan. 18, 2013 in U.S. Appl. No. 13/049,756.
U.S. Office Action dated Jul. 22, 2020 in U.S. Appl. No. 15/685,624.
U.S. Office Action dated Jul. 3, 2014 in U.S. Appl. No. 13/479,137.
U.S. Office Action dated Jun. 3, 2015 in U.S. Appl. No. 13/449,251.
U.S. Office Action dated Mar. 19, 2019 in U.S. Appl. No. 15/705,170.
U.S. Office Action dated Mar. 27, 2012 in U.S. Appl. No. 13/049,623.
U.S. Office Action dated Nov. 22, 2016 in U.S. Appl. No. 14/489,414.
U.S. Office Action dated Nov. 29, 2013 in U.S. Appl. No. 13/449,248.
U.S. Office Action dated Nov. 29, 2013 in U.S. Appl. No. 13/449,251.
U.S. Office Action dated Oct. 11, 2013 in U.S. Appl. No. 13/449,235.
U.S. Office Action dated Oct. 22, 2015 in U.S. Appl. No. 13/931,459.
U.S. Office Action dated Oct. 28, 2014 in U.S. Appl. No. 13/449,251.
U.S. Office Action dated Oct. 6, 2014 in U.S. Appl. No. 13/049,756.
U.S. Office Action dated Sep. 15, 2014 in U.S. Appl. No. 13/682,618.
U.S. Office Action dated Sep. 15, 2020 in U.S. Appl. No. 16/132,226.
U.S. Office Action dated Sep. 23, 2013 in U.S. Appl. No. 13/479,137.
U.S. Office Action dated Sep. 29, 2014 in U.S. Appl. No. 13/449,248.
U.S. Restriction Requirement dated Oct. 3, 2022 in U.S. Appl. No. 17/163,202.
CA Office Action dated Aug. 6, 2024 in CA Application No. 3205173.
CA Office Action dated Nov. 2, 2023 in CA Application No. CA3001233.
CN Office Action dated Aug. 18, 2023, in Application No. CN202110930339.1 with English translation.
CN Office Action dated Aug. 21, 2023, in Application No. CN202210372916.4 with English translation.
CN Office Action dated Sep. 20, 2023, in Application No. CN202111422558.5 withEnglish translation.
EP Extended European Search Report dated Dec. 16, 2022 in Application No. EP22189558.4.
EP Extended European Search report dated May 7, 2024 in EP Application No. 24154933.6.
EP office action dated Apr. 24, 2023, in application No. EP21187538.0.
EP Office Action dated Dec. 13, 2023, in EP Application No. 12756917.6.
EP Office Action dated Dec. 18, 2023 in EP Application No. 22189558.4.
EP Office Action dated Jul. 24, 2024, in EP Application No. 22189558.4.
EP office action dated Jun. 7, 2023, in application No. EP21155613.9.
EP Office Action dated Jun. 27, 2024 in EP Application No. 21187538.0.
IN Office Action dated Jul. 25, 2022, in Application No. IN202128059149.
International Search Report and Written Opinion dated Aug. 2, 2023 in PCT Application No. PCT/US2023/020030.
International Search Report and Written Opinion dated Oct. 27, 20223 in PCT Application No. PCT/US2023/026578.
KR Office Action dated Feb. 25, 2022, in Application No. KR10-2021-7013335 with English translation.
TW Office Action dated Feb. 23, 2022, in Application No. TW110140782 with English translation.
TW Office Action dated Jul. 18, 2023, in Application No. TW111119514 with EnglishTranslation.
TW Office Action dated Sep. 3, 2021, in TW Application No. 11020865850 with English translation.
U.S. Corrected Notice of Allowance dated Aug. 11, 2023, in U.S. Appl. No. 18/047,839.
U.S. Non-Final Office Action dated Jan. 25, 2024 in U.S. Appl. No. 17/946,692.
U.S. Notice of Allowance dated Apr. 1, 2024 in U.S. Appl. No. 18/152,573.
U.S. Notice of Allowance dated Apr. 11, 2024 in U.S. Appl. No. 18/154,396.
U.S. Notice of Allowance dated Apr. 19, 2024 in U.S. Appl. No. 18/152,573.
U.S. Notice of Allowance dated Apr. 24, 2024 in U.S. Appl. No. 17/946,692.
U.S. Notice of Allowance dated Aug. 18, 2023 in U.S. Appl. No. 17/444,010.
U.S. Notice of Allowance dated Aug. 29, 2024 in U.S. Appl. No. 18/410,118.
U.S. Notice of Allowance dated Feb. 12, 2024 in U.S. Appl. No. 18/065,204.
U.S. Notice of Allowance dated Jan. 3, 2024 in U.S. Appl. No. 18/154,396.
U.S. Notice of Allowance dated Jul. 5, 2024 in U.S. Appl. No. 18/152,573.
U.S. Notice of Allowance dated Jul. 12, 2023 in U.S. Appl. No. 17/444,010.

(56) References Cited

OTHER PUBLICATIONS

U.S. Notice of Allowance dated Jul. 26, 2023 in U.S. Appl. No. 18/047,839.
U.S. Notice of Allowance dated May 6, 2024 in U.S. Appl. No. 17/946,692.
U.S. Notice of Allowance dated Nov. 3, 2023 in U.S. Appl. No. 18/047,839.
U.S. Notice of Allowance dated Oct. 17, 2023 in U.S. Appl. No. 18/065,204.
U.S. Notice of Allowance dated Oct. 20, 2023 in U.S. Appl. No. 17/444,010.
U.S. Notice of Allowance dated Oct. 24, 2023 in U.S. Appl. No. 18/065,204.
U.S. Restriction requirement dated Oct. 27, 2023 in U.S. Appl. No. 17/946,692.

* cited by examiner

Position Across Device

CONTROLLING TRANSITIONS IN OPTICALLY SWITCHABLE DEVICES

CROSS REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Electrochromic (EC) devices are typically multilayer stacks including (a) at least one layer of electrochromic material, that changes its optical properties in response to the application of an electrical potential, (b) an ion conductor (IC) layer that allows ions, such as lithium ions, to move through it, into and out from the electrochromic material to cause the optical property change, while preventing electrical shorting, and (c) transparent conductor layers, such as transparent conducting oxides or TCOs, over which an electrical potential is applied to the electrochromic layer. In some cases, the electric potential is applied from opposing edges of an electrochromic device and across the viewable area of the device. The transparent conductor layers are designed to have relatively high electronic conductances. Electrochromic devices may have more than the above-described layers such as ion storage or counter electrode layers that optionally change optical states.

Due to the physics of the device operation, proper function of the electrochromic device depends upon many factors such as ion movement through the material layers, the electrical potential required to move the ions, the sheet resistance of the transparent conductor layers, and other factors. The size of the electrochromic device plays an important role in the transition of the device from a starting optical state to an ending optical state (e.g., from tinted to clear or clear to tinted). The conditions applied to drive such transitions can have quite different requirements for different sized devices or different operating conditions.

What are needed are improved methods for driving optical transitions in electrochromic devices.

SUMMARY

Various embodiments herein relate to methods for transitioning an optically switchable device using feedback obtained during the transition to control the ongoing transition. Certain embodiments relate to optically switchable devices having controllers with instructions to transition the optically switchable device using feedback obtained during the transition. Further, in some embodiments, groups of optically switchable devices are controlled together based on electrical feedback obtained during the transition. The optically switchable devices can be probed by applying certain electrical conditions (e.g., voltage pulses and/or current pulses) to the optically switchable devices. An electrical response to the probing can be used as feedback to control the ongoing transition.

In one aspect of the disclosed embodiments, a method of controlling an optical transition of an optically switchable device from a starting optical state to an ending optical state is provided, the method including: (a) applying a voltage or current for driving the optically switchable device to transition from the starting optical state to the ending optical state, where the applied voltage or current is applied to bus bars of the optically switchable device; (b) before the transition is complete, determining an electrical characteristic of the optically switchable device; and (c) using the determined electrical characteristic as feedback to adjust the applied voltage or current to further control the optically switchable device transition.

In a number of embodiments, the optically switchable device is an electrochromic (EC) window. Operation (c) may include substantially matching, during the transition, the tint level of the EC window to the tint level of a second EC window proximate the EC window. This allows more than one window to be controlled to matching tint levels.

Different types of feedback may be used. In some embodiments, the determined electrical characteristic includes an open circuit voltage across two electrodes of the optically switchable device. In these or other cases, the determined electrical characteristic may include a current flowing between two electrodes of the optically switchable device. In some examples, the determined electrical characteristic includes at least one of a voltage and a current, where operation (c) includes adjusting an applied current or voltage used to drive the transition based on the determined electrical characteristic to ensure that the optically switchable device is maintained within a safe operating current range and/or within a safe operating voltage range during the optical transition. The safe operating current range may have a maximum magnitude between about 70-250 $\mu A/cm^2$. The safe operating voltage range may have a maximum magnitude between about 5-9V.

In certain embodiments, the determined electrical characteristic includes at least one of a voltage and a current, and (c) includes adjusting an applied current or voltage used to drive the transition based on the determined electrical characteristic to ensure that the optical transition is occurring at a rate of transition that is at least as high as a target rate of transition. In some cases, (c) includes adjusting the applied current or voltage based on the determined electrical characteristic to ensure that the optical transition occurs within a target timeframe. In these or other cases, the determined electrical characteristic may include at least one of a voltage and a current, and (c) includes adjusting an applied current or voltage used to drive the transition based on the determined electrical characteristic to determine whether the optically switchable device is at or near the ending optical state. Further, in some cases the determined electrical characteristic includes a current that occurs in response to open circuit voltage conditions applied to the optically switchable device.

In some cases, the method further includes determining a quantity of charge delivered to drive the optical transition, and based on the determined quantity of charge delivered, determining whether the optically switchable device is at or near the ending optical state. The method may also include receiving a command to transition the optically switchable device to a third optical state after initiation of the optical transition from the starting optical state to the ending optical state, where the third optical state is different from the ending optical state, where (c) includes adjusting an applied current or voltage used to drive the optical transition based on the determined electrical characteristic to thereby drive the optically switchable device to the third optical state.

In another aspect of the disclosed embodiments, a method of maintaining substantially matching tint levels or tint rates in a plurality of electrochromic (EC) windows is provided, the method including: (a) probing the plurality of EC windows to determine an electrical response for each window; (b) comparing the determined electrical responses for the plurality of EC windows; and (c) scaling a voltage or current applied to each of the plurality of EC windows to thereby match the tint levels or tint rates in each of the plurality of EC windows.

In a further aspect of the disclosed embodiments, a method of transitioning a plurality of electrochromic (EC) windows at substantially matching tint rates is provided, the method including: (a) determining a transition time over which the plurality of EC windows are to be transitioned from a starting optical state to an ending optical state, where the transition time is based, at least in part, on a minimum time over which a slowest transitioning window in the plurality of EC windows transitions from the starting optical state to the ending optical state; (b) applying one or more drive conditions to each of the windows in the plurality of windows, where the one or more drive conditions applied to each window are sufficient to cause each window to transition from the starting optical state to the ending optical state substantially within the transition time.

In certain implementations, the method further includes: while applying the one or more drive conditions, probing the plurality of EC windows to determine an electrical response for each window, measuring the electrical response for each window, determining whether the electrical response for each window indicates that the window will reach the ending optical state within the transition time, and if it is determined that the window will reach the ending optical state within the transition time, continuing to apply the driving conditions to reach the ending optical state, and if it is determined that the window will not reach the ending optical state within the transition time, increasing a voltage and/or current applied to the window to thereby cause the window to reach the ending optical state within the transition time.

The method may further include when determining whether the electrical response for each window indicates that the window will reach the ending state within the transition time, if it is determined that the window will reach the ending optical state substantially before the transition time, decreasing a drive voltage and/or current applied to the window to thereby cause the window to reach the ending optical state at a time closer to the transition time than would otherwise occur without decreasing the drive voltage and/or current. The transition time may be based on a number of factors. For instance, in some cases the transition time is based, at least in part, on a size of a largest window in the plurality of EC windows. This can help ensure that the windows can all transition at the same rate.

The plurality of EC windows may be specifically defined in some cases. For instance, the method may include defining the plurality of EC windows to be transitioned based on one or more criteria selected from the group consisting of: pre-defined zones of windows, instantaneously-defined zones of windows, window properties, and user preferences. A number of different sets of windows can be defined, and the sets of windows can be re-defined on-the-fly in some embodiments. For example, defining the plurality of EC windows to be transitioned may include determining a first plurality of EC windows and determining a second plurality of EC windows, where the transition time determined in (a) is a first transition time over which the first plurality of EC windows are to be transitioned, and where the transition time in (b) is the first transition time, and further including: (c) after beginning to apply the one or more drive conditions in (b) and before the first plurality of EC windows reaches the ending optical state, determining a second transition time over which the second plurality of EC windows are to be transitioned to a third optical state, where the third optical state may be the starting optical state, the ending optical state, or a different optical state, where the second transition time is based, at least in part, on a minimum time over which a slowest transitioning window in the second plurality of EC windows transitions to the third optical state, and (d) applying one or more drive conditions to each of the windows in the second plurality of EC windows, where the one or more drive conditions applied to each window are sufficient to cause each window to transition to the third optical state substantially within the second transition time. In some embodiments, each window in the plurality of EC windows includes a memory component including a specified transition time for that window, where (a) includes comparing the specified transition time for each window in the plurality of EC windows to thereby determine which window is the slowest transitioning window in the plurality of EC windows.

These and other features will be described in further detail below with reference to the associated drawings.

DETAILED DESCRIPTION

Definitions

Figure 1:
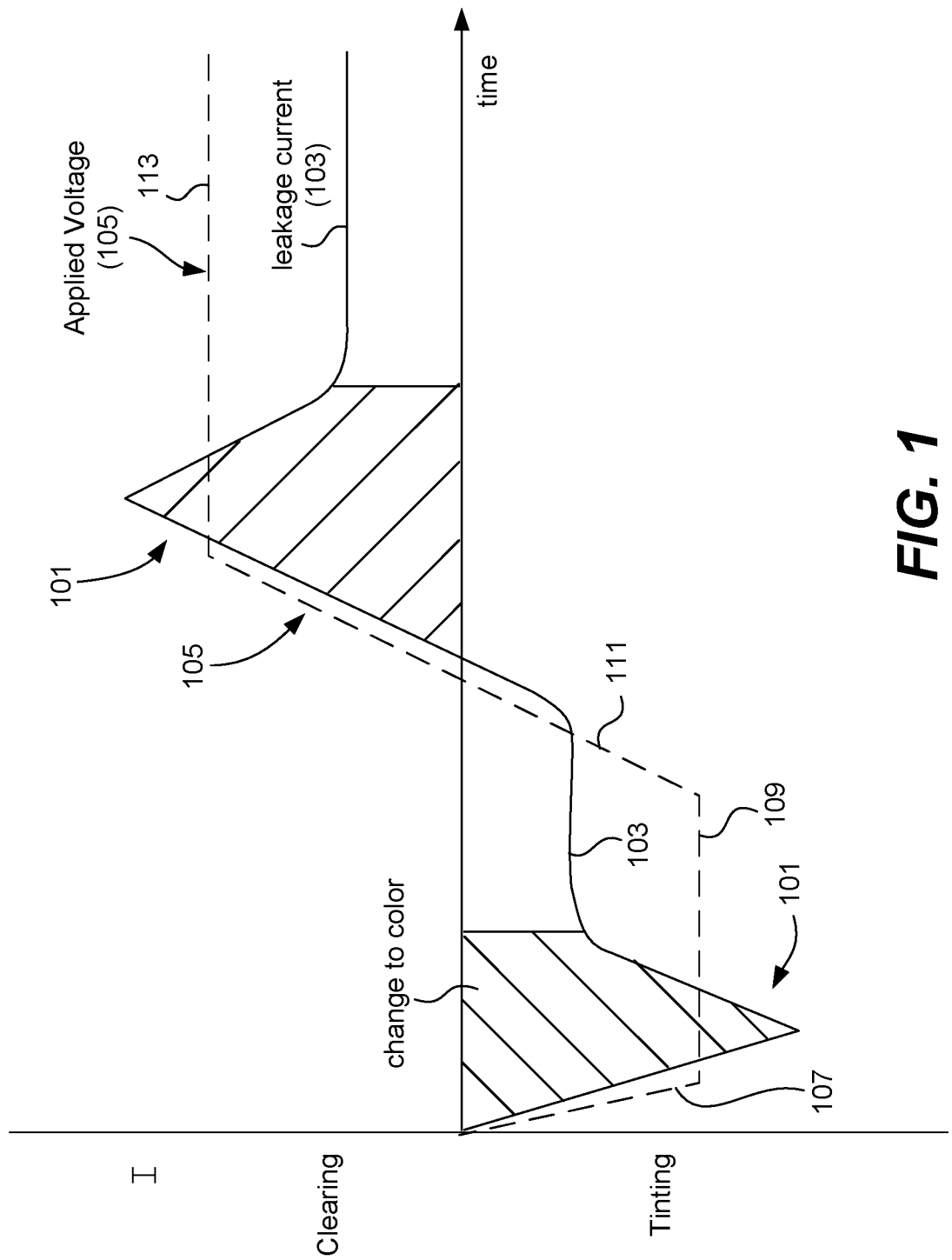
FIG. 1 illustrates current and voltage profiles during an optical transition using a simple voltage control algorithm.

An "optically switchable device" is a thin device that changes optical state in response to electrical input. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable device include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

An "optical transition" is a change in any one or more optical properties of an optically switchable device. The optical property that changes may be, for example, tint, reflectivity, refractive index, color, etc. In certain embodiments, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the optically switchable device.

A "starting optical state" is the optical state of an optically switchable device immediately prior to the beginning of an optical transition. The starting optical state is typically defined as the magnitude of an optical state which may be tint, reflectivity, refractive index, color, etc. The starting optical state may be a maximum or minimum optical state for the optically switchable device; e.g., 90% or 4% transmissivity in some cases. In certain cases a minimum transmissivity may be about 2% or lower, for example about 1% or lower. Alternatively, the starting optical state may be an intermediate optical state having a value somewhere between the maximum and minimum optical states for the optically switchable device; e.g., 50% transmissivity.

An "ending optical state" is the optical state of an optically switchable device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the optically switchable device; e.g., 90% or 4% transmissivity. In certain cases a minimum transmissivity may be about 2% or lower, for example about 1% or lower. Alternatively, the ending optical state may be an intermediate optical state having a value somewhere between the maximum and minimum optical states for the optically switchable device; e.g., 50% transmissivity.

"Bus bar" refers to an electrically conductive strip attached to a conductive layer such as a transparent conductive electrode spanning the area of an optically switchable device. The bus bar delivers electrical potential and current from an external lead to the conductive layer. An optically switchable device includes two or more bus bars, each connected to a single conductive layer of the device. In various embodiments, a bus bar forms a long thin line that spans most of the length of the length or width of a device. Often, a bus bar is located near the edge of the device.

"Applied Voltage" or $V_{app}$ refers the difference in potential applied to two bus bars of opposite polarity on the electrochromic device. Each bus bar is electronically connected to a separate transparent conductive layer. The applied voltage may have different magnitudes or functions such as driving an optical transition or holding an optical state. Between the transparent conductive layers are sandwiched the optically switchable device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of an optically switchable device.

"Effective Voltage" or $V_{eff}$ refers to the potential between the positive and negative transparent conducting layers at any particular location on the optically switchable device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

"Hold Voltage" refers to the applied voltage necessary to indefinitely maintain the device in an ending optical state. In some cases, without application of a hold voltage, electrochromic windows return to their natural tint state. In other words, maintenance of a desired tint state requires application of a hold voltage.

"Drive Voltage" refers to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3.

Introduction and Overview

A switchable optical device such as an electrochromic device reversibly cycles between two or more optical states such as a clear state and a tinted state. Switching between these states is controlled by applying predefined current and/or voltage to the device. The device controller typically includes a low voltage electrical source and may be configured to operate in conjunction with radiant and other environmental sensors, although these are not required in various embodiments. The controller may also be configured to interface with an energy management system, such as a computer system that controls the electrochromic device according to factors such as the time of year, time of day, security conditions, and measured environmental conditions. Such an energy management system can dramatically lower the energy consumption of a building.

In various embodiments herein, an optical transition is influenced through feedback that is generated and utilized during the optical transition. The feedback may be based on a variety of non-optical properties, for example electrical properties. In particular examples the feedback may be a current and/or voltage response of an EC device based on particular conditions applied to the device. The feedback may be used to determine or control the tint level in the device, or to prevent damage to the device. In many cases, feedback that is generated/obtained during the optical transition is used to adjust the electrical parameters driving the transition. The disclosed embodiments provide a number of ways that such feedback may be used.

FIG. 1 shows a current profile for an electrochromic window employing a simple voltage control algorithm to cause an optical state transition (e.g., tinting) of an electrochromic device. In the graph, ionic current density (I) is represented as a function of time. Many different types of electrochromic devices will have the depicted current profile. In one example, a cathodic electrochromic material such as tungsten oxide is used in conjunction with a nickel tungsten oxide counter electrode. In such devices, negative currents indicate tinting of the device. The specific depicted profile results by ramping up the voltage to a set level and then holding the voltage to maintain the optical state.

The current peaks 101 are associated with changes in optical state, i.e., tinting and clearing. Specifically, the current peaks represent delivery of the charge needed to tint or clear the device. Mathematically, the shaded area under the peak represents the total charge required to tint or clear the device. The portions of the curve after the initial current spikes (portions 103) represent leakage current while the device is in the new optical state.

In FIG. 1, a voltage profile 105 is superimposed on the current curve. The voltage profile follows the sequence: negative ramp (107), negative hold (109), positive ramp (111), and positive hold (113). Note that the voltage remains constant after reaching its maximum magnitude and during the length of time that the device remains in its defined optical state. Voltage ramp 107 drives the device to its new tinted state and voltage hold 109 maintains the device in the tinted state until voltage ramp 111 in the opposite direction drives the transition from tinted to clear states. In some switching algorithms, a current cap is imposed. That is, the current is not permitted to exceed a defined level in order to prevent damaging the device.

Figure 2:
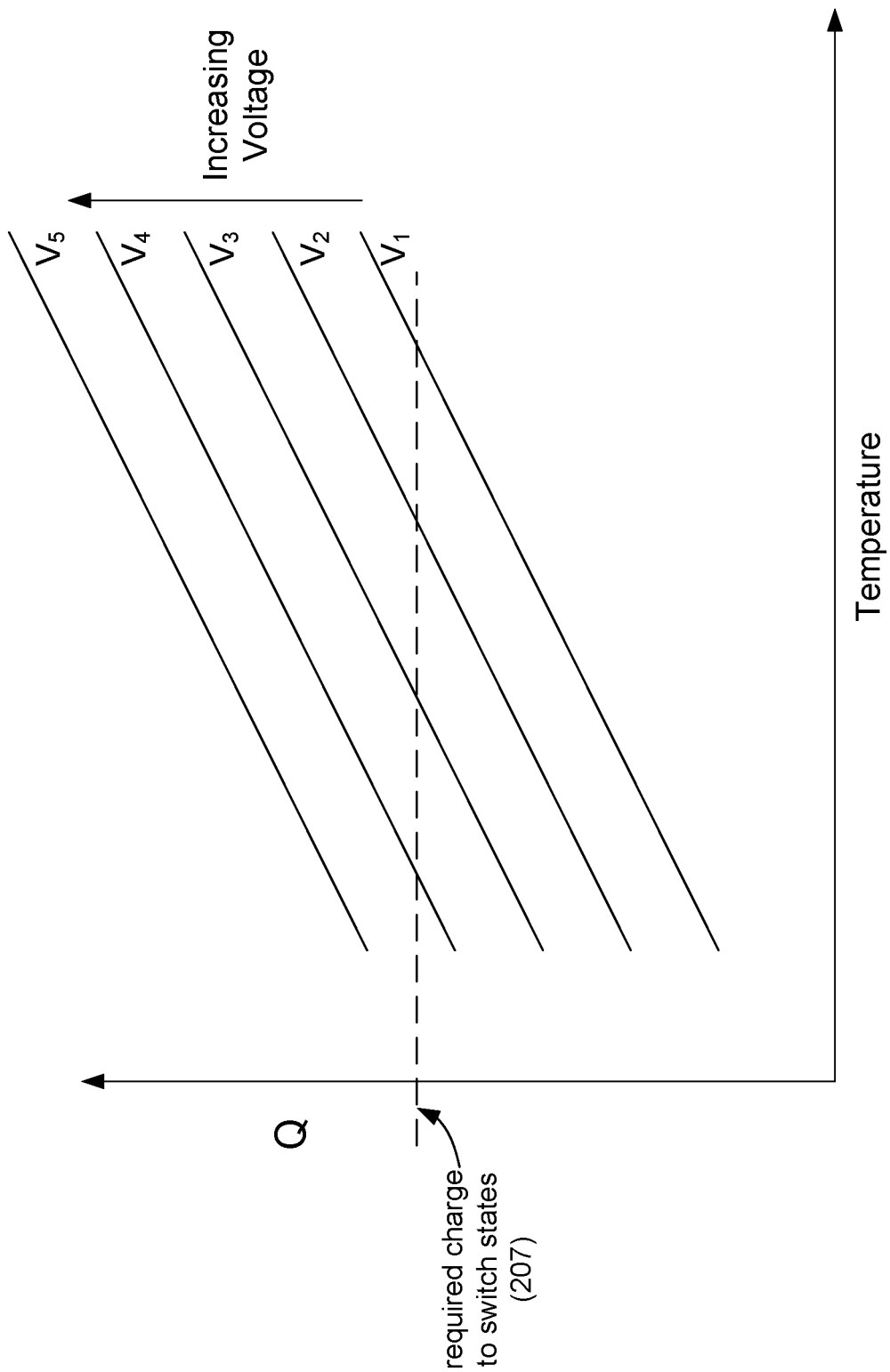
FIG. 2 depicts a family of charge (Q) vs. temperature (T) curves for particular voltages.

The speed of tinting is a function of not only the applied voltage, but also the temperature and the voltage ramping rate. Since both voltage and temperature affect lithium diffusion, the amount of charge passed (and hence the intensity of this current peak) increases with voltage and temperature as indicated in FIG. 2. Additionally by definition the voltage and temperature are interdependent, which implies that a lower voltage can be used at higher temperatures to attain the same switching speed as a higher voltage at lower temperatures. This temperature response may be employed in a voltage based switching algorithm but requires active monitoring of temperature to vary the applied voltage. The temperature is used to determine which voltage to apply in order to effect rapid switching without damaging the device.

As noted above, various embodiments herein utilize some form of feedback to actively control a transition in an optically switchable device. In many cases the feedback is based on non-optical characteristics. Electrical characteristics are particularly useful, for example voltage and current responses of the optically switchable device when certain electrical conditions are applied. A number of different uses for the feedback are provided below.

Controlling a Transition Using Electrical Feedback to Ensure Safe Operating Conditions In some embodiments, electrical feedback is used to ensure that the optically switchable device is maintained within a safe window of operating conditions. If the current or voltage supplied to a device is too great, it can cause damage to the device. The feedback methods presented in this section may be referred to as damage prevention feedback methods. In some embodiments, the damage prevention feedback may be the only feedback used. Alternatively, the damage prevention feedback methods may be combined with other feedback methods described herein. In other embodiments, the damage prevention feedback is not used, but a different type of feedback described below is used.

FIG. 2 shows a family of Q versus T (charge versus temperature) curves for particular voltages. More specifically the figure shows the effect of temperature on how much charge is passed to an electrochromic device electrode after a fixed period of time has elapsed while a fixed voltage is applied. As the voltage increases, the amount of charge passed increases for a given temperature. Thus, for a desired amount of charge to be passed, any voltage in a range of voltages might then be appropriate as shown by horizontal line 207 in FIG. 2. And it is clear that simply controlling the voltage will not guarantee that the change in optical state occurs within a predefined period of time. The device temperature strongly influences the current at a particular voltage. Of course, if the temperature of the device is known, then the applied voltage can be chosen to drive the tinting change during the desired period of time. However, in some cases it is not possible to reliably determine the temperature of the electrochromic device. While the device controller typically knows how much charge is required to switch the device, it might not know the temperature.

If too high of a voltage or current is applied for the electrochromic device's temperature, then the device may be damaged or degraded. On the other hand, if too low of a voltage or current is applied for the temperature, then the device will switch too slowly. Thus it would be desirable to have a controlled current and/or voltage early in the optical transition. With this in mind, in one embodiment the charge (by way of current) is controlled without being constrained to a particular voltage.

Some control procedures described herein may be implemented by imposing the following constraints on the device during an optical transition: (1) a defined amount of charge is passed between the device electrodes to cause a full optical transition; (2) this charge is passed within a defined time frame; (3) the current does not exceed a maximum current; and (4) the voltage does not exceed a maximum voltage.

In accordance with various embodiments described herein, an electrochromic device is switched using a single algorithm irrespective of temperature. In one example, a control algorithm involves (i) controlling current instead of voltage during an initial switching period where ionic current is significantly greater than the leakage current and (ii) during this initial period, employing a current-time correlation such that the device switches fast enough at low temperatures while not damaging the part at higher temperatures.

Thus, during the transition from one optical state to another, a controller and an associated control algorithm controls the current to the device in a manner ensuring that the switching speed is sufficiently fast and that the current does not exceed a value that would damage the device. Further, in various embodiments, the controller and control algorithm effects switching in two stages: a first stage that controls current until reaching a defined point prior to completion of the switching, and a second stage, after the first stage, that controls the voltage applied to the device.

Various embodiments described herein may be generally characterized by the following three regime methodology.

1. Control the current to maintain it within a bounded range of currents. This may be done only for a short period of time during initiation of the change in optical state. It is intended to protect the device from damage due to high current conditions while ensuring that sufficient current is applied to permit rapid change in optical state. Generally, the voltage during this phase stays within a maximum safe voltage for the device. In some embodiments employing residential or architectural glass, this initial controlled current phase will last about 3-4 minutes. During this phase, the current profile may be relatively flat, not varying by more than, for example, about 10%.

2. After the initial controlled current stage is complete, there is a transition to a controlled voltage stage where the voltage is held at a substantially fixed value until the optical transition is complete, i.e., until sufficient charge is passed to complete the optical transition. In some cases, the transition from stages 1 to 2 (controlled current to controlled voltage) is triggered by reaching a defined time from initiation of the switching operation. In alternative embodiments, however, the transition is accompanied by reaching a predefined voltage, a predefined amount of charge passed, or some other criterion. During the controlled voltage stage, the voltage may be held at a level that does not vary by more than about 0.2 V.

3. After the second stage is completed, typically when the optical transition is complete, the voltage is dropped in order to minimize (account for) leakage current while maintaining the new optical state. That is, a small voltage, sometimes referred to as a "hold voltage" is applied to compensate for a leakage current across the ion conductor layer. In some embodiments, the leakage current of the EC device can be quite low, e.g. on the order of <1 $\mu A/cm^2$, so the hold voltage is also small. The hold voltage need only compensate for the leakage current that would otherwise untint the device due to concomitant ion transfer across the IC layer. The transition to this third stage may be triggered by, e.g., reaching a defined time from the initiation of the switching operation. In other example, the transition is triggered by passing a predefined amount of charge.

Figure 3A:
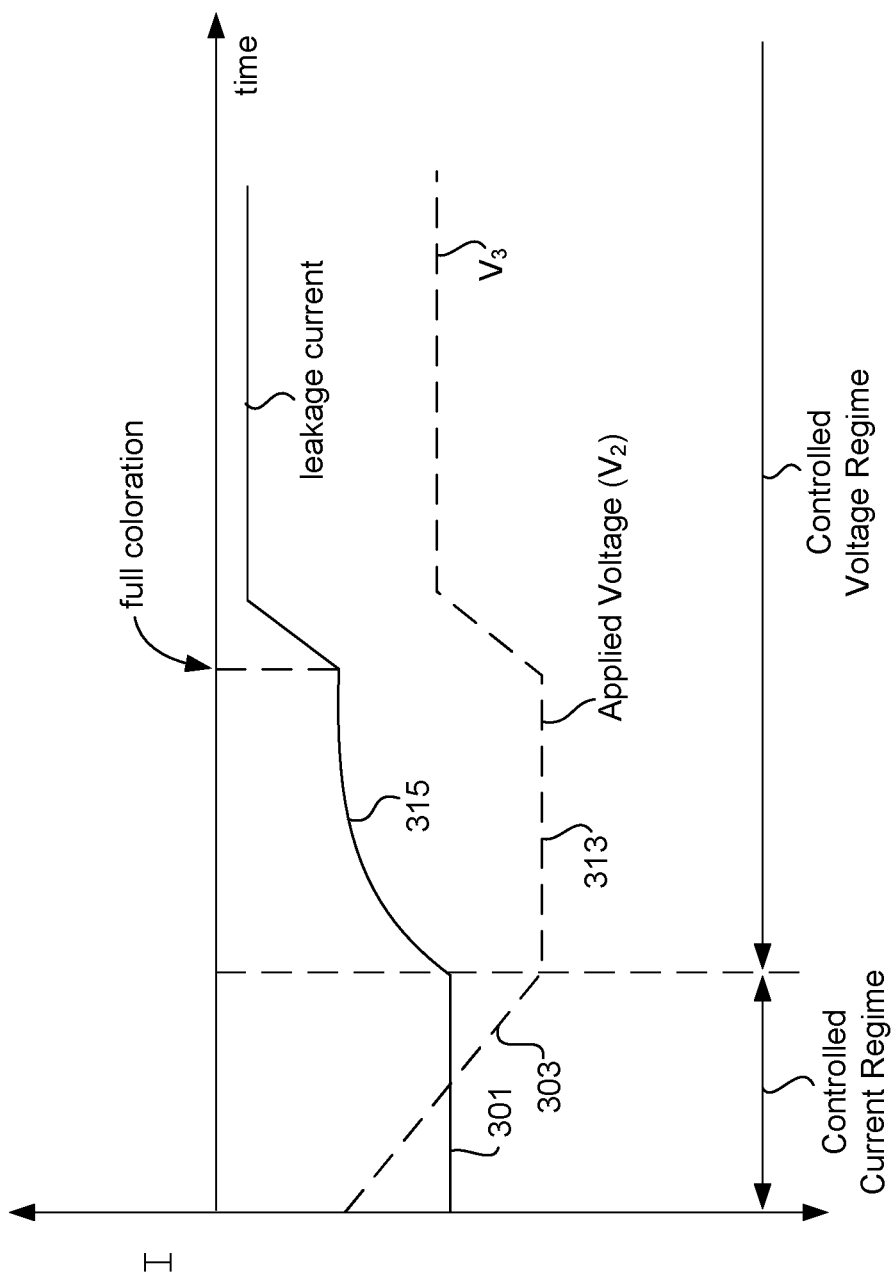
FIGS. 3A and 3B show current and voltage profiles resulting from a specific control method in accordance with certain embodiments.
Figure 3B:
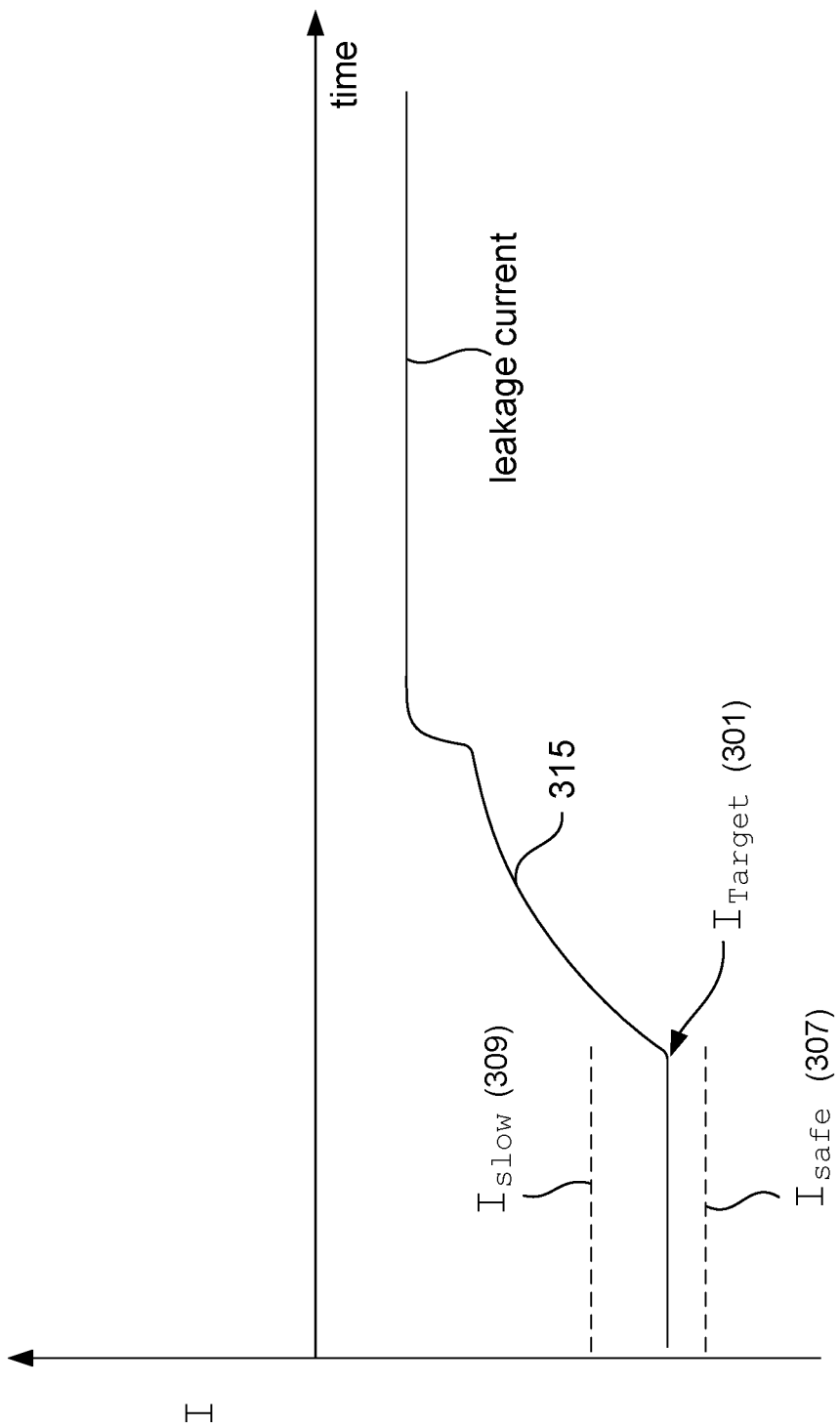
Figure 3C:
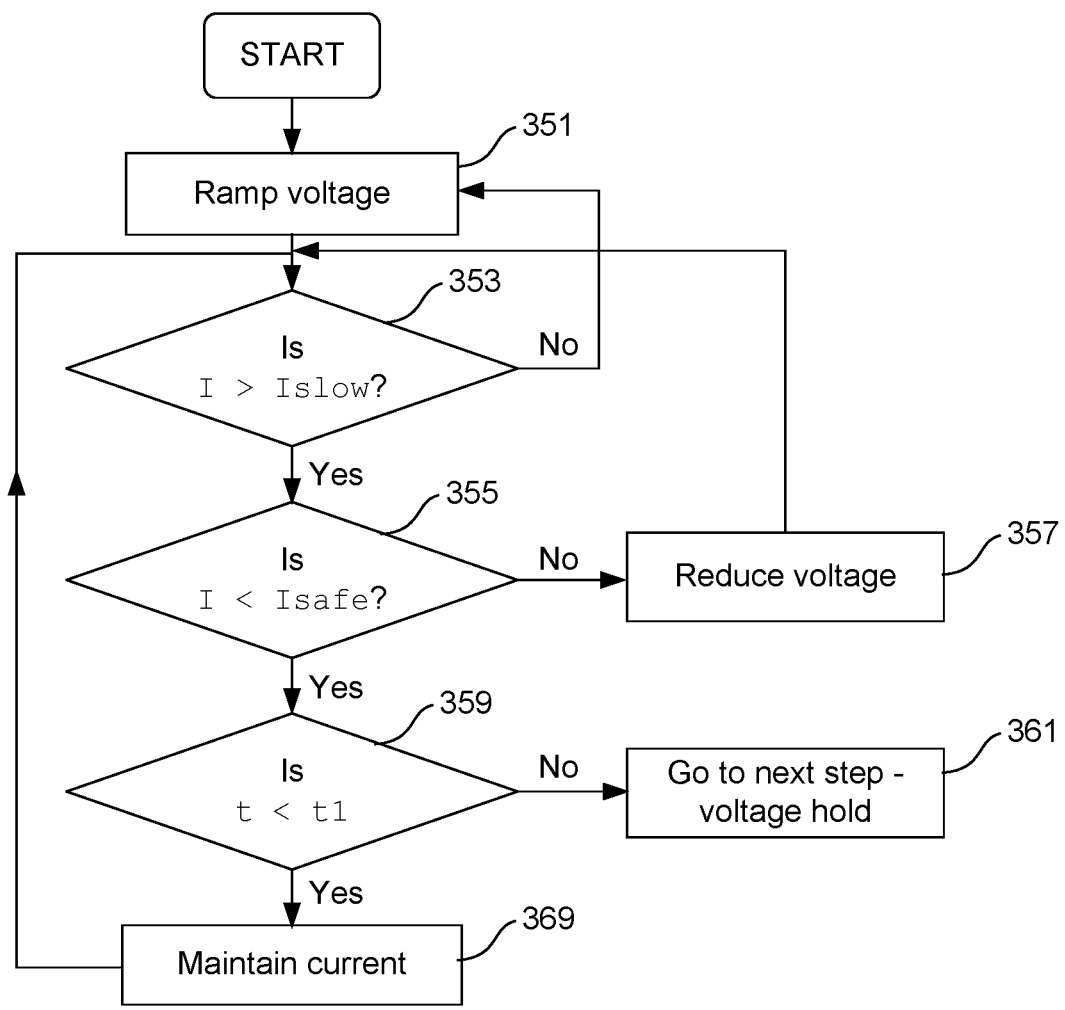
FIG. 3C shows a flow chart depicting control of current during an initial stage of an optical transition.

FIGS. 3A and 3B show current and voltage profiles resulting for a specific control method in accordance with certain embodiments. FIG. 3C provides an associated flow chart for an initial portion (the controlled current portion) of the control sequence. For purposes of discussion, the negative current shown in these figures, as in FIG. 1, is assumed to drive the clear to tinted transition. Of course, the example could apply equally to devices that operate in reverse, i.e., devices employing anodic electrochromic electrodes.

In a specific example, the following procedure is followed:

1. At time 0 ($t_0$)—Ramp the voltage at a rate intended to correspond to a current level "I target" 301. See block 351 of FIG. 3C. See also a voltage ramp 303 in FIG. 3A. I target may be set a priori for the device in question—independent of temperature. As mentioned, the control method described in this section may be beneficially implemented without knowing or inferring the device's temperature. In alternative embodiments, the temperature is detected and considered in setting the current level. In some cases, temperature may be inferred from the current-voltage response of the window.

In some examples, the ramp rate is between about 10 $\mu V/s$ and 100V/s. In more specific examples, the ramp rate is between about 1 mV/s and 500 mV/s.

2. Immediately after to, typically within a few milliseconds, the controller determines the current level resulting from application of voltage in operation 1. The resulting current level may be used as feedback in controlling the optical transition. In particular, the resulting current level may be compared against a range of acceptable currents bounded by I slow at the lower end and I safe at the upper end. I safe is the current level above which the device can become damaged or degraded. I slow is the current level below which the device will switch at an unacceptably slow rate. As an example, I target in an electrochromic window may be between about 30 and 70 $\mu A/cm^2$. Further, typical examples of I slow range between about 1 and 30 $\mu A/cm^2$ and examples of I safe range between about 70 and 250 $\mu A/cm^2$.

The voltage ramp is set, and adjusted as necessary, to control the current and typically produces a relatively consistent current level in the initial phase of the control sequence. This is illustrated by the flat current profile 301 as shown in FIGS. 3A and 3B, which is bracketed between levels I safe 307 and I slow 309.

3. Depending upon the results of the comparison in step 2, the control method employs one of the operations (a)-(c) below. Note that the controller not only checks the current level immediately after to, but it frequently checks the current level thereafter and makes adjustments as described here and as shown in FIG. 3C.

(a) Where the measured current is between I slow and I safe→Continue to apply a voltage that maintains the current between I slow and I safe. See the loop defined by blocks 353, 355, 359, 369, and 351 of FIG. 3C.

(b) Where the measured current is below I slow (typically because the device temperature is low)→continue to ramp the applied voltage in order to bring the current above I slow but below I safe. See the loop of block 353 and 351 of FIG. 3C. If the current level is too low, it may be appropriate to increase the rate of increase of the voltage (i.e., increase the steepness of the voltage ramp).

As indicated, the controller typically actively monitors current and voltage to ensure that the applied current remains above I slow. This feedback helps ensure that the device remains within a safe operating window. In one example, the controller checks the current and/or voltage every few milliseconds. It may adjust the voltage on the same time scale. The controller may also ensure that the new increased level of applied voltage remains below V safe. V safe is the maximum applied voltage magnitude, beyond which the device may become damaged or degraded.

(c) Where the measured current is above I safe (typically because the device is operating at a high temperature) →decrease voltage (or rate of increase in the voltage) in order to bring the current below I safe but above I slow. See block 355 and 357 of FIG. 3C. As mentioned, the controller may actively monitor current and voltage. As such, the controller can quickly adjust the applied voltage to ensure that the current remains below I safe during the entire controlled current phase of the transition. Thus, the current should not exceed I safe.

As should be apparent, the voltage ramp 303 may be adjusted or even stopped temporarily as necessary to maintain the current between I slow and I safe. For example, the voltage ramp may be stopped, reversed in direction, slowed in rate, or increased in rate while in the controlled current regime.

In other embodiments, the controller increases and/or decreases current, rather than voltage, as desired. Hence the above discussion should not be viewed as limiting to the option of ramping or otherwise controlling voltage to maintain current in the desired range. Whether voltage or current is controlled by the hardware (potentiostatic or galvanostatic control), the algorithm attains the desired result.

4. Maintain current in the target range, between I slow and I safe until a specified criterion is met. In one example, the criterion is passing current for a defined length of time, $t_1$, at which time the device reaches a defined voltage $V_1$. Upon achieving this condition, the controller transitions from controlled current to controlled voltage. See blocks 359 and 361 of FIG. 3C. Note that $V_1$ is a function of temperature, but as mentioned temperature need not be monitored or even detected in accordance with various embodiments.

In certain embodiments $t_1$ is about 1 to 30 minutes, and in some specific examples $t_1$ is about 2 to 5 minutes. Further, in some cases the magnitude of $V_1$ is about 1 to 7 volts, and more specifically about 2.5 to 4 volts.

As mentioned the controller continues in the controlled current phase until a specified condition is met such as the passing of a defined period of time. In this example, a timer is used to trigger the transition. In other examples, the specified condition is reaching a defined voltage (e.g., a maximum safe voltage) or passing of a defined amount of charge.

Operations 1-4 correspond to regime 1 in the above general algorithm—controlled current. The goal during this phase is to prevent the current from exceeding a safe level while ensuring a reasonably rapid switching speed. It is possible that during this regime, the controller could supply a voltage exceeding the maximum safe voltage for the electrochromic device. In certain embodiments, this concern is eliminated by employing a control algorithm in which the maximum safe value is much greater than $V_1$ across the operational temperature range. In some examples, I target and $t_1$ are chosen such that $V_1$ is well below the maximum voltage at lower temperatures while not degrading the window due to excessive current at higher temperatures. In some embodiments, the controller includes a safety feature that will alarm the window before the maximum safe voltage is reached. In a typical example, the value of the maximum safe voltage for an electrochromic window is between about 5 and 9 volts.

5. Maintain the voltage at a defined level $V_2$ until another specified condition is met such as reaching a time $t_2$. See voltage segment 313 in FIG. 3A. Typically the time $t_2$ or other specified condition is chosen such that a desired amount charge is passed sufficient to cause the desired change in optical state. In one example, the specified condition is passage of a pre-specified amount of charge. During this phase, the current may gradually decrease as illustrated by current profile segment 315 in FIGS. 3A and 3B. In a specific embodiment, $V_2=V_1$, as is shown in FIG. 3A.

This operation 5 corresponds to the regime 2 above—controlled voltage. A goal during this phase is to maintain the voltage at $V_1$ for a sufficient length to ensure a desired tinting speed.

In certain embodiments $t_2$ is about 2 to 30 minutes, and in some specific examples $t_2$ is about 3 to 10 minutes. Further, in some cases $V_2$ is about 1 to 7 volts, and more specifically about 2.5 to 4 volts.

6. After the condition of step 5 is reached (e.g., after sufficient charge has passed or a timer indicates $t_2$ has been reached), the voltage is dropped from $V_2$ to a level $V_3$. This reduces leakage current during while the tinted state is held. In a specific embodiment, the transition time $t_2$ is predetermined and chosen based on the time required for the center of the part, which is the slowest to tint, to reach a certain percent transmissivity. In some embodiments, the $t_2$ is between about 4 and 6 minutes. This operation 6 corresponds to regime 3 above.

Table 1 presents a specific example of the algorithm described above.

TABLE 1

| Time | Current | Voltage | Variable parameter | Fixed parameter | Constraints | End Condition |
|---|---|---|---|---|---|---|
| 0 | 0 | 0 | | | None | |
| t0 to t1 | I0 = I target | V0 to V1 | V0, V1 | t1, I target | I slow < I0 < I safe | t > t1 |
| t1 to t2 | I1 to I2 | V2 = V1 | I2 | t2, V2 | None | t > t2 |
| t2 to t3 | I2 to I3 | V3 | I3 | V3 | None | State change request |

Definition of Parameters:

I0—targeted current value between I slow and I safe
V0—voltage corresponding to current $I_0$
T0—time at which current=I0.
I1—current at time t1. I1=I0.
V1—voltage at time t1. Voltage ramps from V0 to V1 between t0 and t1 and is a function of temperature.
t1—time for which current is maintained between I slow and I safe (e.g., about 3-4 minutes)
I2—current at time t2. Current decays from I1 to I2 when voltage is maintained at V1.
V2—voltage at time t2. V1=V2.
t2—time till which voltage V1 is maintained. May be between about 4 to 6 min from t1. After t2 the voltage is dropped from V2 to V3
V3—hold voltage between t2 and t3.
I3—current corresponding to voltage V3.
t3—time at which state change request is received.

Controlling a Transition Using Electrical Feedback to Determine the End Point of a Transition Embodiments described in this regard relate to the use of electrical feedback in determining the end point of a transition. In other words, feedback is used to determine when an optical transition is complete or nearly complete. These feedback methods may be used alone or in combination with other feedback methods described herein.

Certain disclosed embodiments make use of electrical probing and monitoring to determine when an optical transition between a first optical state and a second optical state of an optically switchable device has proceeded to a sufficient extent that the application of a drive voltage can be terminated. For example, electrical probing allows for application of drive voltages for less time than previously thought possible, as a particular device is driven based on electrical probing of its actual optical transition progression in real time. Further, real time monitoring can help ensure that an optical transition progresses to a desired state. In various embodiments, terminating the drive voltage is accomplished by dropping the applied voltage to a hold voltage. This approach takes advantage of an aspect of optical transitions that is typically considered undesirable—the propensity of thin optically switchable devices to transition between optical states non-uniformly. In particular, many optically switchable devices initially transition at locations close to the bus bars and only later at regions far from the bus bars (e.g., near the center of the device). Surprisingly, this non-uniformity can be harnessed to probe the optical transition. By allowing the transition to be probed in the manner described herein, optically switchable devices avoid the need for custom characterization and associated preprogramming of device control algorithms specifying the length of time a drive voltage is applied as well as obviating "one size fits all" fixed time period drive parameters that account for variations in temperature, device structure variability, and the like across many devices. Before describing probing and monitoring techniques in more detail, some context on optical transitions in electrochromic devices will be provided.

Driving a transition in a typical electrochromic device is accomplished by applying a defined voltage to two separated bus bars on the device. In such a device, it is convenient to position bus bars perpendicular to the smaller dimension of a rectangular window (see FIG. 4A). This is because the transparent conducting layers used to deliver an applied voltage over the face of the thin film device have an associated sheet resistance, and the bus bar arrangement allows for the shortest span over which current must travel to cover the entire area of the device, thus lowering the time it takes for the conductor layers to be fully charged across their respective areas, and thus lowering the time to transition the device.

While an applied voltage, $V_{app}$, is supplied across the bus bars, essentially all areas of the device see a lower local effective voltage ($V_{eff}$) due to the sheet resistance of the transparent conducting layers and the current draw of the device. The center of the device (the position midway between the two bus bars) frequently has the lowest value of $V_{eff}$. This may result in an unacceptably small optical switching range and/or an unacceptably slow switching time in the center of the device. These problems may not exist at the edges of the device, nearer the bus bars. This is explained in more detail below with reference to FIGS. 4B and 4C.

Figure 4A:
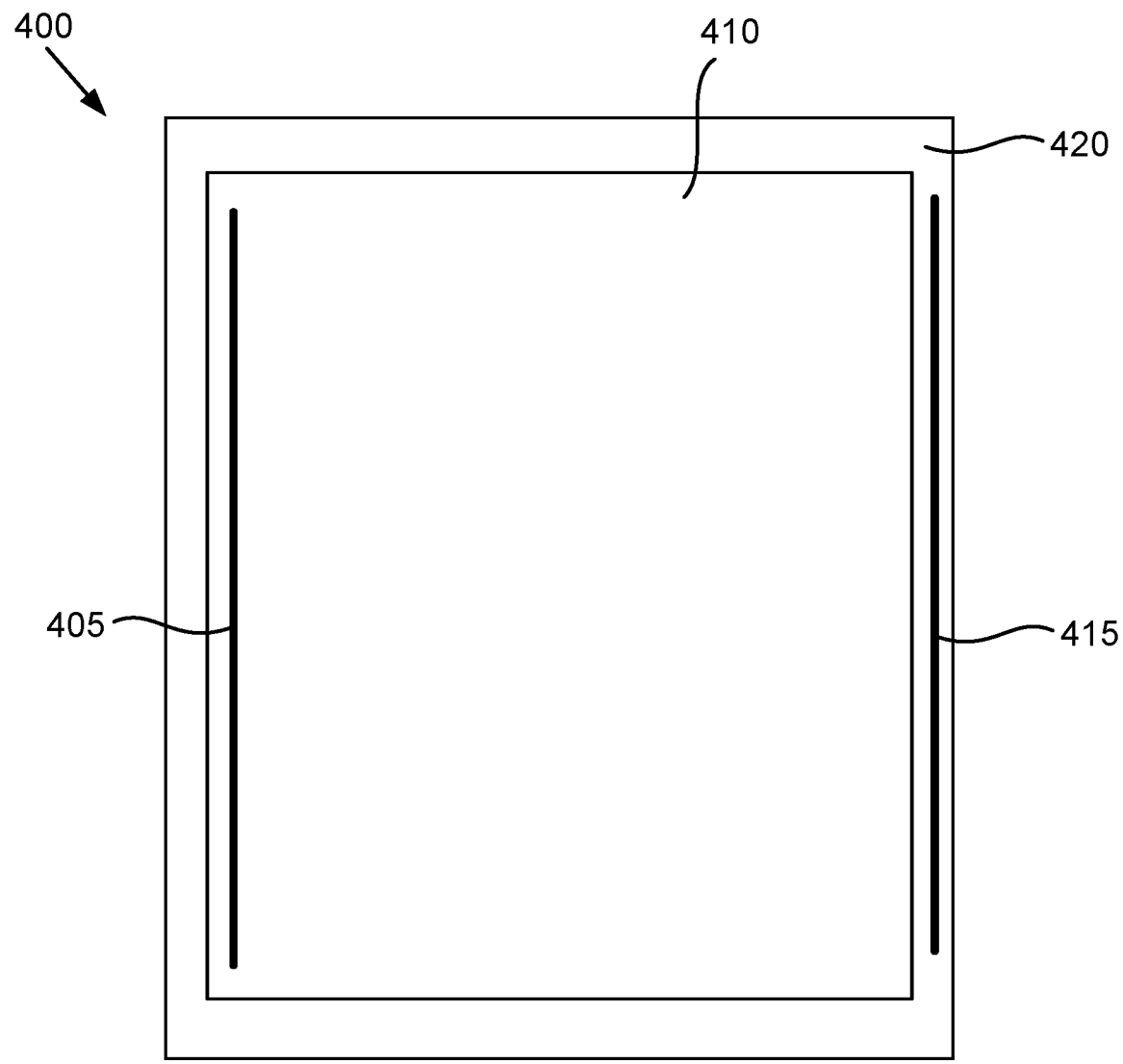
FIG. 4A schematically depicts a planar bus bar arrangement according to certain embodiments.

FIG. 4A shows a top-down view of an electrochromic lite 400 including bus bars having a planar configuration. Electrochromic lite 400 includes a first bus bar 405 disposed on a first conductive layer 410 and a second bus bar 415 disposed on a second conductive layer, 420. An electrochromic stack (not shown) is sandwiched between first conductive layer 410 and second conductive layer 420. As shown, first bus bar 405 may extend substantially across one side of first conductive layer 410. Second bus bar 415 may extend substantially across one side of second conductive layer 420 opposite the side of electrochromic lite 400 on which first bus bar 405 is disposed. Some devices may have extra bus bars, e.g., on all four edges, but this complicates fabrication. A further discussion of bus bar configurations, including planar configured bus bars, is found in U.S. patent application Ser. No. 13/452,032 filed Apr. 20, 2012, which is incorporated herein by reference in its entirety.

Figure 4B:
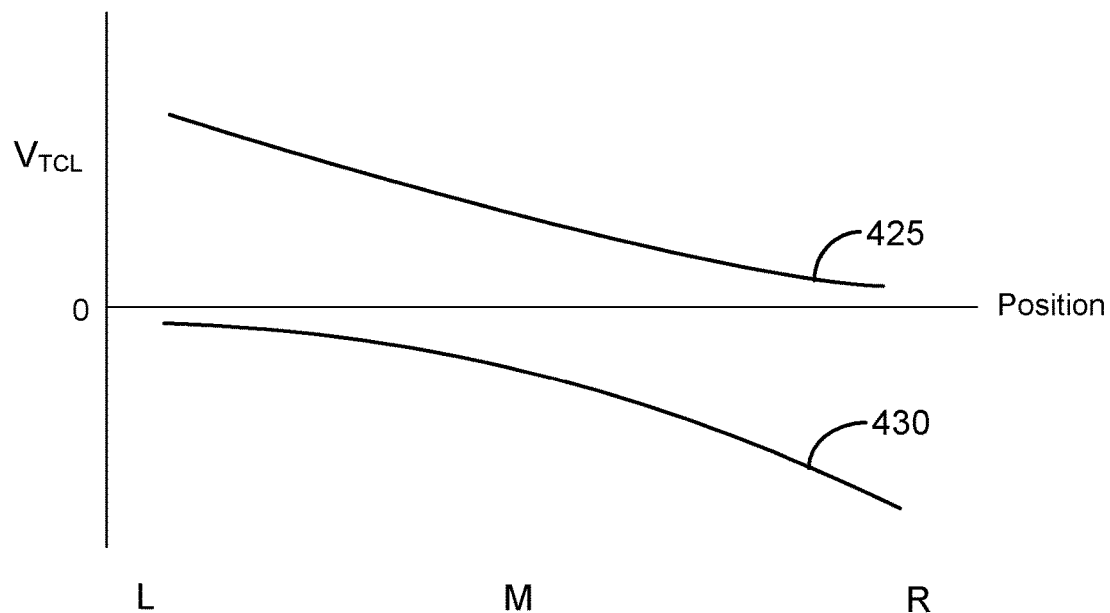
FIG. 4B presents a simplified plot of the local voltage value on each transparent conductive layer as a function of position on the layer.

FIG. 4B is a graph showing a plot of the local voltage in first transparent conductive layer 410 and the voltage in second transparent conductive layer 420 that drives the transition of electrochromic lite 400 from a clear state to a tinted state, for example. Plot 425 shows the local values of the voltage $V_{TCL}$ in first transparent conductive layer 410. As shown, the voltage drops from the left hand side (e.g., where first bus bar 405 is disposed on first conductive layer 410 and where the voltage is applied) to the right hand side of first conductive layer 410 due to the sheet resistance and current passing through first conductive layer 410. Plot 430 also shows the local voltage $V_{TCL}$ in second conductive layer 420. As shown, the voltage increases (decreases in magnitude) from the right hand side (e.g., where second bus bar 415 is disposed on second conductive layer 420 and where the voltage is applied) to the left hand side of second conductive layer 420 due to the sheet resistance of second conductive layer 420. The value of the applied voltage, $V_{app}$, in this example is the difference in voltage between the right end of potential plot 430 and the left end of potential plot 425. The value of the effective voltage, $V_{eff}$, at any location between the bus bars is the difference in values of curves 430 and 425 at the position on the x-axis corresponding to the location of interest.

Figure 4C:
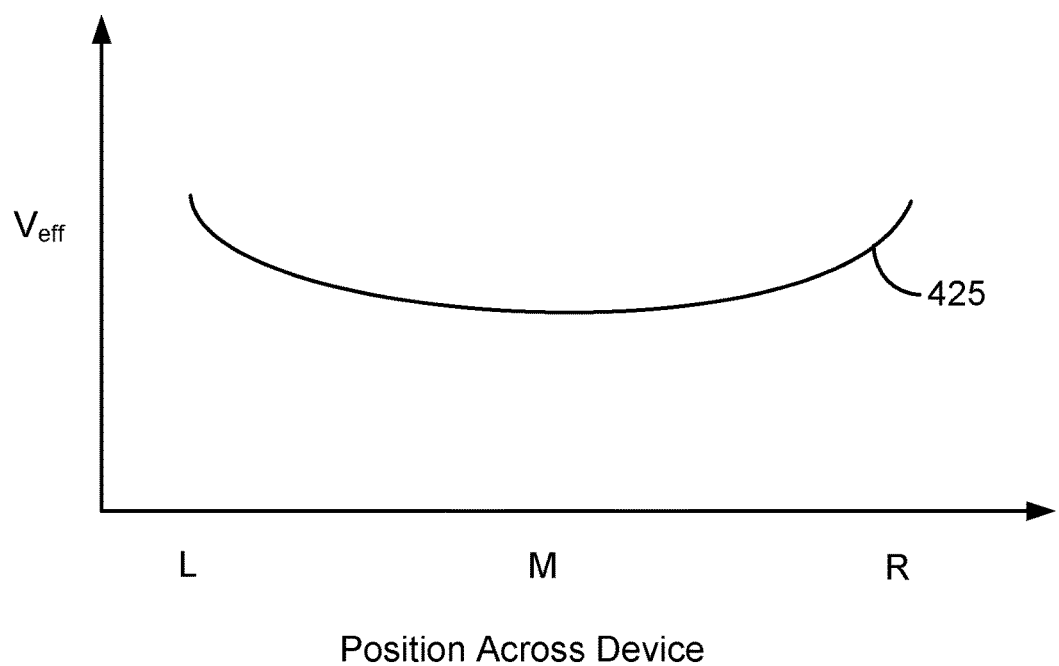
FIG. 4C is a simplified plot of $V_{eff}$ as a function of position across the device.

FIG. 4C is a graph showing a plot of $V_{eff}$ across the electrochromic device between first and second conductive layers 410 and 420 of electrochromic lite 400. As explained, the effective voltage is the local voltage difference between the first conductive layer 410 and the second conductive layer 420. Regions of an electrochromic device subjected to higher effective voltages transition between optical states faster than regions subjected to lower effective voltages. As shown, the effective voltage is the lowest at the center of electrochromic lite 400 and highest at the edges of electrochromic lite 400. The voltage drop across the device is due to ohmic losses as current passes through the device. The voltage drop across large electrochromic windows can be alleviated by configuring additional bus bars within the viewing area of the window, in effect dividing one large optical window into multiple smaller electrochromic windows which can be driven in series or parallel. However, this approach may not be aesthetically appealing due to the contrast between the viewable area and the bus bar(s) in the viewable area. That is, it may be much more pleasing to the eye to have a monolithic electrochromic device without any distracting bus bars in the viewable area.

As described above, as the window size increases, the electronic resistance to current flowing across the thin face of the TC layers also increases. This resistance may be measured between the points closest to the bus bar (referred to as edge of the device in following description) and in the points furthest away from the bus bars (referred to as the center of the device in following description). When current passes through a TCL, the voltage drops across the TCL face and this reduces the effective voltage at the center of the device. This effect is exacerbated by the fact that typically as window area increases, the leakage current density for the window stays constant but the total leakage current increases due to the increased area. Thus with both of these effects the effective voltage at the center of the electrochromic window falls substantially, and poor performance may be observed for electrochromic windows which are larger than, for example, about 30 inches across. This issue can be addressed by using a higher $V_{app}$ such that the center of the device reaches a suitable effective voltage.

Typically the range of safe operation for solid state electrochromic devices is between about 0.5V and 4V, or more typically between about 0.8V and about 3V, e.g. between 0.9V and 1.8V. These are local values of $V_{eff}$. In one embodiment, an electrochromic device controller or control algorithm provides a driving profile where $V_{eff}$ is always below 3V, in another embodiment, the controller controls $V_{eff}$ so that it is always below 2.5V, in another embodiment, the controller controls $V_{eff}$ so that it is always below 1.8V. The recited voltage values refer to the time averaged voltage (where the averaging time is of the order of time required for small optical response, e.g., few seconds to few minutes).

An added complexity of electrochromic windows is that the current drawn through the window is not fixed over the duration of the optical transition. Instead, during the initial part of the transition, the current through the device is substantially larger (up to 100×larger) than in the end state when the optical transition is complete or nearly complete. The problem of poor tinting in center of the device is further exacerbated during this initial transition period, as the value $V_{eff}$ at the center is significantly lower than what it will be at the end of the transition period.

In the case of an electrochromic device with a planar bus bar, it can be shown that the $V_{eff}$ across a device with planar bus bars is generally given by:

$$\Delta V(0) = V_{app} - RJL^2/2$$

$$\Delta V(L) = V_{app} - RJL^2/2$$

$$\Delta V(L/2) = V_{app} - 3RJL^2/4 \quad \text{Equation 1}$$

where:

$V_{app}$ is the voltage difference applied to the bus bars to drive the electrochromic window;

$\Delta V(0)$ is $V_{eff}$ at the bus bar connected to the first transparent conducting layer (in the example below, TEC type TCO);

$\Delta V(L)$ is $V_{eff}$ at the bus bar connected to the second transparent conducting layer (in the example below, ITO type TCO);

$\Delta V(L/2)$ is $V_{eff}$ at the center of the device, midway between the two planar bus bars;

R=transparent conducting layer sheet resistance;

J=instantaneous average current density; and

L=distance between the bus bars of the electrochromic device.

The transparent conducting layers are assumed to have substantially similar, if not the same, sheet resistance for the calculation. However those of ordinary skill in the art will appreciate that the applicable physics of the ohmic voltage drop and local effective voltage still apply even if the transparent conducting layers have dissimilar sheet resistances.

As noted, certain embodiments pertain to controllers and control algorithms for driving optical transitions in devices having planar bus bars. In such devices, substantially linear bus bars of opposite polarity are disposed at opposite sides of a rectangular or other polygonally shaped electrochromic device, as shown in FIG. 4a, for instance. In some embodiments, devices with non-planar bus bars may be employed. Such devices may employ, for example, angled bus bars disposed at vertices of the device. In such devices, the bus bar effective separation distance, L, is determined based on the geometry of the device and bus bars. A discussion of bus bar geometries and separation distances may be found in U.S. patent application Ser. No. 13/452,032, entitled "Angled Bus Bar", and filed Apr. 20, 2012, which is incorporated herein by reference in its entirety.

As R, J or L increase, $V_{eff}$ across the device decreases, thereby slowing or reducing the device tinting during transition and even in the final optical state. Referring to Equation 1, the $V_{eff}$ across the window is at least $RJL^2/2$ lower than $V_{app}$. It has been found that as the resistive voltage drop increases (due to increase in the window size, current draw etc.) some of the loss can be negated by increasing $V_{app}$ but doing so only to a value that keeps $V_{eff}$ at the edges of the device below the threshold where reliability degradation would occur.

In summary, it has been recognized that both transparent conducting layers experience ohmic drop, and that drop increases with distance from the associated bus bar, and therefore $V_{TCL}$ decreases with distance from the bus bar for both transparent conductive layers. As a consequence $V_{eff}$ decreases in locations removed from both bus bars.

Figure 5:
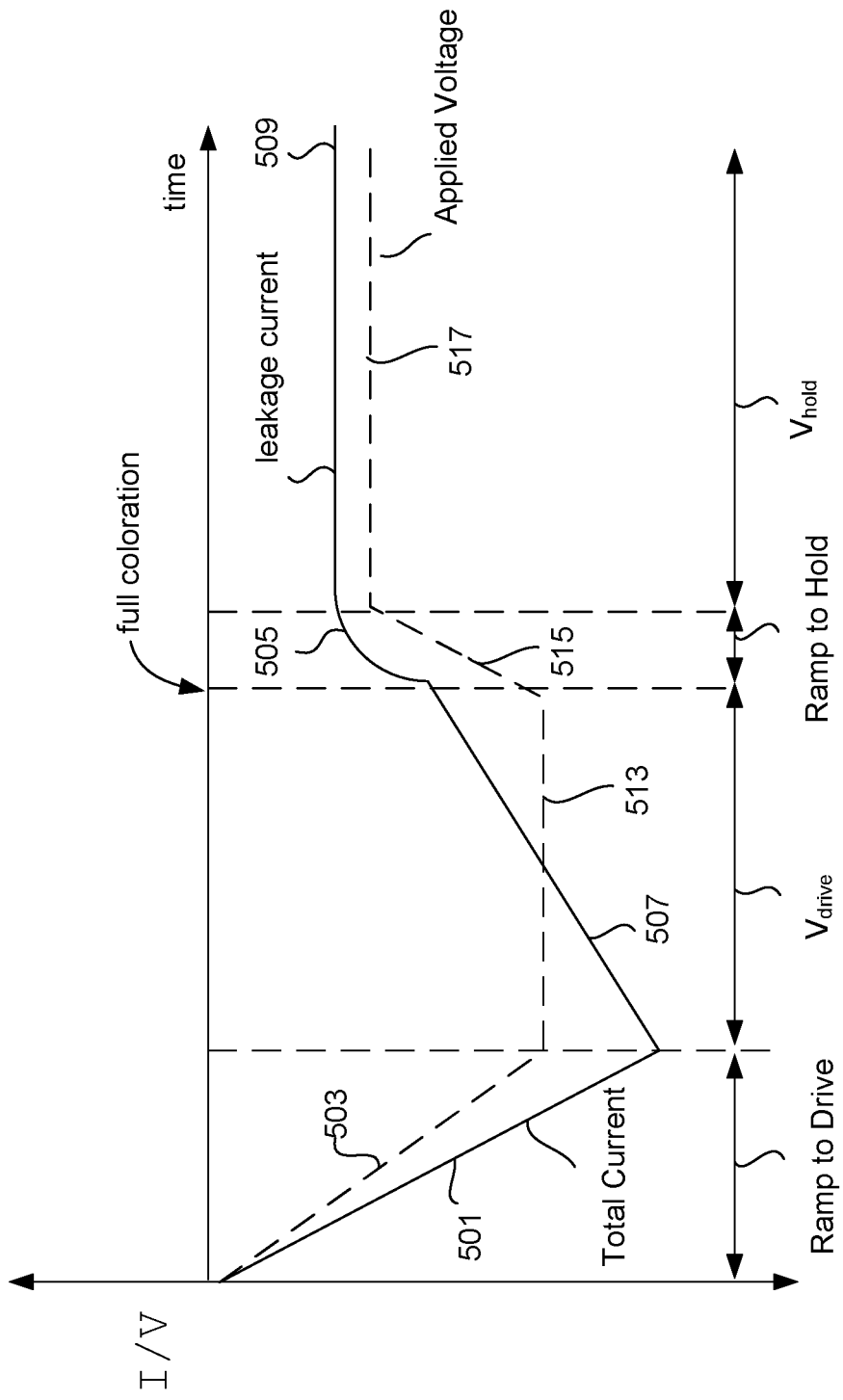
FIG. 5 is a graph depicting certain voltage and current profiles associated with driving an electrochromic device from clear to tinted.

FIG. 5 illustrates a voltage control profile in accordance with certain embodiments. In the depicted embodiment, a voltage control profile is employed to drive the transition from a clear state to a tinted state (or to an intermediate state). To drive an electrochromic device in the reverse direction, from a tinted state to a clear state (or from a more tinted to less tinted state), a similar but inverted profile is used. In some embodiments, the voltage control profile for going from tinted to clear is a mirror image of the one depicted in FIG. 5.

The voltage values depicted in FIG. 5 represent the applied voltage ($V_{app}$) values. The applied voltage profile is shown by the dashed line. For contrast, the current density in the device is shown by the solid line. In the depicted profile, $V_{app}$ includes four components: a ramp to drive component 503, which initiates the transition, a $V_{drive}$ component 513, which continues to drive the transition, a ramp to hold component 515, and a $V_{hold}$ component 517. The ramp components are implemented as variations in $V_{app}$ and the $V_{drive}$ and $V_{hold}$ components provide constant or substantially constant $V_{app}$ magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the tinted state (or conversely in the clear state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does not vary based on current conditions. In other words, in such embodiments, the voltage profile does not take into account feedback such as temperature, current density, and the like.

As indicated, all voltage values shown in the voltage transition profile of FIG. 5 correspond to the $V_{app}$ values described above. They do not correspond to the $V_{eff}$ values described above. In other words, the voltage values depicted in FIG. 5 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 5, the current in the device follows the profile of the ramp to drive voltage component until the ramp to drive portion of the profile ends and the $V_{drive}$ portion begins. See current component 501 in FIG. 5. Safe levels of current and voltage can be determined empirically or based on other feedback. Examples of safe current and voltage levels are provided above.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial tinting of the device. For this purpose, the duration of $V_{drive}$ may be determined empirically, by monitoring the optical density of the device as a function of the length of time that $V_{drive}$ remains in place. In some embodiments, the duration of $V_{drive}$ is set to a specified time period. In another embodiment, the duration of $V_{drive}$ is set to correspond to a desired amount of ionic and/or electronic charge being passed. As shown, the current ramps down during $V_{drive}$. See current segment 507.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 5, the device current transitions in a segment 505 during the ramp to hold component. The current settles to a stable leakage current 509 during $V_{hold}$."

A challenge arises because it can be difficult to predict how long the applied drive voltage should be applied before transitioning to the hold voltage. Devices of different sizes, and more particularly devices having bus bars separated by particular distances, require different lengths of time for applying the drive voltage. Further, the processes employed to fabricate optically switchable devices such as electrochromic devices may vary subtly from one batch to another or one process revision to another. The subtle process variations translate into potentially different requirements for the length of time that the drive voltage must be applied to the devices used in operation. Still further, environmental conditions, and particularly temperature, can influence the length of time that the applied voltage should be applied to drive the transition, for the reasons discussed above with reference to FIG. 2, for example.

To account for all these variables, current technology may define many distinct control algorithms with distinct periods of time for applying a defined drive voltage for each of many different window sizes or device features. A rationale for doing this is to ensure that the drive voltage is applied for a sufficient period, regardless of device size and type, to ensure that the optical transition is complete. Currently many different sized electrochromic windows are manufactured. While it is possible to pre-determine the appropriate drive voltage time for each and every different type of window, this can be a tedious, expensive, and time-consuming process. An improved approach, described here, is to determine on-the-fly the length of time that the drive voltage should be applied.

Further, it may be desirable to cause the transition between two defined optical states to occur within a defined duration, regardless of the size of the optically switchable device, the process under which the device is fabricated, and the environmental conditions in which the device is operating at the time of the transition. This goal can be realized by monitoring the course of the transition and adjusting the drive voltage as necessary to ensure that the transition completes in the defined time. Adjusting the magnitude of the drive voltage is one way of accomplishing this. Such methods are discussed further below in the section regarding Controlling a Transition using Electrical Feedback to Determine the End Point of a Transition.

Certain disclosed embodiments apply a probing technique to assess the progress of an optical transition while the device is in transition. As illustrated in FIG. 5, there are typically distinct ramp to drive and drive voltage maintenance stages of the optical transition. The probe technique can be applied during either of these stages. In many embodiments, the probing technique is applied during the drive voltage maintenance portion of the algorithm.

In certain embodiments, the probing technique involves pulsing the current or voltage applied to drive the transition and then monitoring the current or voltage response to detect an overdrive condition in the vicinity of the bus bars. An overdrive condition occurs when the local effective voltage is greater than needed to cause a local optical transition. For example, if an optical transition to a clear state is deemed complete when $V_{eff}$ reaches 2V, and the local value of $V_{eff}$ near a bus bar is 2.2V, the position near the bus bar may be characterized as in an overdrive condition.

One example of a probing technique involves pulsing the applied drive voltage by dropping it to the level of the hold voltage (or the hold voltage modified by an appropriate offset) and monitoring the current response to determine the direction of the current response. In this example, when the current response reaches a defined threshold, the device control system determines that it is now time to transition from the drive voltage to the hold voltage.

Figure 6A:
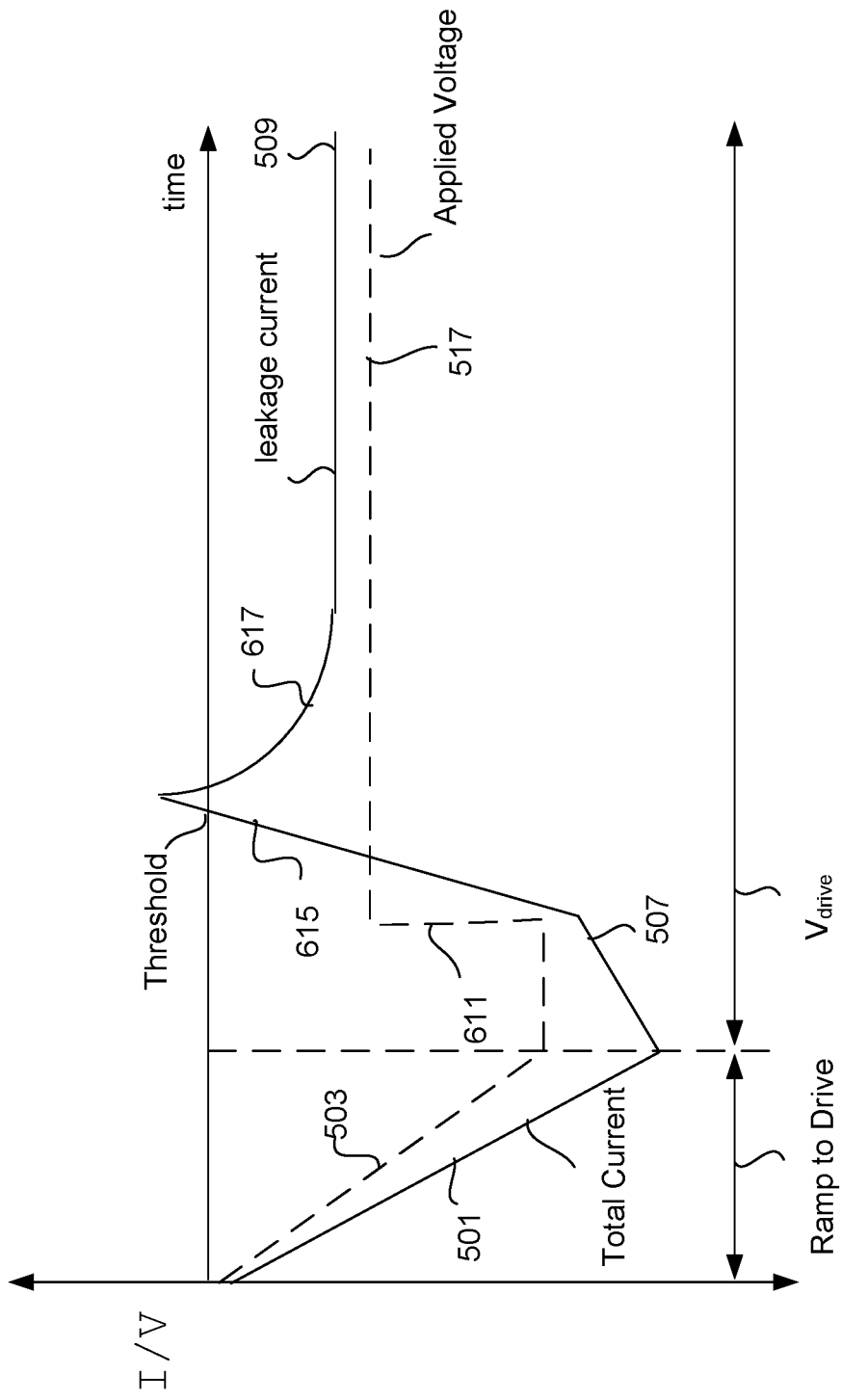
FIG. 6A is a graph depicting an optical transition in which a drop in applied voltage from $V_{drive}$ to $V_{hold}$ results in a net current flow establishing that the optical transition has proceeded far enough to permit the applied voltage to remain at $V_{hold}$ for the duration of the ending optical state.

FIG. 6A is a graph depicting an optical transition in which a drop in applied voltage from $V_{drive}$ to $V_{hold}$ results in a net current flow establishing that the optical transition has proceeded far enough to permit the applied voltage to remain at $V_{hold}$ for the duration of the ending optical state. This is illustrated by a voltage drop 611 in $V_{app}$ from $V_{drive}$ to $V_{hold}$. Voltage drop 611 is performed during a period when the $V_{app}$ might otherwise be constrained to remain in the drive phase shown in FIG. 5. The current flowing between the bus bars began dropping (becoming less negative), as illustrated by current segment 507, when the applied voltage initially stopped increasing (becoming more negative) and plateaued at $V_{drive}$. However, when the applied voltage now dropped at 611, the current began decreasing more readily as illustrated by current segment 615. In accordance with some embodiments, the level of current is measured after a defined period of time passes following the voltage drop 611. If the current is below a certain threshold, the optical transition is deemed complete, and the applied voltage may remain at $V_{hold}$ (or move to $V_{hold}$ if it is at some other level below $V_{drive}$). In the particular example of FIG. 6A, the current threshold is exceeded as illustrated. Therefore, the $V_{app}$ remains at $V_{hold}$ for the duration of the ending optical state. $V_{hold}$ may be selected for the ending optical state it provides. Such ending optical state may be a maximum, minimum, or intermediate optical state for the optical device undergoing the transition.

Figure 6B:
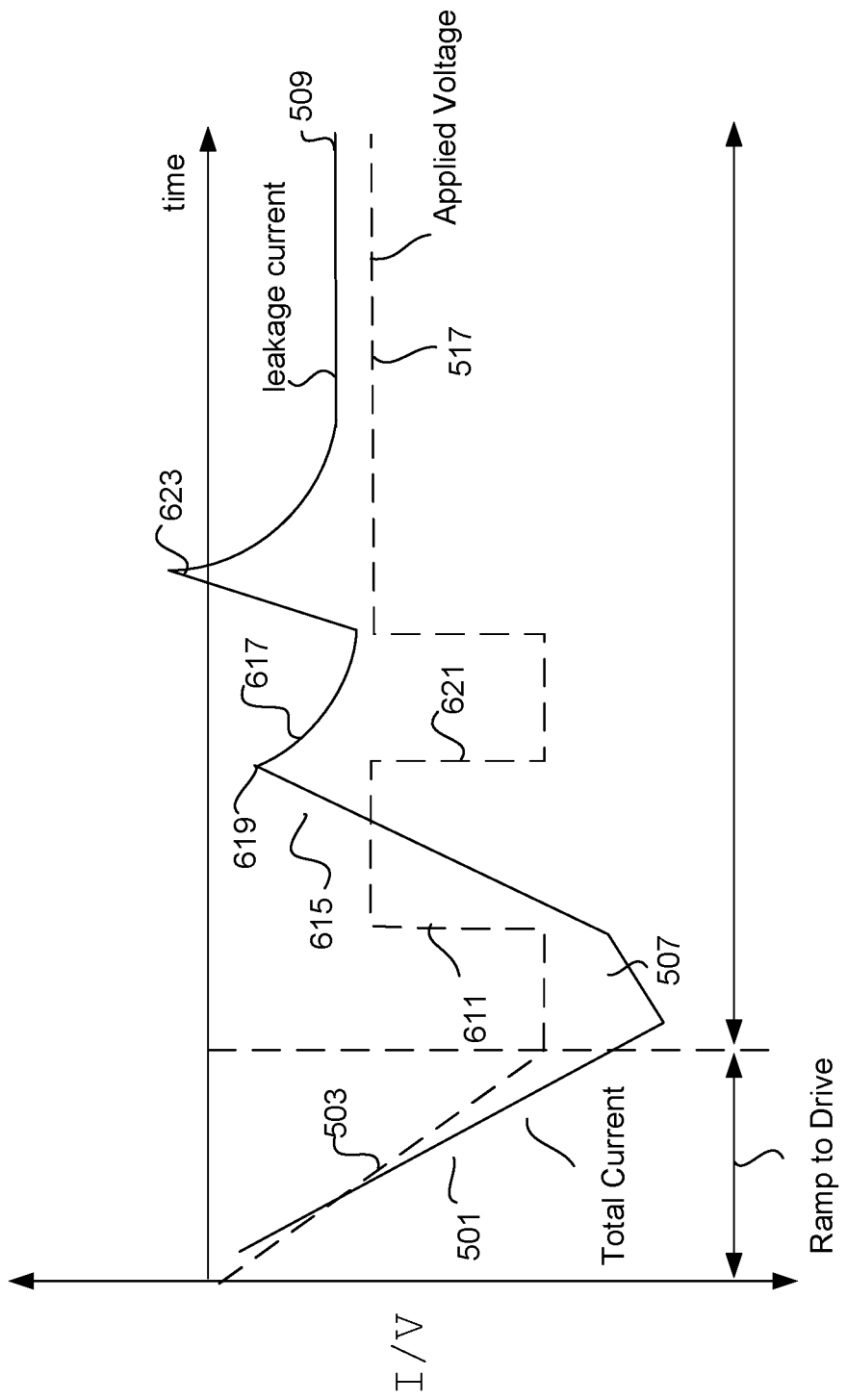
FIG. 6B is a graph depicting an optical transition in which an initial drop in applied voltage from $V_{drive}$ to $V_{hold}$ results in a net current flow indicating that the optical transition has not yet proceeded far enough to permit the applied voltage to remain at $V_{hold}$ for the duration of the ending optical state.

In situations where the current does not reach the threshold when measured, it may be appropriate to return $V_{app}$ to $V_{drive}$. FIG. 6B illustrates this situation. FIG. 6B is a graph depicting an optical transition in which an initial drop in applied voltage from $V_{drive}$ to $V_{hold}$ (see 611) results in a net current flow indicating that the optical transition has not yet proceeded far enough to permit the applied voltage to remain at $V_{hold}$ for the duration of the ending optical state. Note that current segment 615, which has a trajectory resulting from voltage drop 611, does not reach the threshold when probed at 619. Therefore the applied voltage is returned to $V_{drive}$ for a further period of time—while the current recovers at 617—before again dropping to $V_{hold}$ (621) at which point the resulting current (623) establishes that the optical transition has proceeded far enough to permit the applied voltage to remain at $V_{hold}$ for the duration of the ending optical state. As explained, the ending optical state may be a maximum, minimum, or intermediate optical state for the optical device undergoing the transition.

As explained, the hold voltage is a voltage that will maintain the optical device in equilibrium at a particular optical density or other optical condition. It produces a steady-state result by generating a current that offsets the leakage current in the ending optical state. The drive voltage is applied to speed the transition to a point where applying the hold voltage will result in a time invariant desired optical state.

The probing techniques described herein may be understood in terms of the physical mechanisms associated with an optical transition driven from bus bars at the edges of a device. Basically, the technique relies on differential values of the effective voltage experienced in the optically switchable device across the face of the device, and particularly the variation in $V_{eff}$ from the center of the device to the edge of the device. The local variation in potential on the transparent conductive layers results in different values of $V_{eff}$ across the face of the device. The value of $V_{eff}$ experienced by the optically switchable device near the bus bars is far greater the value of $V_{eff}$ in the center of the device. As a consequence, the local charge buildup in the region next to the bus bars is significantly greater than the charge buildup in the center the device.

At some point during the optical transition, the value of $V_{eff}$ at the edge of the device near the bus bars is sufficient to exceed the ending optical state desired for the optical transition whereas in the center of the device, the value of $V_{eff}$ is insufficient to reach that ending state. The ending state may be an optical density value associated with the endpoint in the optical transition. While in this intermediate stage of the optical transition, if the drive voltage is dropped to the hold voltage, the portion of the electrochromic device close to the bus bars will effectively try to transition back toward the state from which it started. However, as the device state in the center of the device has not yet reached the end state of the optical transition, when a hold voltage is applied, the center portion of the device will continue transitioning in the direction desired for the optical transition.

When the device in this intermediate stage of transition experiences the change in applied voltage from the drive voltage to the hold voltage (or some other suitably lower magnitude voltage), the portions of the device located near the bus bars—where the device is effectively overdriven—generate current flowing in the direction opposite that required to drive the transition. In contrast, the regions of the device in the center, which have not yet fully transitioned to the final state, continue to promote current flow in a direction required to drive the transition.

Over the course of the optical transition, and while the device is experiencing the applied drive voltage, there is a gradual increase in the driving force for causing current to flow in the reverse direction when the device is subject to a sudden drop in applied voltage. By monitoring the flow of current in response to perturbations away from drive voltage, one can determine a point at which the transition from the first state to the second state is sufficiently far along that a transition from drive voltage to hold voltage is appropriate. By "appropriate," it is meant that the optical transition is sufficiently complete from the edge of the device to the center of the device. Such transition can be defined in many ways depending upon the specifications of the product and its application. In one embodiment, it assumes that the transition from the first state to the second state is at least about 80% of complete or at least about 95% of complete. Complete reflecting the change in optical density from the first state to the second state. The desired level of completeness may correspond to a threshold current level as depicted in the examples of FIGS. 6A and 6B.

Many possible variations to the probing protocol exist. Such variations may include certain pulse protocols defined in terms of the length of time from the initiation of the transition to the first pulse, the duration of the pulses, the size of the pulses, and the frequency of the pulses.

In one embodiment, the pulse sequence is begun immediately upon the application of a drive voltage or a ramp to drive voltage that initiates the transition between the first optical state and second optical state. In other words, there would be no lag time between the initiation of the transition and the application of pulsing. In some implementations, the probe duration is sufficiently short (e.g., about 1 second or less) that probing back and forth between $V_{drive}$ and $V_{hold}$ for the entire transition is not significantly detrimental to switching time. However, in some embodiments, it is unnecessary to start probing right away. In some cases, switching is initiated after about 50% of an expected or nominal switching period is complete, or about 75% of such period is complete. Often, the distance between bus bars is known or can be read using an appropriately configured controller. With the distance known, a conservative lower limit for initiating probing may be implemented based on approximate known switching time. As an example, the controller may be configured to initiate probing after about 50-75% of expected switching duration is complete.

In some embodiments, the probing begins after about 30 seconds from initiating the optical transition. Relatively earlier probing may be especially helpful in cases where an interrupt command is received. An interrupt command is one that instructs the device to switch to a third optical transmission state when the device is already in the process of changing from a first to a second optical transmission state. In this case, early probing can help determine the direction of the transition (i.e., whether the interrupt command requires the window to become lighter or darker than when the command is received). Methods in which electrical feedback is used after receiving an interrupt command are further discussed below in the section regarding Controlling a Transition using Electrical Feedback to Transition to a Modified End State.

In some embodiments, the probing begins about 120 minutes (or about 30 minutes, about 60 minutes, or about 90 minutes) after initiating the optical transition. Relatively later probing may be more useful where larger windows are used, and where the transition occurs from an equilibrium state. For architectural glass, probing may begin about 30 seconds to 30 minutes after initiating the optical transition, in some cases between about 1-5 minutes, for example between about 1-3 minutes, or between about 10-30 minutes, or between about 20-30 minutes. In some embodiments, the probing begins about 1-5 minutes (e.g., about 1-3 minutes, about 2 minutes in a particular example) after initiating an optical transition through an interrupt command, while the probing begins about 10-30 minutes (e.g., about 20-30 minutes) after initiating an optical transition from an initial command given when the electrochromic device is in an equilibrium state.

In the examples of FIGS. 6A and 6B, the magnitude of the pulses is between the drive voltage value and the hold voltage value. This may be done for convenience. Other pulse magnitudes are possible. For example, the pulse may have a magnitude that falls within about +/−500 mV of the hold voltage, or within about +/−200 mV of the hold voltage. For context, an electrochromic device on a window, such as an architectural window, may have a drive voltage of about 0 V to +/−20 V (e.g., about +/−2 V to +/−10 V) and a hold voltage of about 0 V to +/−4 V (e.g., about +/−1 V to +/−2 V). In some embodiments, the hold voltage is between about +/−1 V to +/−1.5 V.

In various embodiments, the controller determines when during the optical transition the polarity of the probe current opposes the polarity of the bias due to the transition proceeding to a significant extent. In other words, the controller detects/determines when current to the bus bars flows in a direction opposite of what would be expected if the optical transition was still proceeding.

Probing by dropping the applied voltage magnitude from $V_{drive}$ to $V_{hold}$ provides a convenient, and broadly applicable, mechanism for monitoring the transition to determine when the probe current first reverses polarity. Probing by dropping the voltage to a magnitude other than that of $V_{hold}$ may involve characterization of window performance. It appears that even very large windows (e.g., about 60") essentially complete their optical transition when the current first opposes the transition upon probing from $V_{drive}$ to $V_{hold}$.

In certain cases, probing occurs by dropping the applied voltage magnitude from $V_{drive}$ to $V_{probe}$, where $V_{probe}$ is a probe voltage other than the hold voltage. For example, $V_{probe}$ may be $V_{hold}$ as modified by an offset. Although many windows are able to essentially complete their optical transitions when the current first opposes the transition after probing from $V_{drive}$ to $V_{hold}$, certain windows may benefit from pulsing to a voltage slightly offset from the hold voltage. In general, the offset becomes increasingly beneficial as the size of the window increases, and as the temperature of the window drops. In certain cases, the offset is between about 0-1 V, and the magnitude of $V_{probe}$ is between about 0-1 V higher than the magnitude of $V_{hold}$. For example, the offset may be between about 0-0.4 V. In these or other embodiments, the offset may be at least about 0.025 V, or at least about 0.05 V, or at least about 0.1 V. The offset may result in the transition having a longer duration than it otherwise would. The longer duration helps ensure that the optical transition is able to fully complete. Techniques for selecting an appropriate offset from the hold voltage are discussed further below in the context of a target open circuit voltage.

In some embodiments, the controller notifies a user or the window network master controller of how far (by, e.g., percentage) the optical transition has progressed. This may be an indication of what transmission level the center of the window is currently at. Feedback regarding transition may be provided to user interface in a mobile device or other computational apparatus. See e.g., PCT Patent Application No. US2013/036456 filed Apr. 12, 2013, which is incorporated herein by reference in its entirety.

The frequency of the probe pulsing may be between about 10 seconds and 500 seconds. As used in this context, the "frequency" means the separation time between the midpoints of adjacent pulses in a sequence of two or more pulses. Typically, the frequency of the pulsing is between about 10 seconds and 120 seconds. In certain embodiments, the frequency of the pulsing is between about 20 seconds and 30 seconds. In certain embodiments, the probe frequency is influenced by the size of the electrochromic device or the separation between bus bars in the device. In certain embodiments, the probe frequency is chosen as a function the expected duration of the optical transition. For example, the frequency may be set to be about $1/5^{th}$ to about $1/50^{th}$ (or about $1/10^{th}$ to about $1/30^{th}$) of the expected duration of the transition time. Note that transition time may correspond to the expected duration of $V_{app}=V_{drive}$. Note also that the expected duration of the transition may be a function of the size of the electrochromic device (or separation of bus bars). In one example, the duration for 14" windows is ~2.5 minutes, while the duration for 60" windows is ~40 minutes. In one example, the probe frequency is every 6.5 seconds for a 14" window and every 2 minutes for a 60" window.

In various implementations, the duration of each pulse is between about $1 \times 10^{-5}$ and 20 seconds. In some embodiments, the duration of the pulses is between about 0.1 and 20 seconds, for example between about 0.5 seconds and 5 seconds.

As indicated, in certain embodiments, an advantage of certain probing techniques disclosed herein is that only very little information need be pre-set with the controller that is responsible for controlling a window transition. Typically, such information includes only the hold voltage (and voltage offset, if applicable) associated for each optical end state. Additionally, the controller may specify a difference in voltage between the hold voltage and a drive voltage, or alternatively, the value of $V_{drive}$ itself. Therefore, for any chosen ending optical state, the controller would know the magnitudes of $V_{hold}$, $V_{offset}$ and $V_{drive}$. The duration of the drive voltage may be determined using the probing algorithm described here. In other words, the controller determines how to appropriately apply the drive voltage as a consequence of actively probing the extent of the transition in real time.

Figure 7A:
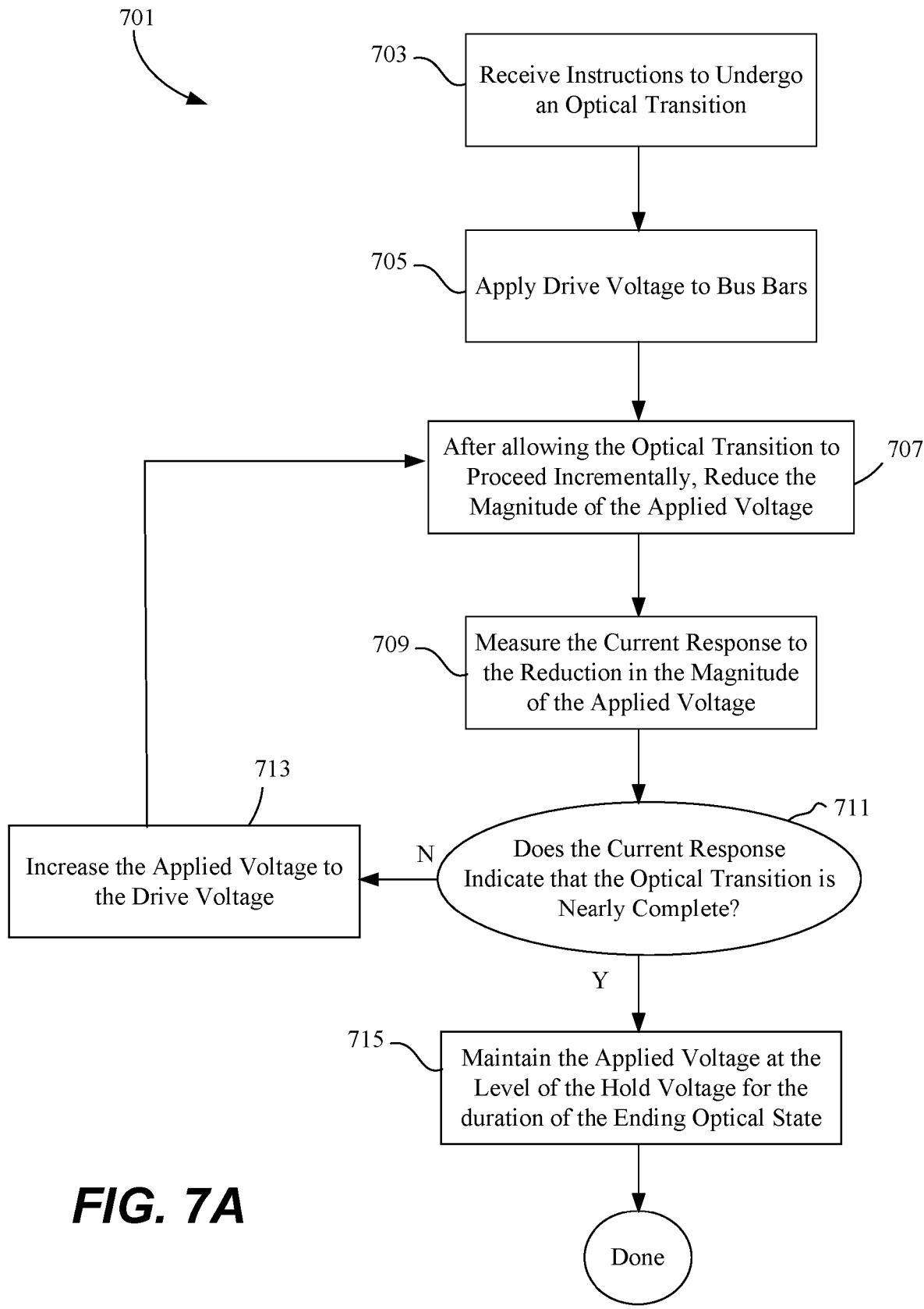
FIGS. 7A-7D are flow charts illustrating various methods for controlling an optical transition in an optically switchable device using electrical feedback.

FIG. 7A presents a flowchart 701 for a process of monitoring and controlling an optical transition in accordance with certain disclosed embodiments. As depicted, the process begins with an operation denoted by reference number 703, where a controller or other control logic receives instructions to direct the optical transition. As explained, the optical transition may be an optical transition between a tinted state and a more clear state of electrochromic device. The instructions for directing the optical transition may be provided to the controller based upon a preprogrammed schedule, an algorithm reacting to external conditions, manual input from a user, etc. Regardless of how the instructions originate, the controller acts on them by applying a drive voltage to the bus bars of the optically switchable device. See the operation denoted by reference number 705.

As explained above, in conventional embodiments, the drive voltage is applied to the bus bars for a defined period of time after which it is presumed that the optical transition is sufficiently complete that the applied voltage can be dropped to a hold voltage. In such embodiments, the hold voltage is then maintained for the duration of the pending optical state. In contrast, in accordance with embodiments disclosed herein, the transition from a starting optical state to an ending optical state is controlled by probing the condition of the optically switchable device one or more times during the transition. This procedure is reflected in operations 707, et seq. of FIG. 7A.

In operation 707, the magnitude of the applied voltage is dropped after allowing the optical transition to proceed for an incremental period of time. The duration of this incremental transition is significantly less than the total duration required to fully complete the optical transition. Upon dropping the magnitude of the applied voltage, the controller measures the response of the current flowing to the bus bars. See operation 709. The relevant controller logic may then determine whether the current response indicates that the optical transition is nearly complete. See decision 711. As explained above, the determination of whether an optical transition is nearly complete can be accomplished in various ways. For example, it may be determined by the current reaching a particular threshold. Assuming that the current response does not indicate that the optical transition is nearly complete, process control is directed to an operation denoted by reference number 713. In this operation, the applied voltage is returned to the magnitude of the drive voltage. Process controls then loops back to operation 707 where the optical transition is allowed to proceed by a further increment before again dropping the magnitude of the applied voltage to the bus bars.

At some point in the procedure 701, decision operation 711 determines that the current response indicates that the optical transition is in fact nearly complete. At this point, process control proceeds to an operation indicated by reference number 715, where the applied voltage is transitioned to or maintained at the hold voltage for the duration of the ending optical state. At this point, the process is complete.

Figure 7B:
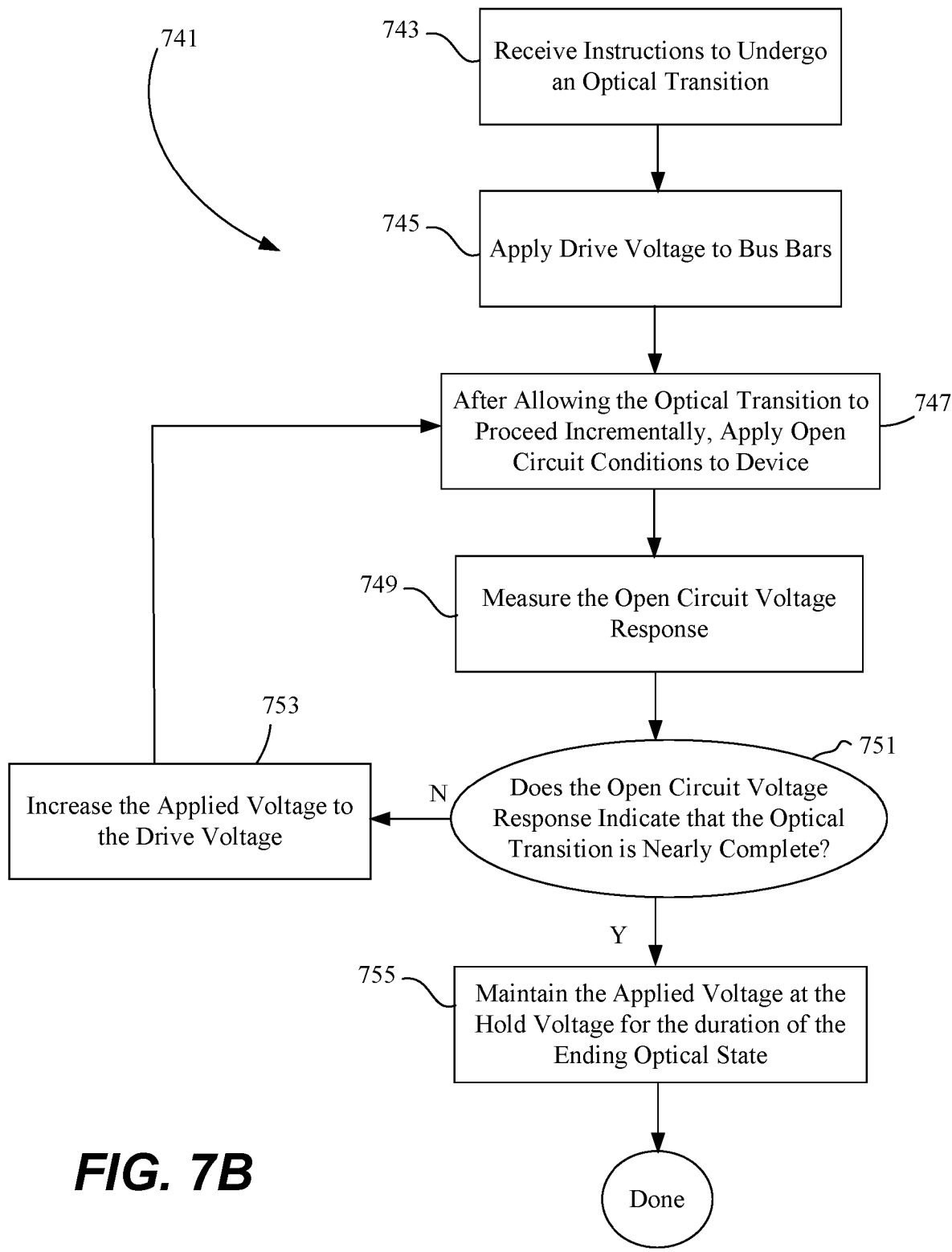

FIG. 7B presents a flowchart 701 for a process of monitoring and controlling an optical transition in accordance with certain disclosed embodiments. In this case, the process condition probed is the open circuit voltage, as described in the previous paragraph. The first two depicted operations in flowchart 741 correspond to the first two operations in flowcharts 701 and 721. In other words, operations 743 and 745 of flowchart 741 correspond to operations 703 and 705 of flowchart 701. Briefly, in operation 743, the controller or other appropriate logic receives instructions to undergo an optical transition. Then, at operation 745, the controller applies a drive voltage to the bus bars. After allowing the optical transition to proceed incrementally, the controller applies open circuit conditions to the electrochromic device at operation 747. Next, the controller measures the open circuit voltage response at operation 749.

As is the case above, the controller may measure the electronic response (in this case the open circuit voltage) after a defined period has passed since applying the open circuit conditions. Upon application of open circuit conditions, the voltage typically experiences an initial drop relating to the ohmic losses in external components connected to the electrochromic device. Such external components may be, for example, conductors and connections to the device. After this initial drop, the voltage experiences a first relaxation and settles at a first plateau voltage. The first relaxation relates to internal ohmic losses, for example over the electrode/electrolyte interfaces within the electrochromic devices. The voltage at the first plateau corresponds to the voltage of the cell, with both the equilibrium voltage and the overvoltages of each electrode. After the first voltage plateau, the voltage experiences a second relaxation to an equilibrium voltage. This second relaxation is much slower, for example on the order of hours. In some cases it is desirable to measure the open circuit voltage during the first plateau, when the voltage is relatively constant for a short period of time. This technique may be beneficial in providing especially reliable open circuit voltage readings. In other cases, the open circuit voltage is measured at some point during the second relaxation. This technique may be beneficial in providing sufficiently reliable open circuit readings while using less expensive and quick-operating power/control equipment.

In some embodiments, the open circuit voltage is measured after a set period of time after the open circuit conditions are applied. The optimal time period for measuring the open circuit voltage is dependent upon the distance between the bus bars. The set period of time may relate to a time at which the voltage of a typical or particular device is within the first plateau region described above. In such embodiments, the set period of time may be on the order of milliseconds (e.g., a few milliseconds in some examples). In other cases, the set period of time may relate to a time at which the voltage of a typical or particular device is experiencing the second relaxation described above. Here, the set period of time may be on the order of about 1 second to several seconds, in some cases. Shorter times may also be used depending on the available power supply and controller. As noted above, the longer times (e.g., where the open circuit voltage is measured during the second relaxation) may be beneficial in that they still provide useful open circuit voltage information without the need for high end equipment capable of operating precisely at very short timeframes.

In certain implementations, the open circuit voltage is measured/recorded after a timeframe that is dependent upon the behavior of the open circuit voltage. In other words, the open circuit voltage may be measured over time after open circuit conditions are applied, and the voltage chosen for analysis may be selected based on the voltage vs. time behavior. As described above, after application of open circuit conditions, the voltage goes through an initial drop, followed by a first relaxation, a first plateau, and a second relaxation. Each of these periods may be identified on a voltage vs. time plot based on the slope of curve. For example, the first plateau region will relate to a portion of the plot where the magnitude of $dV_{oc}/dt$ is relatively low. This may correspond to conditions in which the ionic current has stopped (or nearly stopped) decaying. As such, in certain embodiments, the open circuit voltage used in the feedback/analysis is the voltage measured at a time when the magnitude of $dV_{oc}/dt$ drops below a certain threshold.

Returning to FIG. 7B, after the open circuit voltage response is measured, it can be compared to a target open circuit voltage at operation 751. The target open circuit voltage may correspond to the hold voltage. In certain cases, discussed further below, the target open circuit voltage corresponds to the hold voltage as modified by an offset. Techniques for choosing an appropriate offset from the hold voltage are discussed further below. Where the open circuit voltage response indicates that the optical transition is not yet nearly complete (i.e., where the open circuit voltage has not yet reached the target open circuit voltage), the method continues at operation 753, where the applied voltage is increased to the drive voltage for an additional period of time. After the additional period of time has elapsed, the method can repeat from operation 747, where the open circuit conditions are again applied to the device. At some point in the method 741, it will be determined in operation 751 that the open circuit voltage response indicates that the optical transition is nearly complete (i.e., where the open circuit voltage response has reached the target open circuit voltage). When this is the case, the method continues at operation 755, where the applied voltage is maintained at the hold voltage for the duration of the ending optical state.

Figure 9A:
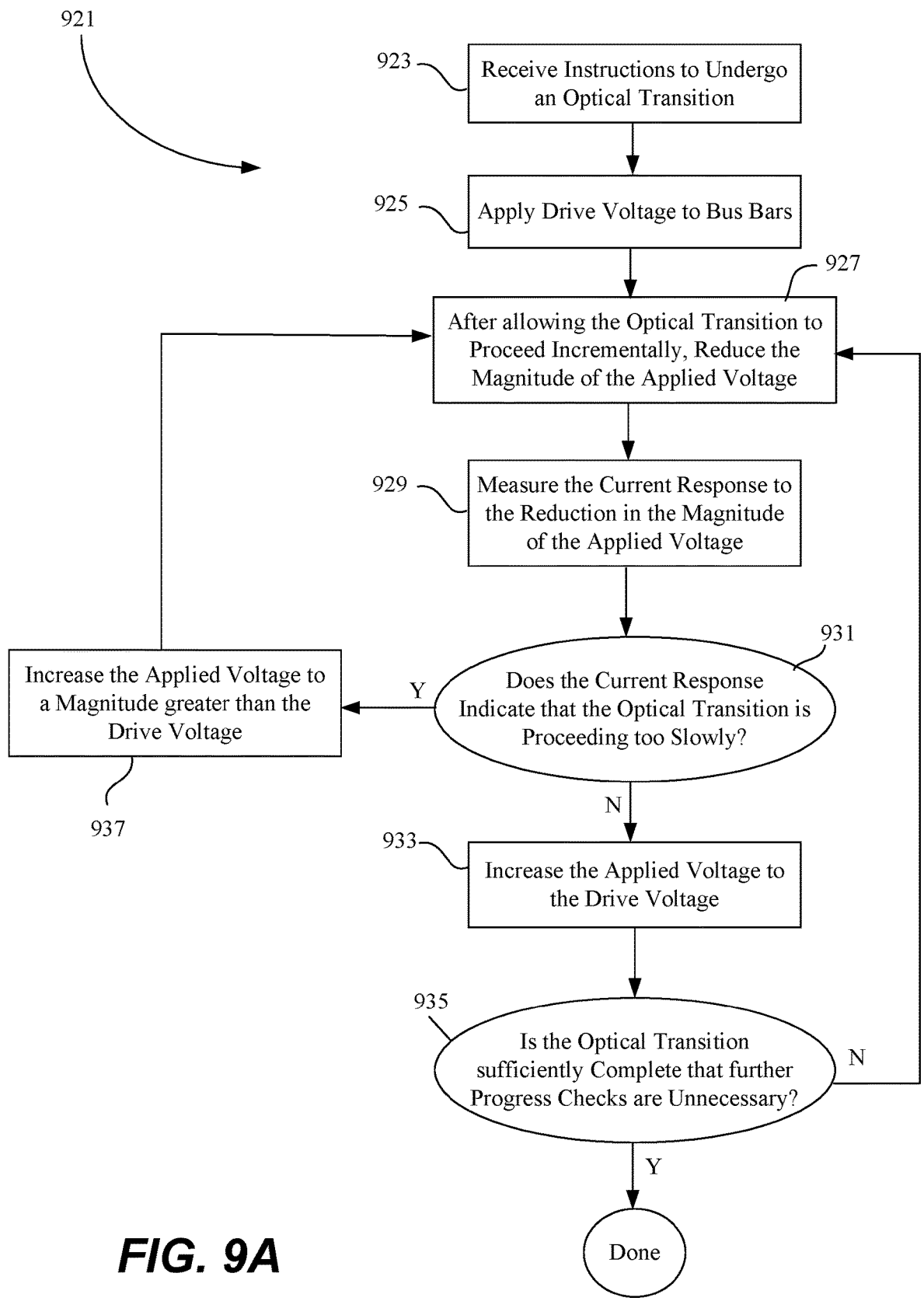
FIGS. 9A and 9B are flow charts depicting further methods for controlling an optical transition in an optically switchable device using electrical feedback.

The method 741 of FIG. 7B is very similar to the method 701 of FIG. 7A. The main difference is that in FIG. 7B, the relevant variable measured is the open circuit voltage, while in FIG. 7A, the relevant variable measured is the current response when a reduced voltage is applied. In another embodiment, discussed further below in the section regarding Controlling an Optical Transition using Electrical Feedback to Transition Within a Desired Timeframe, the method 921 of FIG. 9A is modified in the same way. In other words, the method 921 may be altered such that probing occurs by placing the device in open circuit conditions and measuring the open circuit voltage rather than a current response.

In another embodiment, the process for monitoring and controlling an optical transition takes into account the total amount of charge delivered to the electrochromic device during the transition, per unit area of the device. This quantity may be referred to as the delivered charge density or total delivered charge density. As such, an additional criterion such as the total charge density delivered may be used to ensure that the device fully transitions under all conditions.

The total delivered charge density may be compared to a threshold charge density (also referred to as a target charge density) to determine whether the optical transition is nearly complete. The threshold charge density may be chosen based on the minimum charge density required to fully complete or nearly complete the optical transition under the likely operating conditions. In various cases, the threshold charge density may be chosen/estimated based on the charge density required to fully complete or nearly complete the optical transition at a defined temperature (e.g., at about $-40°$ C., at about $-30°$ C., at about $-20°$ C., at about $-10°$ C., at about 0° C., at about 10° C., at about 20° C., at about 25° C., at about 30° C., at about 40° C., at about 60° C., etc.).

The optimum threshold charge density may also be affected by the leakage current of the electrochromic device. Devices that have higher leakage currents should have higher threshold charge densities. In some embodiments, an appropriate threshold charge density may be determined empirically for an individual window or window design. In other cases, an appropriate threshold may be calculated/selected based on the characteristics of the window such as the size, bus bar separation distance, leakage current, starting and ending optical states, etc. Example threshold charge densities range between about $1\times10^{-5}$ C/cm$^2$ and about 5 C/cm$^2$, for example between about $1\times10^{-4}$ and about 0.5 C/cm$^2$, or between about 0.005-0.05 C/cm$^2$, or between about 0.01-0.04 C/cm$^2$, or between about 0.01-0.02 in many cases. Smaller threshold charge densities may be used for partial transitions (e.g., fully clear to 25% tinted) and larger threshold charge densities may be used for full transitions. A first threshold charge density may be used for bleaching/clearing transitions, and a second threshold charge density may be used for coloring/tinting transitions. In certain embodiments, the threshold charge density is higher for tinting transitions than for clearing transitions. In a particular example, the threshold charge density for tinting is between about 0.013-0.017 C/cm$^2$, and the threshold charge density for clearing is between about 0.016-0.020 C/cm$^2$. Additional threshold charge densities may be appropriate where the window is capable of transitioning between more than two states. For instance, if the device switches between four different optical states: A, B, C, and D, a different threshold charge density may be used for each transition (e.g., A to B, A to C, A to D, B to A, etc.).

In some embodiments, the threshold charge density is determined empirically. For instance, the amount of charge required to accomplish a particular transition between desired end states may be characterized for devices of different sizes. A curve may be fit for each transition to correlate the bus bar separation distance with the required charge density. Such information may be used to determine the minimum threshold charge density required for a particular transition on a given window. In some cases, the information gathered in such empirical determinations is used to calculate an amount of charge density that corresponds to a certain level of change (increase or decrease) in optical density.

Figure 7C:
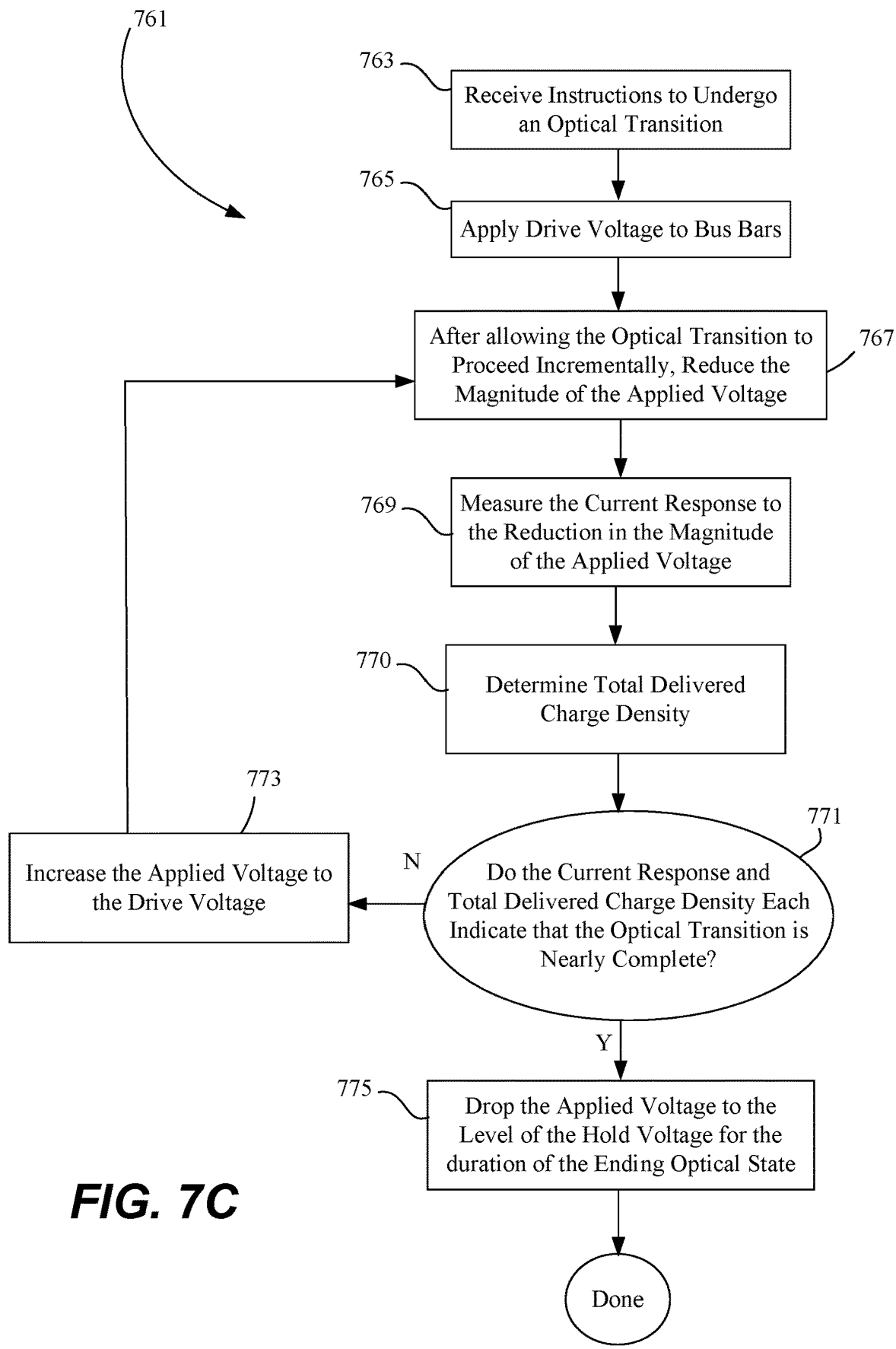

FIG. 7C presents a flow chart for a method 761 for monitoring and controlling an optical transition in an electrochromic device. The method starts at operations 763 and 765, which correspond to operations 703 and 705 of FIG. 7A. At 763, the controller or other appropriate logic receives instructions to undergo an optical transition. Then, at operation 765, the controller applies a drive voltage to the bus bars. After allowing the optical transition to proceed incrementally, the magnitude of the voltage applied to the bus bars is reduced to a probe voltage (which in some cases is the hold voltage, and in other cases is the hold voltage modified by an offset) at operation 767. Next at operation 769, the current response to the reduced applied voltage is measured.

Thus far, the method 761 of FIG. 7C is identical to the method 701 of FIG. 7A. However, the two methods diverge at this point in the process, with method 761 continuing at operation 770, where the total delivered charge density is determined. The total delivered charge density may be calculated based on the current delivered to the device during the optical transition, integrated over time. At operation 771, the relevant controller logic may determine whether the current response and total delivered charge density each indicate that the optical transition is nearly complete. As explained above, the determination of whether an optical transition is nearly complete can be accomplished in various ways. For example, it may be determined by the current reaching a particular threshold, and by the delivered charge density reaching a particular threshold. Both the current response and the total delivered charge density must indicate that the transition is nearly complete before the method can continue on at operation 775, where the applied voltage is transitioned to or maintained at the hold voltage for the duration of the ending optical state. Assuming at least one of the current response and total delivered charge density indicate that the optical transition is not yet nearly complete at operation 771, process control is directed to an operation denoted by reference number 773. In this operation, the applied voltage is returned to the magnitude of the drive voltage. Process control then loops back to operation 767 where the optical transition is allowed to proceed by a further increment before again dropping the magnitude of the applied voltage to the bus bars.

Figure 7D:
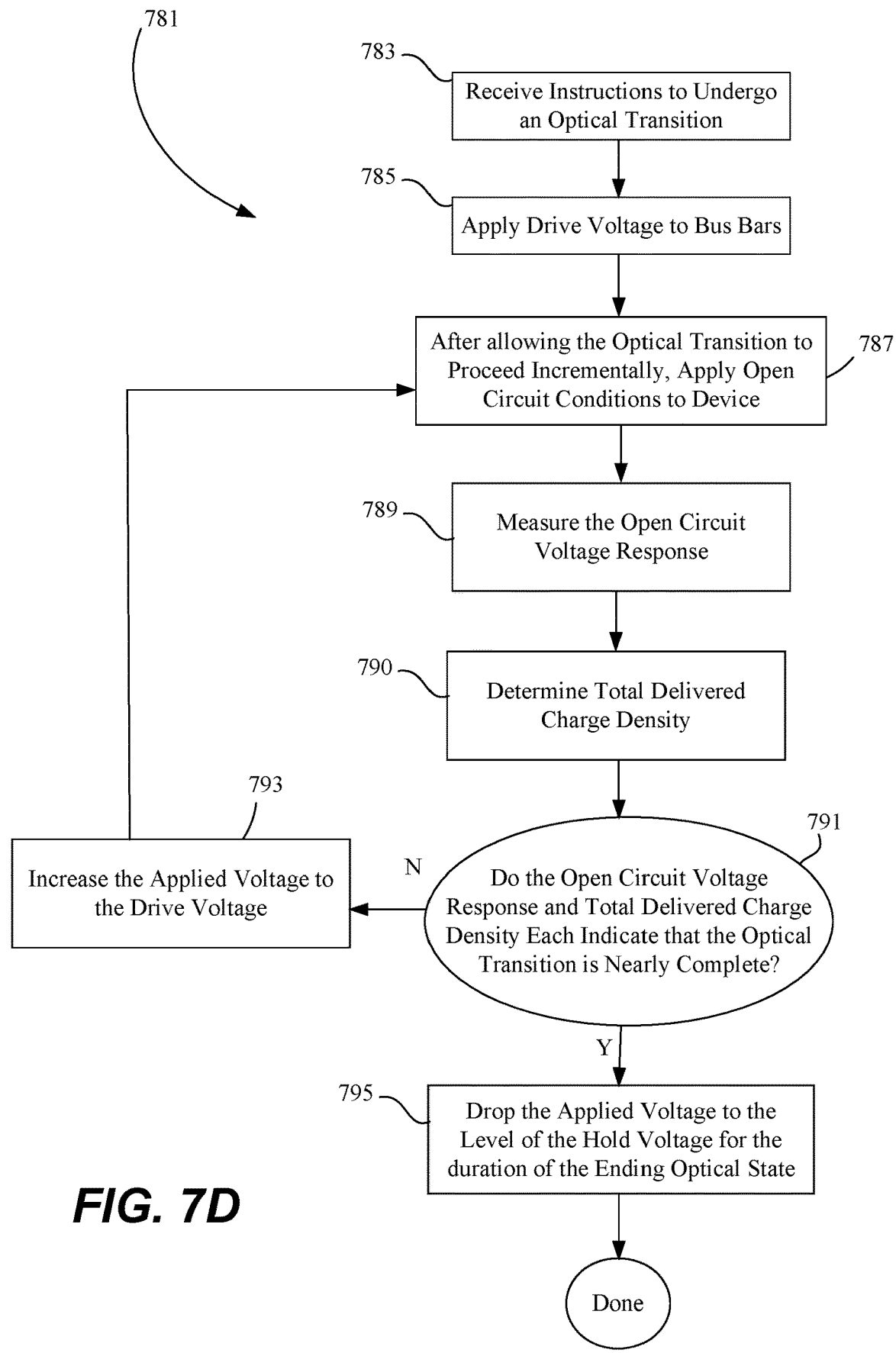

FIG. 7D presents an alternative method for monitoring and controlling an optical transition in an electrochromic device. The method starts at operations 783 and 785, which correspond to operations 703 and 705 of FIG. 7A. At 783, the controller or other appropriate logic receives instructions to undergo an optical transition. Then, at operation 785, the controller applies a drive voltage to the bus bars. After allowing the optical transition to proceed incrementally, open circuit conditions are applied to the device at operation 787. Next at operation 789, the open circuit voltage of the device is measured.

Thus far, the method 781 of FIG. 7D is identical to the method 741 of FIG. 7B. However, the two methods diverge at this point in the process, with method 781 continuing at operation 790, where the total delivered charge density is determined. The total delivered charge density may be calculated based on the current delivered to the device during the optical transition, integrated over time. At operation 791, the relevant controller logic may determine whether the open circuit voltage and total delivered charge density each indicate that the optical transition is nearly complete. Both the open circuit voltage response and the total delivered charge density must indicate that the transition is nearly complete before the method can continue on at operation 795, where the applied voltage is transitioned to or maintained at the hold voltage for the duration of the ending optical state. Assuming at least one of the open circuit voltage response and total delivered charge density indicate that the optical transition is not yet nearly complete at operation 791, process control is directed to an operation denoted by reference number 793. In this operation, the applied voltage is returned to the magnitude of the drive voltage. Process control then loops back to operation 787 where the optical transition is allowed to proceed by a further increment before again applying open circuit conditions to the device. The method 781 of FIG. 7D is very similar to the method 761 of FIG. 7C. The principal difference between the two embodiments is that in FIG. 7C, the applied voltage drops and a current response is measured, whereas in FIG. 7D, open circuit conditions are applied and an open circuit voltage is measured.

In certain implementations, the method involves using a static offset to the hold voltage. This offset hold voltage may be used to probe the device and elicit a current response, as described in relation to FIGS. 7A and 7C, for instance. The offset hold voltage may also be used as a target open circuit voltage, as described in relation to FIGS. 7B and 7D. In certain cases, particularly for windows with a large separation between the bus bars (e.g., at least about 25"), the offset can be beneficial in ensuring that the optical transition proceeds to completion across the entire window.

In many cases, an appropriate offset is between about 0-0.5 V (e.g., about 0.1-0.4 V, or between about 0.1-0.2 V). Typically, the magnitude of an appropriate offset increases with the size of the window. An offset of about 0.2 V may be appropriate for a window of about 14 inches, and an offset of about 0.4 V may be appropriate for a window of about 60 inches. These values are merely examples and are not intended to be limiting. In some embodiments, a window controller is programmed to use a static offset to $V_{hold}$. The magnitude and in some cases direction of the static offset may be based on the device characteristics such as the size of the device and the distance between the bus bars, the driving voltage used for a particular transition, the leakage current of the device, the peak current density, capacitance of the device, etc. In various embodiments, the static offset is determined empirically. In some designs, it is calculated dynamically, when the device is installed or while it is installed and operating, from monitored electrical and/or optical parameters or other feedback.

In other embodiments, a window controller may be programmed to dynamically calculate the offset to $V_{hold}$. In one implementation, the window controller dynamically calculates the offset to $V_{hold}$ based on one or more of the device's current optical state (OD), the current delivered to the device (I), the rate of change of current delivered to the device (dI/dt), the open circuit voltage of the device ($V_{oc}$), and the rate of change of the open circuit voltage of the device ($dV_{oc}/dt$). This embodiment is particularly useful because it does not require any additional sensors for controlling the transition. Instead, all of the feedback is generated by pulsing the electronic conditions and measuring the electronic response of the device. The feedback, along with the device characteristics mentioned above, may be used to calculate the optimal offset for the particular transition occurring at that time. In other embodiments, the window controller may dynamically calculate the offset to $V_{hold}$ based on certain additional parameters. These additional parameters may include the temperature of the device, ambient temperature, and signals gathered by photoptic sensors on the window. These additional parameters may be helpful in achieving uniform optical transitions at different conditions. However, use of these additional parameters also increases the cost of manufacture due to the additional sensors required.

The offset may be beneficial in various cases due to the non-uniform quality of the effective voltage, $V_{eff}$, applied across the device. The non-uniform $V_{eff}$ is shown in FIG. 4C, for example, described above. Because of this non-uniformity, the optical transition does not occur in a uniform manner. In particular, areas near the bus bars experience the greatest $V_{eff}$ and transition quickly, while areas removed from the bus bars (e.g., the center of the window) experience the lowest $V_{eff}$ and transition more slowly. The offset can help ensure that the optical transition proceeds to completion at the center of the device where the change is slowest.

Figure 8A:
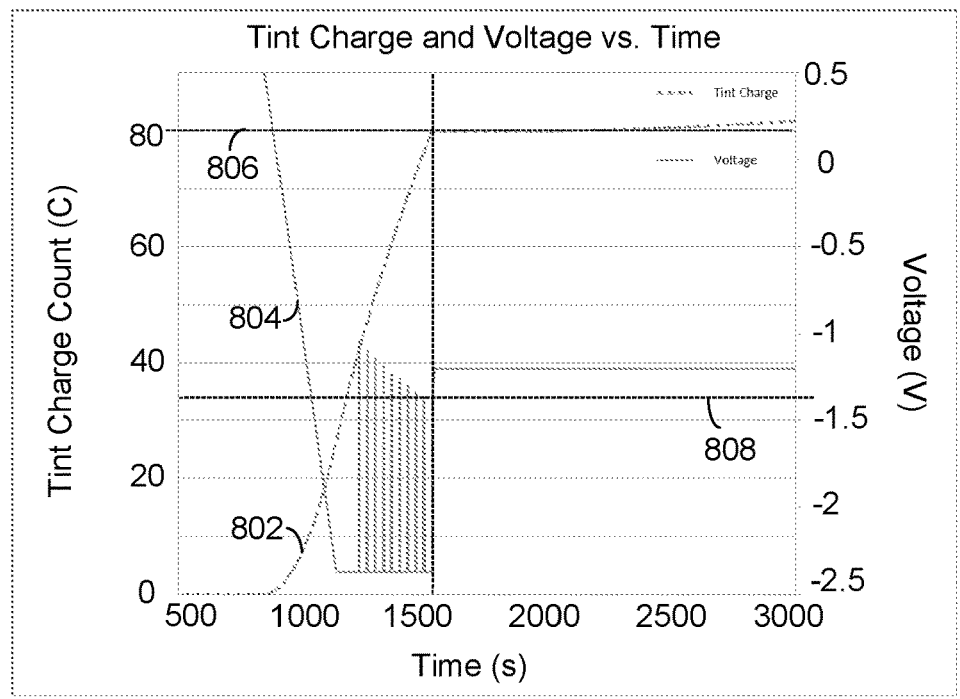
FIGS. 8A and 8B show graphs depicting the total charge delivered over time and the voltage applied over time during an electrochromic transition when using the method of FIG. 7D to probe and monitor the progress of the transition.
Figure 8B:
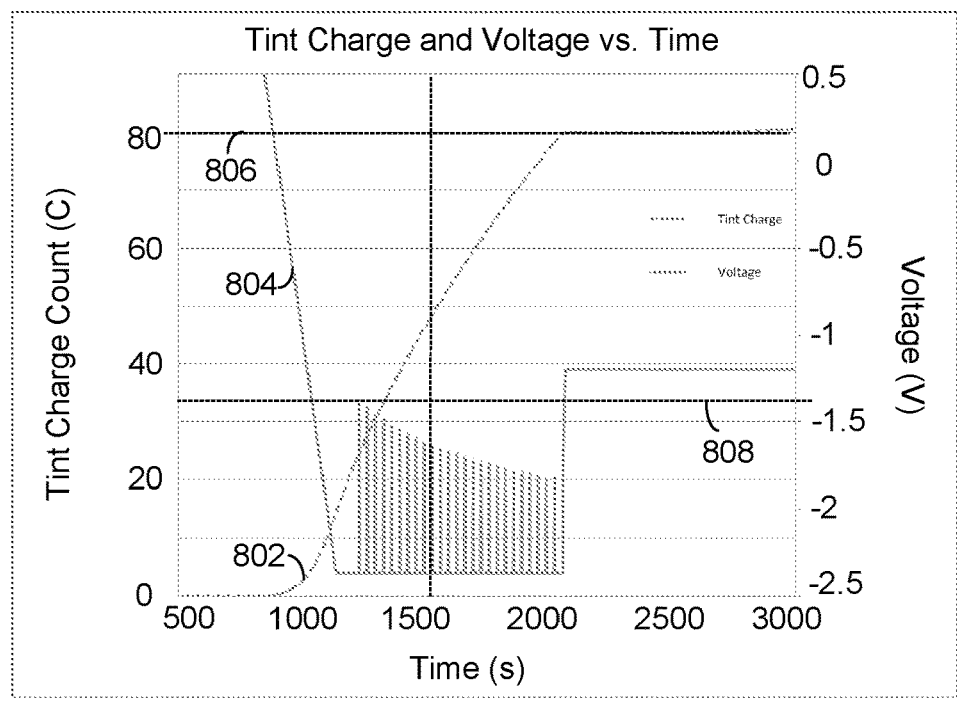

FIGS. 8A and 8B show graphs depicting the total charge delivered over time and the applied voltage over time during two different electrochromic tinting transitions. The window in each case measured about 24×24 inches. The total charge delivered is referred to as the Tint Charge Count, and is measured in coulombs (C). The total charge delivered is presented on the left hand y-axis of each graph, and the applied voltage is presented on the right hand y-axis of each graph. In each figure, line 802 corresponds to the total charge delivered and line 804 corresponds to the applied voltage. Further, line 806 in each graph corresponds to a threshold charge (the threshold charge density multiplied by the area of the window), and line 808 corresponds to a target open circuit voltage. The threshold charge and target open circuit voltage are used in the method shown in FIG. 7D to monitor/control the optical transition.

The voltage curves 804 in FIGS. 8A and 8B each start out with a ramp to drive component, where the magnitude of the voltage ramps up to the drive voltage of about −2.5V. After an initial period of applying the drive voltage, the voltage begins to spike upwards at regular intervals. These voltage spikes occur when the electrochromic device is being probed. As described in FIG. 7D, the probing occurs by applying open circuit conditions to the device. The open circuit conditions result in an open circuit voltage, which correspond to the voltage spikes seen in the graphs. Between each probe/open circuit voltage, there is an additional period where the applied voltage is the drive voltage. In other words, the electrochromic device is driving the transition and periodically probing the device to test the open circuit voltage and thereby monitor the transition. The target open circuit voltage, represented by line 808, was selected to be about −1.4V for each case. The hold voltage in each case was about −1.2V. Thus, the target open circuit voltage was offset from the hold voltage by about 0.2V.

In the transition of FIG. 8A, the magnitude of the open circuit voltage exceeds the magnitude of the target open circuit voltage at about 1500 seconds. Because the relevant voltages in this example are negative, this is shown in the graph as the point at which the open circuit voltage spikes first fall below the target open circuit voltage. In the transition of FIG. 8B, the magnitude of the open circuit voltage exceeds the magnitude of the target open circuit voltage sooner than in FIG. 8A, around 1250 seconds.

The total delivered charge count curves 802 in FIGS. 8A and 8B each start at 0 and rise monotonically. In the transition of FIG. 8A, the delivered charge reaches the threshold charge at around 1500 seconds, which was very close to the time at which the target open circuit voltage was met. Once both conditions were met, the voltage switched from the drive voltage to the hold voltage, around 1500 seconds. In the transition of FIG. 8B, the total delivered charge took about 2100 seconds to reach the charge threshold, which is about 14 minutes longer than it took the voltage to reach the target voltage for this transition. After both the target voltage and threshold charge are met, the voltage is switched to the hold voltage. The additional requirement of the total charge delivered results in the FIG. 8B case driving the transition at the drive voltage for a longer time than might otherwise be used. This helps ensure full and uniform transitions across many window designs at various environmental conditions.

In another embodiment, the optical transition is monitored through voltage sensing pads positioned directly on the transparent conductive layers (TCLs). This allows for a direct measurement of the $V_{eff}$ at the center of the device, between the bus bars where $V_{eff}$ is at a minimum. In this case, the controller indicates that the optical transition is complete when the measured $V_{eff}$ at the center of the device reaches a target voltage such as the hold voltage. In various embodiments, the use of sensors may reduce or eliminate the benefit from using a target voltage that is offset from the hold voltage. In other words, the offset may not be needed and the target voltage may equal the hold voltage when the sensors are present. Where voltage sensors are used, there should be at least one sensor on each TCL. The voltage sensors may be placed at a distance mid-way between the bus bars, typically off to a side of the device (near an edge) so that they do not affect (or minimally affect) the viewing area. The voltage sensors may be hidden from view in some cases by placing them proximate a spacer/separator and/or frame that obscures the view of the sensor.

Figure 8C:
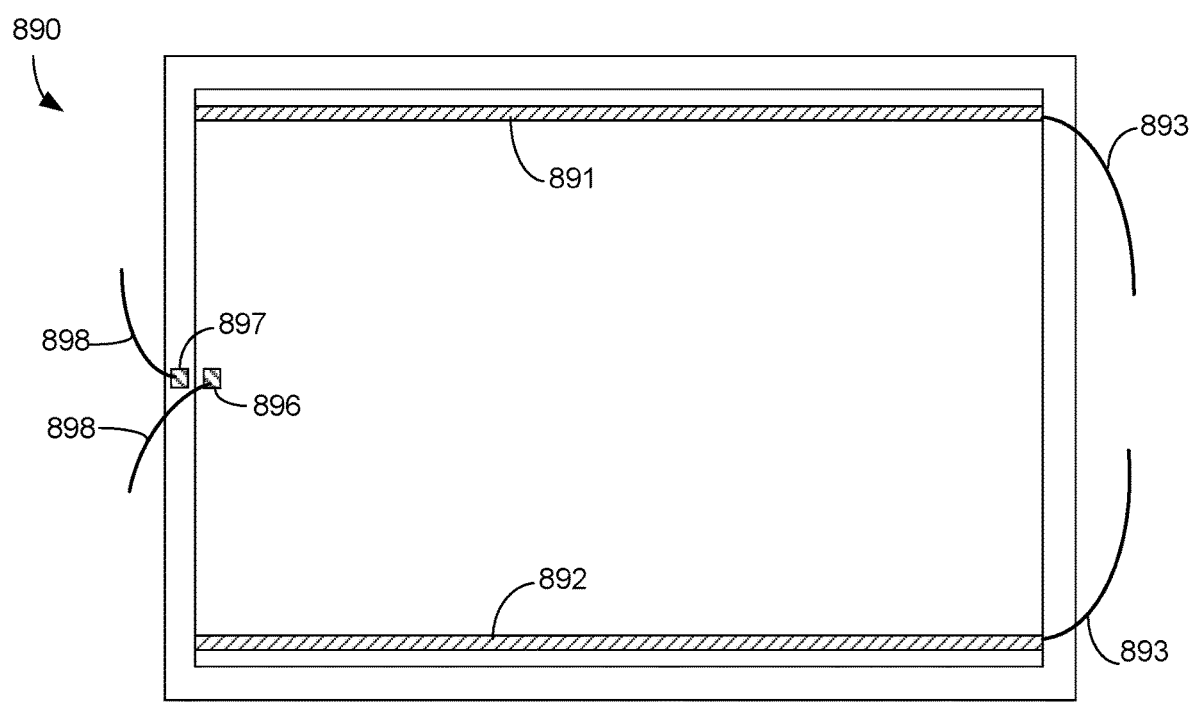
FIG. 8C illustrates an electrochromic window having a pair of voltage sensors on the transparent conductive oxide layers according to an embodiment.

FIG. 8C presents an embodiment of an EC window 890 that utilizes sensors to directly measure the effective voltage at the center of the device. The EC window 890 includes top bus bar 891 and bottom bus bar 892, which are connected by wires 893 to a controller (not shown). Voltage sensor 896 is placed on the top TCL, and voltage sensor 897 is placed on the bottom TCL. The sensors 896 and 897 are placed at a distance mid-way between the bus bars 891 and 892, though they are off to the side of the device. In some cases the voltage sensors may be positioned such that they reside within a frame of the window. This placement helps hide the sensors and promote optimal viewing conditions. The voltage sensors 896 and 897 are connected to the controller through wires 898. The wires 893 and 898 may pass under or through a spacer/separator placed and sealed in between the panes (also referred to as lites) of the window. The window 890 shown in FIG. 8C may utilize any of the methods described herein for controlling an optical transition.

In some implementations, the voltage sensing pads may be conductive tape pads. The pads may be as small as about 1 $mm^2$ in some embodiments. In these or other cases, the pads may be about 10 $mm^2$ or less. A four wire system may be used in embodiments utilizing such voltage sensing pads.

Controlling a Transition Using Electrical Feedback to Transition within a Desired Timeframe Separately, in some implementations, the method or controller may specify a total duration of the transition. In such implementations, the controller may be programmed to use a modified probing algorithm to monitor the progress of the transition from the starting state to the end state. The progress can be monitored by periodically reading a current value in response to a drop in the applied voltage magnitude such as with the probing technique described above. The probing technique may also be implemented using a drop in applied current (e.g., measuring the open circuit voltage). The current or voltage response indicates how close to completion the optical transition has come. In some cases, the response is compared to a threshold current or voltage for a particular time (e.g., the time that has elapsed since the optical transition was initiated). In some embodiments, the comparison is made for a progression of the current or voltage responses using sequential pulses or checks. The steepness of the progression may indicate when the end state is likely to be reached. A linear extension to this threshold current may be used to predict when the transition will be complete, or more precisely when it will be sufficiently complete that it is appropriate to drop the drive voltage to the hold voltage.

With regard to algorithms for ensuring that the optical transition from first state to the second state occurs within a defined timeframe, the controller may be configured or designed to increase the drive voltage as appropriate to speed up the transition when the interpretation of the pulse responses suggests that the transition is not progressing fast enough to meet the desired speed of transition. In certain embodiments, when it is determined that the transition is not progressing sufficiently fast, the transition switches to a mode where it is driven by an applied current. The current is sufficiently great to increase the speed of the transition but is not so great that it degrades or damages the electrochromic device. In some implementations, the maximum suitably safe current may be referred to as $I_{safe}$. Examples of $I_{safe}$ may range between about 5 and 250 µA/cm$^2$. In current controlled drive mode, the applied voltage is allowed to float during the optical transition. Then, during this current controlled drive step, could the controller periodically probes by, e.g., dropping to the hold voltage and checking for completeness of transition in the same way as when using a constant drive voltage.

In general, the probing technique may determine whether the optical transition is progressing as expected. If the technique determines that the optical transition is proceeding too slowly, it can take steps to speed the transition. For example, it can increase the drive voltage. Similarly, the technique may determine that the optical transition is proceeding too quickly and risks damaging the device. When such determination is made, the probing technique may take steps to slow the transition. As an example, the controller may reduce the drive voltage.

In some applications, groups of windows are set to matching transition rates by adjusting the voltage and/or driving current based on the feedback obtained during the probing (by pulse or open circuit measurements). In embodiments where the transition is controlled by monitoring the current response, the magnitude of the current response may be compared from controller to controller (for each of the group of windows) to determine how to scale the driving potential or driving current for each window in the group. The rate of change of open circuit voltage could be used in the same manner.

FIG. 9A presents a flowchart 921 depicting an example process for ensuring that the optical transition occurs sufficiently fast, e.g., within a defined time period. The first four depicted operations in flowchart 921 correspond to the first four operations in flowchart 701. In other words, operation 923, 925, 927, and 929 of flowchart 921 correspond to operations 703, 705, 707, and 709 of flowchart 701 from FIG. 7A. Briefly, in operation 923, the controller or other appropriate logic receives instructions to undergo an optical transition. Then, at operation 925, the controller applies a drive voltage to the bus bars. After allowing the optical transition to proceed incrementally, the controller drops the magnitude of the applied voltage to the bus bars. See operation 927. The magnitude of the lower voltage is typically, though not necessarily, the hold voltage. As mentioned, the lower voltage may also be the hold voltage as modified by an offset (the offset often falling between about 0-1V, for example between about 0-0.4V in many cases). Next, the controller measures the current response to the applied voltage drop. See operation 929.

The controller next determines whether the current response indicates that the optical transition is proceeding too slowly. See decision 931. As explained, the current response may be analyzed in various ways determine whether the transition is proceeding with sufficient speed. For example, the magnitude of the current response may be considered or the progression of multiple current responses to multiple voltage pulses may be analyzed to make this determination.

Assuming that operation 931 establishes that the optical transition is proceeding rapidly enough, the controller then increases the applied voltage back to the drive voltage. See operation 933. Thereafter, the controller then determines whether the optical transition is sufficiently complete that further progress checks are unnecessary. See operation 935. In certain embodiments, the determination in operation 935 is made by considering the magnitude of the current response as discussed in the context of FIG. 7A. Assuming that the optical transition is not yet sufficiently complete, process control returns to operation 927, where the controller allows the optical transition to progress incrementally further before again dropping the magnitude of the applied voltage.

Assuming that execution of operation 931 indicates that the optical transition is proceeding too slowly, process control is directed to an operation 937 where the controller increases the magnitude of the applied voltage to a level that is greater than the drive voltage. This over drives the transition and hopefully speeds it along to a level that meets specifications. After increasing the applied voltage to this level, process control is directed to operation 927 where the optical transition continues for a further increment before the magnitude of the applied voltage is dropped. The overall process then continues through operation 929, 931, etc. as described above. At some point, decision 935 is answered in the affirmative and the process is complete. In other words, no further progress checks are required. The optical transition then completes as illustrated in, for example, flowchart 701 of FIG. 7A.

In certain embodiments, the method 921 may be altered such that probing occurs by placing the device in open circuit conditions and measuring the open circuit voltage rather than measuring a current response. In some embodiments, the method 921 may be modified by including an additional charge counting and comparison step, as presented in operations 770/771 of FIG. 7C and operations 790/791 of FIG. 7D.

Controlling a Transition Using Electrical Feedback to Transition to a Modified End State Another application of the probing techniques disclosed herein involves on-the-fly modification of the optical transition to a different end state. In some cases, it will be necessary to change the end state after a transition begins. Examples of reasons for such modification include a user's manual override a previously specified end tint state and a wide spread electrical power shortage or disruption. In such situations, the initially set end state might be transmissivity=40% and the modified end state might be transmissivity=5%.

Where an end state modification occurs during an optical transition, the probing techniques disclosed herein can adapt and move directly to the new end state, rather than first completing the transition to the initial end state.

In some implementations, the transition controller/method detects the current state of the window using a voltage/current sense as disclosed herein and then moves to a new drive voltage immediately. The new drive voltage may be determined based on the new end state and optionally the time allotted to complete the transition. If necessary, the drive voltage is increased significantly to speed the transition or drive a greater transition in optical state. The appropriate modification is accomplished without waiting for the initially defined transition to complete. The probing techniques disclosed herein provide a way to detect where in the transition the device is and make adjustments from there.

Figure 9B:
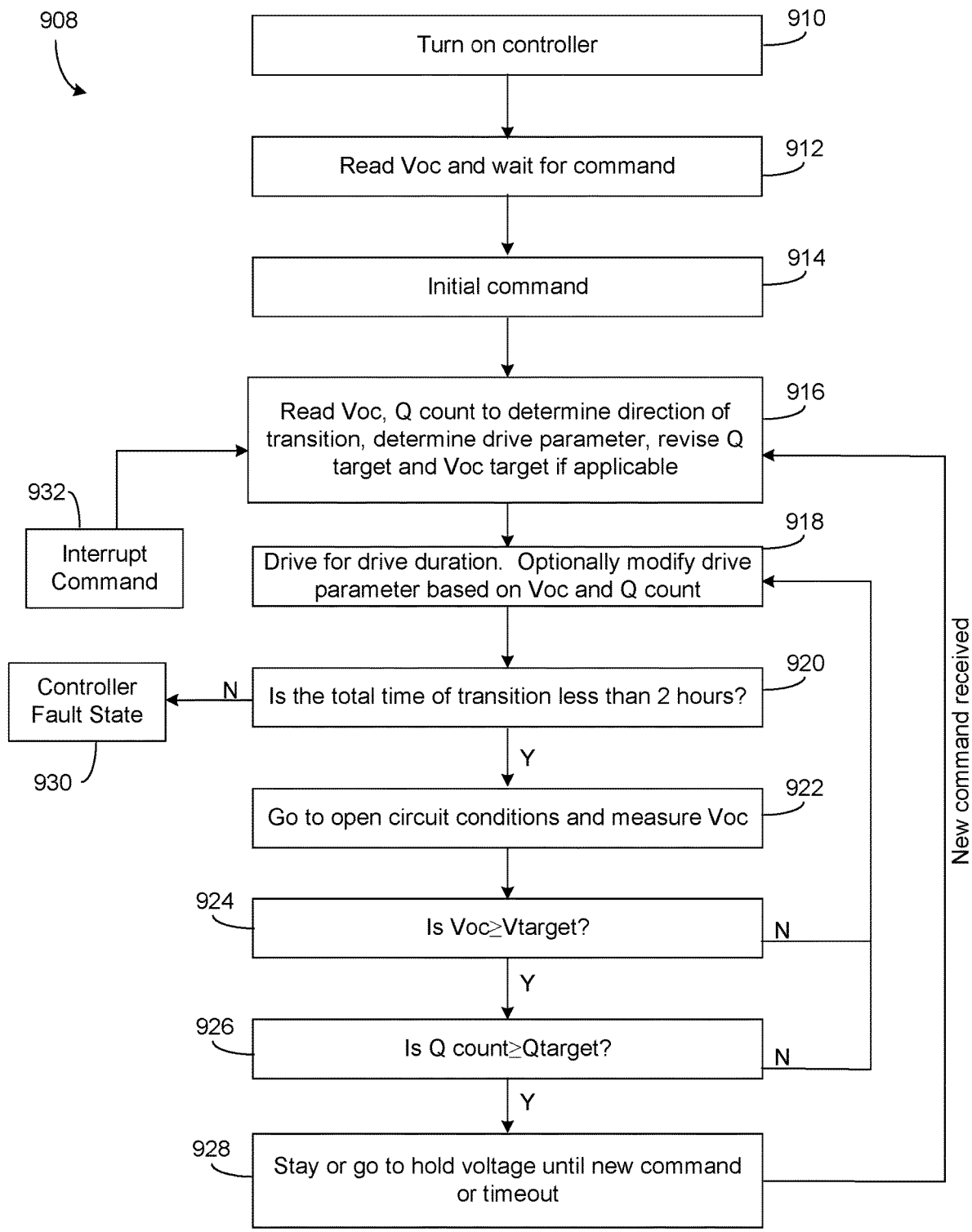

FIG. 9B illustrates a flowchart for a method 908 for controlling an optical transition in an electrochromic device. The method 908 of FIG. 9B is similar to the method 781 of FIG. 7D in that both methods involve measuring an open circuit voltage and charge count, which are used as feedback to control the transition. The method 908 begins at operation 910 where the controller is turned on. Next, at operation 912, the open circuit voltage ($V_{oc}$) is read and the device waits for an initial command. An initial command is received at operation 914, the command indicating that the window should switch to a different optical state. After the command is received, open circuit conditions are applied and the open circuit voltage is measured at operation 916. The amount of charge delivered (Q) may also be read at block 916. These parameters determine the direction of the transition (whether the window is supposed to get more tinted or more clear), and impact the optimal drive parameter. An appropriate drive parameter (e.g., drive voltage) is selected at operation 916. This operation may also involve revising the target charge count and target open circuit voltage, particularly in cases where an interrupt command is received, as discussed further below.

After the open circuit voltage is read at operation 916, the electrochromic device is driven for a period of time. The drive duration may be based on the busbar separation distance in some cases. In other cases, a fixed drive duration may be used, for example about 30 seconds. This driving operation may involve applying a drive voltage or current to the device. Operation 918 may also involve modifying a drive parameter based on the sensed open circuit voltage and/or charge count. Next, at operation 920, it is determined whether the total time of the transition (thus far) is less than a threshold time. The threshold time indicated in FIG. 9B is 2 hours, though other time periods may be used as appropriate. If it is determined that the total time of transition is not less than the threshold time (e.g., where the transition has taken at least 2 hours and is not yet complete), the controller may indicate that it is in a fault state at operation 930. This may indicate that something has caused an error in the transition process. Otherwise, where the total time of transition is determined to be less than the threshold time, the method continues at operation 922. Here, open circuit conditions are again applied, and the open circuit voltage is measured. At operation 924, it is determined whether the measured open circuit voltage is greater than or equal to the target voltage (in terms of magnitude). If so, the method continues at operation 926, where it is determined whether the charge count (Q) is greater than or equal to the target charge count. If the answer in either of operations 924 or 926 is no, the method returns to block 918 where the electrochromic device transition is driven for an additional drive duration. Where the answer in both of operations 924 and 926 is yes, the method continues at operation 928, where a hold voltage is applied to maintain the electrochromic device in the desired tint state. Typically, the hold voltage continues to be applied until a new command is received, or until a timeout is experienced.

When a new command is received after the transition is complete, the method may return to operation 916. Another event that can cause the method to return to operation 916 is receiving an interrupt command, as indicated in operation 932. An interrupt command may be received at any point in the method after an initial command is received at operation 914 and before the transition is essentially complete at operation 928. The controller should be capable of receiving multiple interrupt commands over a transition. One example interrupt command involves a user directing a window to change from a first tint state (e.g., fully clear) to a second tint state (e.g., fully tinted), then interrupting the transition before the second tint state is reached to direct the window to change to a third tint state (e.g., half tinted) instead of the second tint state. After receiving a new command or an interrupt command, the method returns to block 916 as indicated above. Here, open circuit conditions are applied and the open circuit voltage and charge count are read. Based on the open circuit voltage and charge count readings, as well as the desired third/final tint state, the controller is able to determine appropriate drive conditions (e.g., drive voltage, target voltage, target charge count, etc.) for reaching the third tint state. For instance, the open circuit voltage/charge count may be used to indicate in which direction the transition should occur. The charge count and charge target may also be reset after receiving a new command or an interrupt command. The updated charge count may relate to the charge delivered to move from the tint state when the new/interrupt command is received to the desired third tint state. Because the new command/interrupt command will change the starting and ending points of the transition, the target open circuit voltage and target charge count may need to be revised. This is indicated as an optional part of operation 916, and is particularly relevant where a new or interrupt command is received.

In a related embodiment, the method 908 may be altered such that probing occurs by dropping the magnitude of the applied voltage and measuring a current response, rather than applying open circuit conditions and measuring an open circuit voltage in operations 922 and 924. In another related embodiment, the method 908 may be altered such that probing does not involve reading a charge count (e.g., operation 926 is omitted) or using such charge count as feedback. In these embodiments, probing may involve either measuring a current response after an applied voltage is reduced, or measuring an open circuit voltage after open circuit conditions are applied.

It should be understood that the probing techniques presented in any of the various sections herein need not be limited to measuring the magnitude of the device's current in response to a voltage drop (pulse). There are various alternatives to measuring the magnitude of the current response to a voltage pulse as an indicator of how far as the optical transition has progressed. In one example, the profile of a current transient provides useful information. In another example, measuring the open circuit voltage of the device may provide the requisite information. In such embodiments, the pulse involves simply applying no voltage to device and then measuring the voltage that the open circuit device applies. Further, it should be understood that current and voltage based algorithms are equivalent. In a current based algorithm, the probe is implemented by dropping the applied current and monitoring the device response. The response may be a measured change in voltage. For example, the device may be held in an open circuit condition to measure the voltage between bus bars.

Figure 9C:
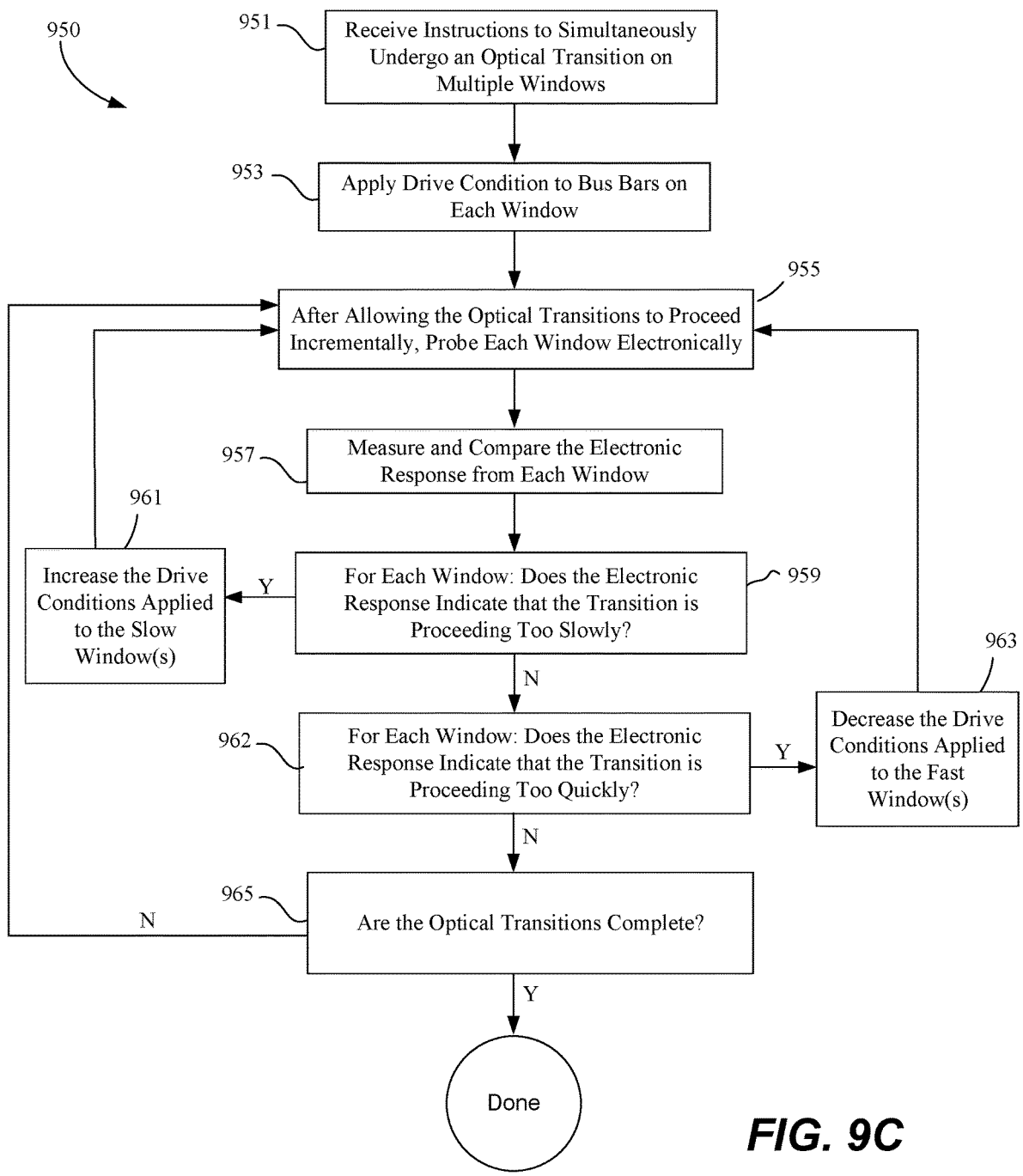
FIGS. 9C and 9D present flow charts for methods of controlling multiple windows simultaneously to achieve matching tint levels or tint rates.

Controlling Transitions Using Electrical Feedback to Transition a Plurality of Windows to Matching Tint Levels/Rates In some applications, groups of windows are set to matching transition rates by adjusting the voltage and/or driving current based on the feedback obtained during probing, such probing techniques being described above (e.g., probing may involve measurement of an open circuit voltage after open circuit conditions are applied, or it may involve measurement of a current response after application of a voltage pulse, and in some cases it may involve measurement of a delivered charge in addition to measuring either a voltage or current response). FIG. 9C presents a flowchart of one such embodiment. The method 950 begins at operation 951, where one or more controllers receive instructions to undergo an optical transition on multiple windows simultaneously. At operation 953, drive conditions (e.g., drive current and/or drive voltage) are applied to the bus bars on each window. The drive conditions may be initially equal or unequal between the different windows. Unequal drive conditions may be particularly useful where the windows are known to have different switching properties, for instance where the windows are of different sizes. Next, at operation 955, after allowing the optical transition on each window to proceed incrementally, each window is electronically probed. Probing may occur through any of the methods described herein (e.g., pulsing current, pulsing voltage, counting charge, and combinations thereof). After probing, the electronic response from each window is measured and compared at operation 957. The electronic responses may simply be compared against one another. Alternatively or in addition, the electronic responses can be evaluated to determine whether the responses indicate that each transition will occur within a target timeframe.

In embodiments where the transition is controlled by monitoring the current response, the magnitude of the current response may be compared from controller to controller (for each window in the group of windows) to determine how to scale the driving potential or driving current for each window in the group. The rate of change of open circuit voltage could be used in the same manner. By scaling the driving potential or driving current for each window based on the feedback response, the amount and/or rate of tinting may be controlled to be uniform between all of the windows. This scaling of the drive conditions is described in blocks 959, 961, 962, and 963. The drive conditions for each window can be continuously and individually monitored and updated based on the feedback responses for each window, as shown by the various loops in FIG. 9C. Once the optical transitions are complete (evaluated at operation 965), the windows are all transitioned to their final end states and the method is complete.

Any group of windows may be controlled together in this manner. For instance, two or more adjacent windows can be controlled together. In another example, two or more windows (e.g., all windows) in a single room are controlled together. In another example, two or more windows (e.g., all windows) on a floor of a building are controlled together. In yet another example, two or more windows (e.g., all windows) of a building are controlled together. In a further example, a number of windows are provided together in a curtain wall, and each window in the curtain wall can be controlled together. An example of a folding curtain wall is shown in FIG. 10, described below.

Figure 10:
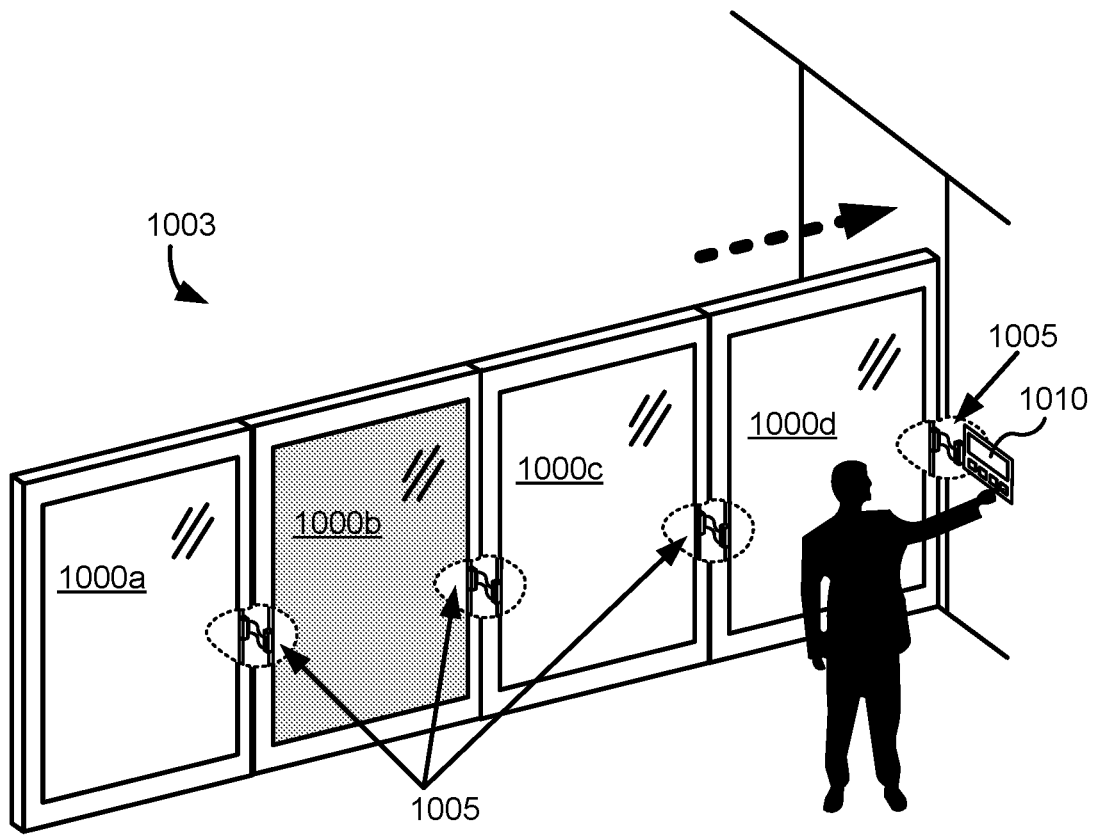
FIG. 10 depicts a curtain wall having a number of electrochromic windows.
Figure 10:
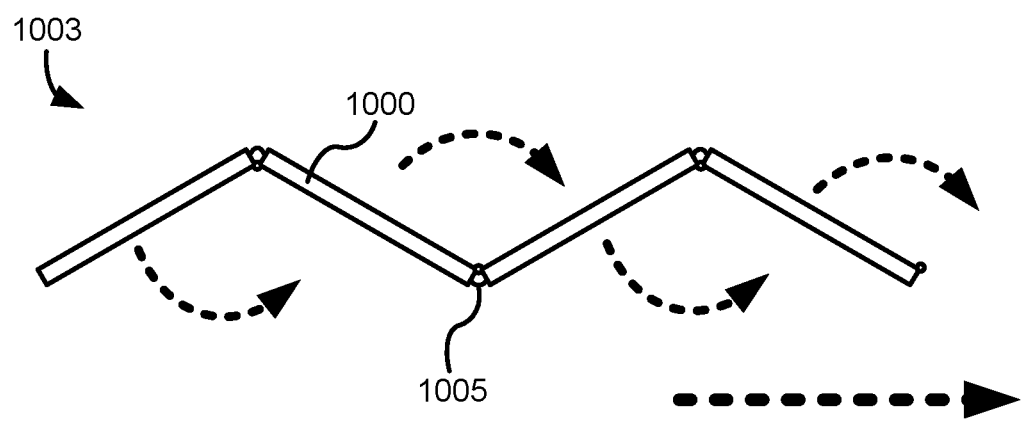

FIG. 10 presents an example of a folding curtain wall 1003. The folding curtain wall 1003 includes four electrochromic windows 1000*a-d*, which are connected through a series of ribbon connectors 1005. Another ribbon connector 1005 (or other connector) links the curtain wall 1003 to a master controller 1010. Ribbon connectors are particularly useful for folding curtain walls, as they can accommodate movement of the different panels. In a similar embodiment, a fixed curtain wall is used. Any appropriate electrical connection may be used to connect the various windows in this case, as there is less concern with wires becoming pinched since the windows are static. Certain embodiments relate to ensuring that the tint level of adjacent EC windows substantially matches, e.g., based on non-optical feedback control. Returning to the embodiment of FIG. 10, the master controller 1010 can control each of the windows 1000*a-d*, either individually or as a group. In certain embodiments, the windows in the folding curtain wall 1003 may be controlled as described to achieve substantially similar tint levels in each of the windows 1000*a-d*. For instance, a user may send a command to cause all of the windows to tint at the same level. In response, the controller 1010 (or multiple controllers, one for each window (not shown)) may probe the windows to determine their relative or absolute tint values. The response from each window can be compared, and then each window can be individually driven based on the feedback response from the probing to match the tint levels on each of the windows 1000*a-d*. Similarly, probing can be done during a transition to ensure that each of the windows 1000*a-d* is tinting at substantially the same rate.

Issues related to transitions involving multiple windows can be especially problematic in certain contexts, for instance where the windows exhibit different switching speeds due to differences in window size and/or other window characteristics (e.g., lithium ion mobility, TCO resistivity differences, replacement windows having different characteristic than the windows in the original set, etc.). If a larger window is positioned next to a smaller window and the same driving conditions are used to transition both windows, the smaller window will typically transition faster than the neighboring larger window. This may be aesthetically undesirable to occupants. As such, electrical feedback can be used to ensure that the various windows tint at the same rate or at rates that mask or otherwise minimize discernable optical differences.

In some embodiments, a uniform tinting rate is achieved across multiple windows by designating a desired transition time that is applicable to the multiple windows. The individual windows can then be controlled (e.g., through a local window controller and/or a network controller) such that they each tint at a rate that will achieve the transition during the desired transition time. In the context of FIG. 9C, for example, blocks 959 and 962 may be evaluated by analyzing the electrical responses from each window to determine if each window will transition within a desired transition time. In some embodiments, the desired transition time is either (a) programmed into or (b) dynamically calculated by one or more window or network controllers. Methods for achieving such control are described further above, particularly in the section related to Controlling a Transition using Electrical Feedback to Transition Within a Desired Timeframe. Briefly, if the feedback response indicates that the transition of a particular window is occurring too slowly (such that the window will not transition within the desired timeframe), the drive conditions can be altered to increase the rate of transition (e.g., a drive voltage applied to an overly slow window can be increased). Similarly, in various embodiments, if the feedback response indicates that the transition is occurring too quickly (such that the window will transition faster than the desired transition time), the drive conditions can be altered to decrease the rate of transition for that window (e.g., a drive voltage applied to an overly fast switching window can be reduced). The end result being, e.g., that even for multiple windows in a façade, the façade as a whole transitions uniformly from the end user's perspective and, once in the desired tint state, the group of adjacent windows appears uniformly tinted.

Where multiple windows are controlled in this manner, it may be desirable for one or more controllers (e.g., window controllers and/or a network controller) to verify that the windows involved in the transition are capable of transitioning within the desired transition time. For instance, if a smaller window can transition in 5 minutes but a larger adjacent window takes 15 minutes to transition, the desired transition time for both windows should be about 15 minutes or greater.

In one example, a desired transition time is programmed into individual windows (e.g., into a pigtail, window controller, or other component having localized memory). Each of the windows may have the same transition time programmed in, such that they transition at the same rate. A window and/or network controller can then read the desired transition time information and verify that the window can be switched within the desired transition time. Such verification may occur before the transition begins. In other cases the verification occurs during the transition. If any of the windows in the group are not able to transition within the desired transition time, a new target transition time may be designated based on the slowest switching window (i.e., the limiting window). The new target transition may be applied to all the windows being controlled together in certain embodiments. The window and/or network controller can dynamically adjust the driving conditions, for example based on feedback as described above, to ensure that each of the windows transitions at a desired rate and within the desired transition time.

In a similar example, a group of windows may be zoned together such that they transition together as a group. The grouping of the windows may be pre-programmed, or it may be designated on-the-fly (e.g., immediately before a transition, or even during a transition). A network controller, or a group of window controllers working together, can then determine which window(s) in the group will be the slowest transitioning windows. Typically the largest windows are those that transition the slowest. The desired transition time can then be set based on the slowest (generally largest) window. In such embodiments, the individual windows may be programmed to designate their size (e.g., in a pigtail, window controller, or other component having memory). It is not necessary to designate a particular switching time for each window. A network controller, for instance having a microprocessor unit, can be used to define a control algorithm for each individual window after the windows are grouped together. The network controller may select a desired transition time (for all windows in the group) based on the time it takes to transition the slowest (generally largest) window in the group. The windows can then be individually controlled, based on feedback as described above, such that they transition over the course of the desired transition time.

Figure 9D:
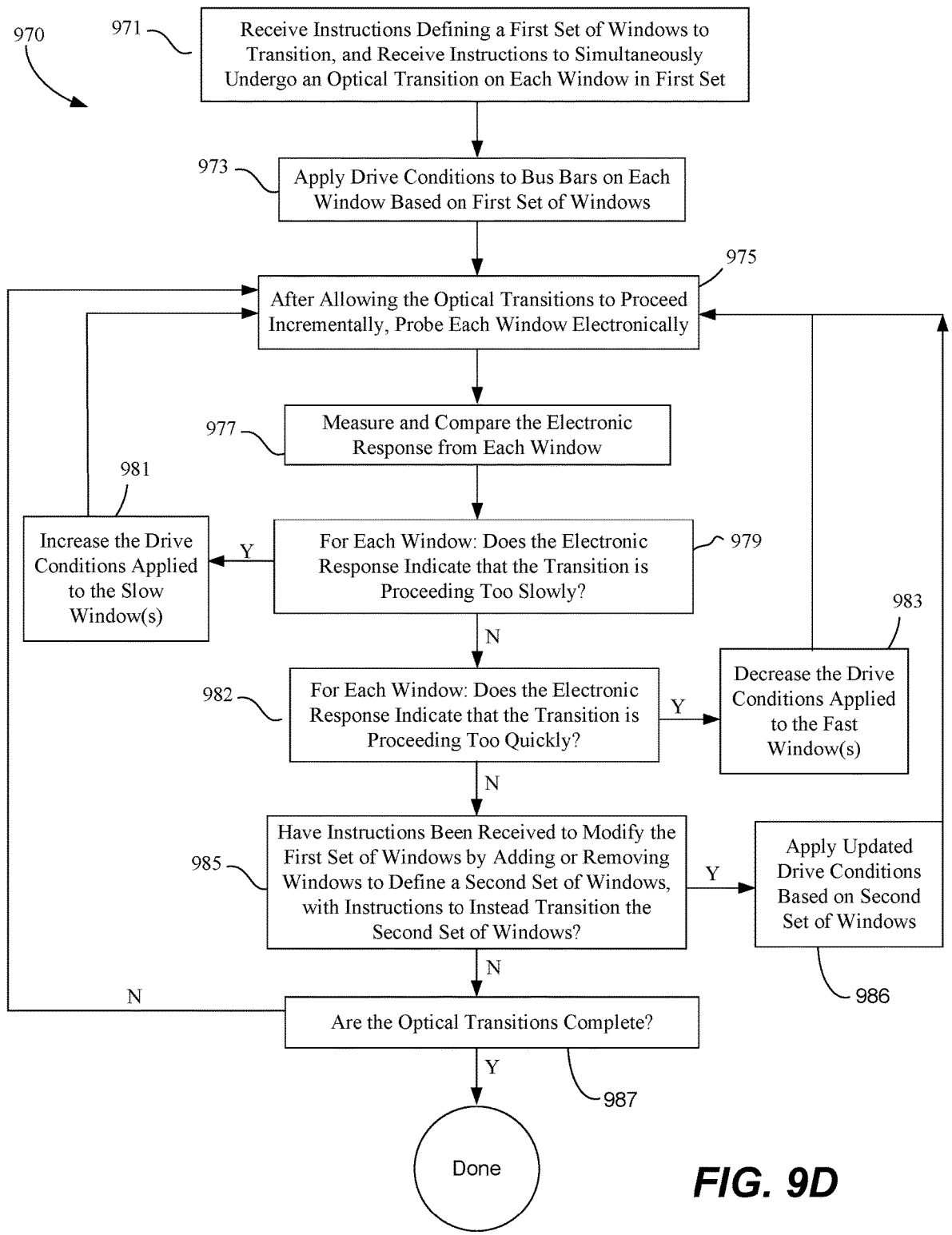

As noted, the zoning of the windows can be designated on-the-fly. This feature is beneficial because it helps provide a high degree of flexibility and responsiveness when controlling a number of windows together. In one example shown in method 970 of FIG. 9D, a first set of windows is defined and instructed to undergo an optical transition in operation 971. The transition time is based on the slowest changing window in the first set of windows. Next, at operation 973, drive conditions are applied to each window to cause each window to transition over the transition time. The method 970 may then proceed as described in relation to method 950 of FIG. 9B. However, at some point during the transition of the first set of windows, instructions may be received (e.g., from a user, controller, etc.) that a second set of windows should be transitioned instead of the first set of windows. As such, operation 985 is included to check for any instructions to modify the group of windows being switched. If no such instructions have been received, the first set of windows continues to transition as normal. However, if instructions are received to define a second set of windows to transition, the method continues at operation 986, where the drive conditions are updated and applied to the windows in the second set. The updated drive conditions are based on the windows that are included in the second set of windows, including an updated transition time (sometimes referred to as a second transition time) based on the windows in the second set. The second set of windows may be different from the first set of windows, though the two sets may include some overlapping windows (e.g., certain windows may be included in both the first and second set of windows). A controller can then transition all the windows in the second set together at matching tint levels or tint rates by following the operations shown in method 970, with drive conditions and transition time now being based on the windows in the second set of windows instead of the first set of windows.

One example where this may occur is when a user initially decides to transition two out of three electrochromic windows in a room, then during the transition decides to transition all three electrochromic windows in the room. After designating all three windows as the second set of windows, a controller may use feedback to control all three windows together at matching tint levels and/or tint rates based on the slowest transitioning window in the second set of windows. One consequence is that a window that is in both the first and second sets of windows may experience different drive conditions at different points in time due to the differing windows within the groups being transitioned together. For example, a later defined group of windows may include a larger/slower transitioning window than an initially defined group of windows. As such, when the windows are grouped to include the large/slow window, the transition rate of all the other windows may be slower. The ending optical state for the second set of windows may be the same or different from the ending optical state (or starting optical state) of the first set of windows.

In certain embodiments where multiple windows transition at the same time, it may be desirable to enable both (a) fast-as-possible transitions for each individual window under certain conditions, and (b) uniform transitions across the multiple windows under other conditions. For example, it may be desirable for regularly scheduled transitions to occur uniformly for a group of windows. Uniformity may be beneficial in this context because uniform transitions are less distracting, which is particularly advantageous for scheduled transitions that may not otherwise draw an occupant's attention. In other words, it is beneficial for scheduled transitions to occur more subtly. In contrast, it may be desirable for non-scheduled, user-initiated transitions to occur as quickly as possible for each individual window. Fast, non-uniform transitions may be beneficial in this context because users often like fast response times when they input a command. Where a user has input a command to transition the windows, the potentially distracting nature of a non-uniform transition is less problematic as the user has already devoted some attention to the windows by initiating the command. In a similar embodiment, a user who desires to switch a group of windows can choose to do so either at a uniform rate across all the windows, or at differing (e.g., maximum) rates for each window.

As noted above, different windows can transition at different rates due to differences in size as well as other window characteristics. In certain embodiments, one or more controllers are configured to account for differences in switching speeds based on both of these concepts. For instance, one or more controllers may first designate an initial set of instructions used to transition the windows in the group based on the size of each window. Then, one or more controllers may modify the individual instructions for each window based on the individual transition characteristics (e.g., lithium ion mobility, TCO resistivity, contact resistance at the busbars and/or electrical leads, window temperature, etc.) for each window.

Controllers for Electrochromic Devices

As indicated, the switchable optical device will have an associated controller, e.g. a microprocessor that controls and manages the device depending on the input. It is designed or configured (e.g., programmed) to implement a control algorithm of the types described above. In various embodiments, the controller detects current and/or voltage levels in the device and applies current and/or voltage as appropriate. The controller may also detect current and/or voltage levels to ensure that the optical device stays within a safe voltage level and/or safe current level. The controller may also detect current, voltage, and/or delivered charge levels in the device in order to determine an appropriate end point of a transition. In some cases the controller may detect current, voltage, and/or delivered charge levels in the device in order to ensure that a transition occurs within a desired timeframe. In some cases the controller may detect current, voltage, and/or delivered charge levels in order to control a transition to a modified end state. In each of these examples, the controller uses an electrical response or other (often non-optical) characteristic of the device or transition as feedback to control an ongoing transition. Further, the controller may have various additional features such as timers, charge detectors (e.g., coulomb counters), oscillators, and the like.

In some embodiments, the controller is located external to the device and communicates with the device via a network. The communication can be direct or indirect (e.g., via an intermediate node between a master controller and the device). The communication may be made via wired or a wireless connection. Various arrangements of external controllers are presented in U.S. patent application Ser. No. 13/049,756, naming Brown et al. as inventors, titled "Multipurpose Controller for Multistate Windows" and filed on the same day as the present application, which is incorporated herein by reference in its entirety.

In some embodiment the controller is integrated with the optical device or housing. In a specific embodiment, the controller is integrated in the housing or a seal of an insulated glass unit (IGU) containing a switchable optical device. Various arrangements of integrated controllers are presented in U.S. Pat. No. 8,213,074, titled "Onboard Controller for Multistate Windows," which is incorporated herein by reference in its entirety.

Figure 11:
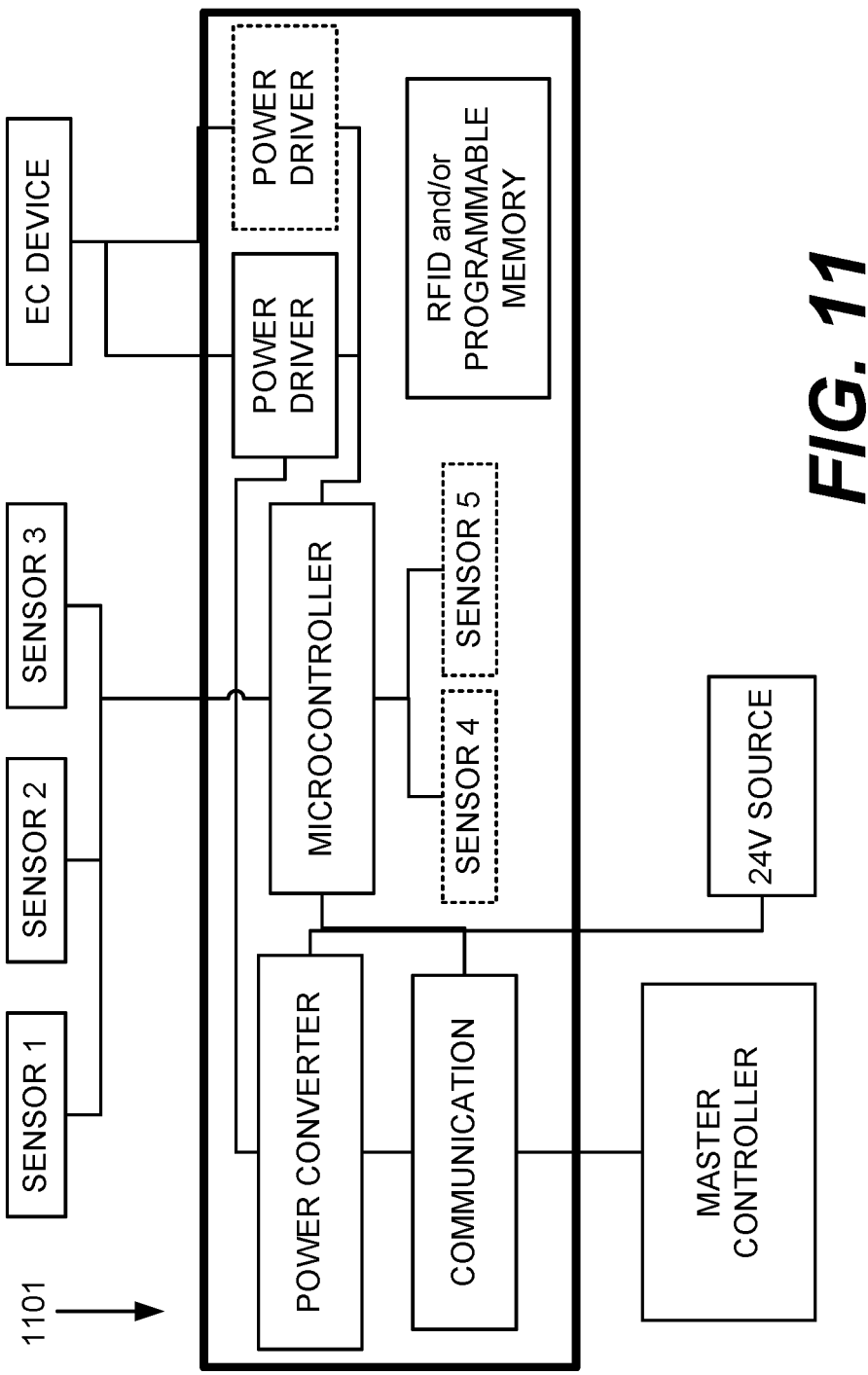
FIG. 11 is a schematic illustration of a controller that may be used to control an optically switchable device according to the methods described herein.

In one embodiment, the controller contains various components as depicted in FIG. 11. As shown, a controller 1101 includes a power converter configured to convert a low voltage to the power requirements of an EC device of an EC pane of an IGU. This power is typically fed to the EC device via a driver circuit (power driver). In one embodiment, controller 1101 has a redundant power driver so that in the event one fails, there is a backup and the controller need not be replaced or repaired.

Controller 1101 also includes a communication circuit (labeled "communication" in FIG. 11) for receiving and sending commands to and from a remote controller (depicted in FIG. 11 as "master controller"). The communication circuit also serves to receive and send input to and from a microcontroller. In one embodiment, the power lines are also used to send and receive communications, for example, via protocols such as Ethernet. The microcontroller includes a logic for controlling the at least one EC pane based, at least in part, on input received from one or more sensors. In this example sensors 1-3 are, for example, external to controller 1101, located for example in the window frame or proximate the window frame. In one embodiment, the controller has at least one or more internal sensors. For example, controller 1101 may also or alternatively have "onboard" sensors 4 and 5. In one embodiment, the controller uses the switchable optical device as a sensor, for example, by using current-voltage (I/V) data obtained from sending one or more electrical pulses through the EC device and analyzing the feedback.

In one embodiment, the controller includes a chip, a card or a board which includes logic for performing one or more control functions. Power and communication functions of controller 1101 may be combined in a single chip, for example, a programmable logic device (PLD) chip, field programmable gate array (FPGA) and the like. Such integrated circuits can combine logic, control and power functions in a single programmable chip. In one embodiment, where the electrochromic window (or IGU) has two electrochromic panes, the logic is configured to independently control each of the two electrochromic panes. In one embodiment, the function of each of the two electrochromic panes is controlled in a synergistic fashion, that is, so that each device is controlled in order to complement the other. For example, the desired level of light transmission, thermal insulative effect, and/or other property are controlled via combination of states for each of the individual devices. For example, one electrochromic device may be placed in a tinted state while the other is used for resistive heating, for example, via a transparent electrode of the device. In another example, the optical states of the two electrochromic devices are controlled so that the combined transmissivity is a desired outcome.

Controller 1101 may also have wireless capabilities, such as control and powering functions. For example, wireless controls, such as Rf and/or IR can be used as well as wireless communication such as Bluetooth, WiFi, Zigbee, EnOcean and the like to send instructions to the microcontroller and for the microcontroller to send data out to, for example, other window controllers and/or a building management system (BMS). Wireless communication can be used in the window controller for at least one of programming and/or operating the electrochromic window, collecting data from the electrochromic window from sensors as well as using the electrochromic window as a relay point for wireless communication. A controller may include a wireless communication receiver and/or transmitter for wireless communication. Data collected from electrochromic windows also may include count data such as number of times an electrochromic device has been activated (cycled), efficiency of the electrochromic device over time, and the like.

Also, controller 1101 may have wireless power capability. That is, controller 1101 may have one or more wireless power receivers, that receive transmissions from one or more wireless power transmitters and thus controller 1101 can power the electrochromic window via wireless power transmission. Wireless power transmission includes, for example but not limited to, induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dual polarized waves, and/or various frequencies and vectors. In another embodiment, power is wirelessly transferred via inductive coupling of magnetic fields. Exemplary wireless power functions of electrochromic windows is described in U.S. patent application Ser. No. 12/971,576, filed Dec. 17, 2010, entitled "Wireless Powered Electrochromic Windows," and naming Robert Rozbicki as inventor, which is incorporated by reference herein in its entirety.

Controller 1101 may also include an RFID tag and/or memory such as solid state serial memory (e.g. I2C or SPI) which may optionally be programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

RFID tags may contain at least two parts. One is an integrated circuit for storing and processing information, modulating and demodulating a radio-frequency (Rf) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range. RFID has many applications; for example, it is used in enterprise supply chain management to improve the efficiency of inventory tracking and management.

In one embodiment, the RFID tag or other memory is programmed with at least one of the following data: warranty information, installation information, vendor information, batch/inventory information, EC device/IGU characteristics, EC device cycling information and customer information. Examples of EC device and IGU characteristics include, for example, window voltage ($V_W$), window current ($I_W$), EC coating temperature ($T_{EC}$), glass visible transmission (% $T_{vis}$), % tint command (external analog input from BMS), digital input states, and controller status. Each of these represents upstream information that may be provided from the controller. Examples of downstream data that may be provided to the controller include window drive configuration parameters, zone membership (e.g. what zone is this controller part of), % tint value, digital output states, and digital control (tint, clear, auto, reboot, etc.). Examples of window drive configuration parameters include clear to tinted transition ramp rate, clear to tinted transition voltage, initial tinting ramp rate, initial tinting voltage, initial tinting current limit, tinted hold voltage, tinted hold current limit, tinted to clear transition ramp rate, tinted to clear transition voltage, initial clearing ramp rate, initial clearing voltage, initial clearing current limit, clear hold voltage, clear hold current limit.

In one embodiment, a programmable memory is used in controllers described herein. This programmable memory can be used in lieu of, or in conjunction with, RFID technology. Programmable memory has the advantage of increased flexibility for storing data related to the IGU to which the controller is matched.

Figure 12:
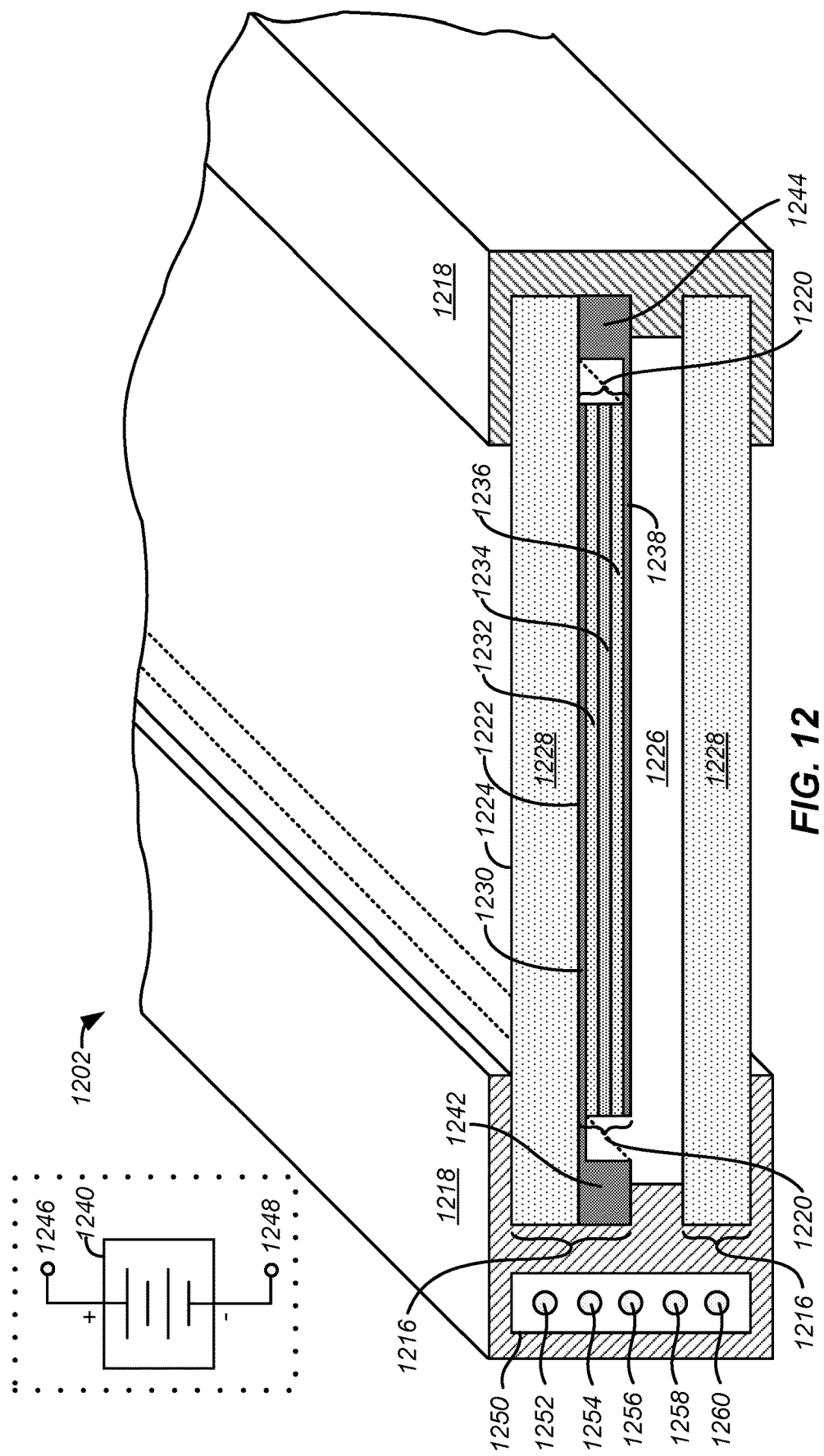
FIG. 12 depicts a cross-sectional view of an IGU according to an embodiment.

FIG. 12 shows a cross-sectional axonometric view of an embodiment of an IGU 1202 that includes two window panes or lites 1216 and a controller 1250. In various embodiments, IGU 1202 can include one, two, or more substantially transparent (e.g., at no applied voltage) lites 1216 as well as a frame, 1218, that supports the lites 1216. For example, the IGU 1202 shown in FIG. 12 is configured as a double-pane window. One or more of the lites 1216 can itself be a laminate structure of two, three, or more layers or lites (e.g., shatter-resistant glass similar to automotive windshield glass). In IGU 1202, at least one of the lites 1216 includes an electrochromic device or stack, 1220, disposed on at least one of its inner surface, 1222, or outer surface, 1224: for example, the inner surface 1222 of the outer lite 1216.

In multi-pane configurations, each adjacent set of lites 1216 can have an interior volume, 1226, disposed between them. Generally, each of the lites 1216 and the IGU 1202 as a whole are rectangular and form a rectangular solid. However, in other embodiments other shapes (e.g., circular, elliptical, triangular, curvilinear, convex, concave) may be desired. In some embodiments, the volume 1226 between the lites 1216 is evacuated of air. In some embodiments, the IGU 1202 is hermetically-sealed. Additionally, the volume 1226 can be filled (to an appropriate pressure) with one or more gases, such as argon (Ar), krypton (Kr), or xenon (Xn), for example. Filling the volume 1226 with a gas such as Ar, Kr, or Xn can reduce conductive heat transfer through the IGU 1202 because of the low thermal conductivity of these gases. The latter two gases also can impart improved acoustic insulation due to their increased weight.

In some embodiments, frame 1218 is constructed of one or more pieces. For example, frame 1218 can be constructed of one or more materials such as vinyl, PVC, aluminum (Al), steel, or fiberglass. The frame 1218 may also include or hold one or more foam or other material pieces that work in conjunction with frame 1218 to separate the lites 1216 and to hermetically seal the volume 1226 between the lites 1216. For example, in a typical IGU implementation, a spacer lies between adjacent lites 1216 and forms a hermetic seal with the panes in conjunction with an adhesive sealant that can be deposited between them. This is termed the primary seal, around which can be fabricated a secondary seal, typically of an additional adhesive sealant. In some such embodiments, frame 1218 can be a separate structure that supports the IGU construct.

Each lite 1216 includes a substantially transparent or translucent substrate, 1228. Generally, substrate 1228 has a first (e.g., inner) surface 1222 and a second (e.g., outer) surface 1224 opposite the first surface 1222. In some embodiments, substrate 1228 can be a glass substrate. For example, substrate 1228 can be a conventional silicon oxide ($SO_x$)—based glass substrate such as soda-lime glass or float glass, composed of, for example, approximately 75% silica ($SiO_2$) plus $Na_2O$, CaO, and several minor additives. However, any material having suitable optical, electrical, thermal, and mechanical properties may be used as substrate 1228. Such substrates also can include, for example, other glass materials, plastics and thermoplastics (e.g., poly(methyl methacrylate), polystyrene, polycarbonate, allyl diglycol carbonate, SAN (styrene acrylonitrile copolymer), poly (4-methyl-1-pentene), polyester, polyamide), or mirror materials. If the substrate is formed from, for example, glass, then substrate 1228 can be strengthened, e.g., by tempering, heating, or chemically strengthening. In other implementations, the substrate 1228 is not further strengthened, e.g., the substrate is untempered.

In some embodiments, substrate 1228 is a glass pane sized for residential or commercial window applications. The size of such a glass pane can vary widely depending on the specific needs of the residence or commercial enterprise. In some embodiments, substrate 1228 can be formed of architectural glass. Architectural glass is typically used in commercial buildings, but also can be used in residential buildings, and typically, though not necessarily, separates an indoor environment from an outdoor environment. In certain embodiments, a suitable architectural glass substrate can be at least approximately 20 inches by approximately 20 inches, and can be much larger, for example, approximately 80 inches by approximately 120 inches, or larger. Architectural glass is typically at least about 2 millimeters (mm) thick and may be as thick as 6 mm or more. Of course, electrochromic devices 1220 can be scalable to substrates 1228 smaller or larger than architectural glass, including in any or all of the respective length, width, or thickness dimensions. In some embodiments, substrate 1228 has a thickness in the range of approximately 1 mm to approximately 10 mm. In some embodiments, substrate 1228 may be very thin and flexible, such as Gorilla Glass® or Willow™ Glass, each commercially available from Corning, Inc. of Corning, N.Y., these glasses may be less than 1 mm thick, as thin as 0.3 mm thick.

Electrochromic device 1220 is disposed over, for example, the inner surface 1222 of substrate 1228 of the outer pane 1216 (the pane adjacent the outside environment). In some other embodiments, such as in cooler climates or applications in which the IGUs 1202 receive greater amounts of direct sunlight (e.g., perpendicular to the surface of electrochromic device 1220), it may be advantageous for electrochromic device 1220 to be disposed over, for example, the inner surface (the surface bordering the volume 1226) of the inner pane adjacent the interior environment. In some embodiments, electrochromic device 1220 includes a first conductive layer (CL) 1230 (often transparent), a cathodically coloring layer 1232, often referred to as an electrochromic layer (EC) 1232, an ion conducting layer (IC) 1234, an anodically coloring layer 1236, often referred to as a counter electrode layer (CE) 1236, and a second conductive layer (CL) 1238 (often transparent). Again, layers 1230, 1232, 1234, 1236, and 1238 are also collectively referred to as electrochromic stack 1220.

A power source 1240 operable to apply an electric potential ($V_{app}$) to the device and produce $V_{eff}$ across a thickness of electrochromic stack 1220 and drive the transition of the electrochromic device 1220 from, for example, a clear or lighter state (e.g., a transparent, semitransparent, or translucent state) to a tinted or darker state (e.g., a tinted, less transparent or less translucent state). In some other embodiments, the order of layers 1230, 1232, 1234, 1236, and 1238 can be reversed or otherwise reordered or rearranged with respect to substrate 1228.

In some embodiments, one or both of first conductive layer 1230 and second conductive layer 1238 is formed from an inorganic and solid material. For example, first conductive layer 1230, as well as second conductive layer 1238, can be made from a number of different materials, including conductive oxides, thin metallic coatings, conductive metal nitrides, and composite conductors, among other suitable materials. In some embodiments, conductive layers 1230 and 1238 are substantially transparent at least in the range of wavelengths where electrochromism is exhibited by the electrochromic layer 1232. Transparent conductive oxides include metal oxides and metal oxides doped with one or more metals. For example, metal oxides and doped metal oxides suitable for use as first or second conductive layers 1230 and 1238 can include indium oxide, indium tin oxide (ITO), doped indium oxide, tin oxide, doped tin oxide, zinc oxide, aluminum zinc oxide, doped zinc oxide, ruthenium oxide, doped ruthenium oxide, among others. As indicated above, first and second conductive layers 230 and 238 are sometimes referred to as "transparent conductive oxide" (TCO) layers.

In some embodiments, commercially available substrates, such as glass substrates, already contain a transparent conductive layer coating when purchased. In some embodiments, such a product can be used for both substrate 1238 and conductive layer 1230 collectively. Examples of such glass substrates include conductive layer-coated glasses sold under the trademark TEC Glass™ by Pilkington, of Toledo, Ohio and SUNGATE™ 300 and SUNGATE™ 500 by PPG Industries of Pittsburgh, Pennsylvania Specifically, TEC Glass™ is, for example, a glass coated with a fluorinated tin oxide conductive layer.

In some embodiments, first or second conductive layers 1230 and 1238 can each be deposited by physical vapor deposition processes including, for example, sputtering. In some embodiments, first and second conductive layers 1230 and 1238 can each have a thickness in the range of approximately 0.01 µm to approximately 1 µm. In some embodiments, it may be generally desirable for the thicknesses of the first and second conductive layers 1230 and 1238 as well as the thicknesses of any or all of the other layers described below to be individually uniform with respect to the given layer; that is, that the thickness of a given layer is uniform and the surfaces of the layer are smooth and substantially free of defects or other ion traps.

A primary function of the first and second conductive layers 1230 and 1238 is to spread an electric potential provided by a power source 1240, such as a voltage or current source, over surfaces of the electrochromic stack 1220 from outer surface regions of the stack to inner surface regions of the stack. As mentioned, the voltage applied to the electrochromic device experiences some Ohmic potential drop from the outer regions to the inner regions as a result of a sheet resistance of the first and second conductive layers 1230 and 1238. In the depicted embodiment, bus bars 1242 and 1244 are provided with bus bar 1242 in contact with conductive layer 1230 and bus bar 1244 in contact with conductive layer 1238 to provide electric connection between the voltage or current source 1240 and the conductive layers 1230 and 1238. For example, bus bar 1242 can be electrically coupled with a first (e.g., positive) terminal 1246 of power source 1240 while bus bar 1244 can be electrically coupled with a second (e.g., negative) terminal 1248 of power source 1240.

In some embodiments, IGU 1202 includes a plug-in component 1250. In some embodiments, plug-in component 1250 includes a first electrical input 1252 (e.g., a pin, socket, or other electrical connector or conductor) that is electrically coupled with power source terminal 1246 via, for example, one or more wires or other electrical connections, components, or devices. Similarly, plug-in component 1250 can include a second electrical input 1254 that is electrically coupled with power source terminal 1248 via, for example, one or more wires or other electrical connections, components, or devices. In some embodiments, first electrical input 1252 can be electrically coupled with bus bar 1242, and from there with first conductive layer 1230, while second electrical input 1254 can be coupled with bus bar 1244, and from there with second conductive layer 1238. The conductive layers 1230 and 1238 also can be connected to power source 1240 with other conventional means as well as according to other means described below with respect to a window controller. For example, as described below with reference to FIG. 13, first electrical input 1252 can be connected to a first power line while second electrical input 1254 can be connected to a second power line. Additionally, in some embodiments, third electrical input 1256 can be coupled to a device, system, or building ground. Furthermore, in some embodiments, fourth and fifth electrical inputs/outputs 1258 and 1260, respectively, can be used for communication between, for example, a window controller or microcontroller and a network controller.

In some embodiments, electrical input 1252 and electrical input 1254 receive, carry, or transmit complementary power signals. In some embodiments, electrical input 1252 and its complement electrical input 1254 can be directly connected to the bus bars 1242 and 1244, respectively, and on the other side, to an external power source that provides a variable DC voltage (e.g., sign and magnitude). The external power source can be a window controller (see element 1314 of FIG. 13) itself, or power from a building transmitted to a window controller or otherwise coupled to electrical inputs 1252 and 1254. In such an embodiment, the electrical signals transmitted through electrical inputs/outputs 1258 and 1260 can be directly connected to a memory device to allow communication between the window controller and the memory device. Furthermore, in such an embodiment, the electrical signal input to electrical input 1256 can be internally connected or coupled (within IGU 1202) to either electrical input 1252 or 1254 or to the bus bars 1242 or 1244 in such a way as to enable the electrical potential of one or more of those elements to be remotely measured (sensed). This can allow the window controller to compensate for a voltage drop on the connecting wires from the window controller to the electrochromic device 1220.

In some embodiments, the window controller can be immediately attached (e.g., external to the IGU 1202 but inseparable by the user) or integrated within the IGU 1202. For example, U.S. Pat. No. 8,213,074, incorporated by reference above, describes in detail various embodiments of an "onboard" controller. In such an embodiment, electrical input 1252 can be connected to the positive output of an external DC power source. Similarly, electrical input 1254 can be connected to the negative output of the DC power source. As described below, however, electrical inputs 1252 and 1254 can, alternately, be connected to the outputs of an external low voltage AC power source (e.g., a typical 24 V AC transformer common to the HVAC industry). In such an embodiment, electrical inputs/outputs 1258 and 1260 can be connected to the communication bus between the window controller and a network controller. In this embodiment, electrical input/output 1256 can be eventually (e.g., at the power source) connected with the earth ground (e.g., Protective Earth, or PE in Europe) terminal of the system.

Although the applied voltages may be provided as DC voltages, in some embodiments, the voltages actually supplied by the external power source are AC voltage signals. In some other embodiments, the supplied voltage signals are converted to pulse-width modulated voltage signals. However, the voltages actually "seen" or applied to the bus bars 1242 and 1244 are effectively DC voltages. Typically, the voltage oscillations applied at terminals 1246 and 1248 are in the range of approximately 1 Hz to 1 MHz, and in particular embodiments, approximately 100 kHz. In various embodiments, the oscillations have asymmetric residence times for the darkening (e.g., tinting) and lightening (e.g., clearing) portions of a period. For example, in some embodiments, transitioning from a first less transparent state to a second more transparent state requires more time than the reverse; that is, transitioning from the more transparent second state to the less transparent first state. As will be described below, a controller can be designed or configured to apply a driving voltage meeting these requirements.

The oscillatory applied voltage control allows the electrochromic device 1220 to operate in, and transition to and from, one or more states without any necessary modification to the electrochromic device stack 1220 or to the transitioning time. Rather, the window controller can be configured or designed to provide an oscillating drive voltage of appropriate wave profile, taking into account such factors as frequency, duty cycle, mean voltage, amplitude, among other possible suitable or appropriate factors. Additionally, such a level of control permits the transitioning to any state over the full range of optical states between the two end states. For example, an appropriately configured controller can provide a continuous range of transmissivity (% T) which can be tuned to any value between end states (e.g., opaque and clear end states).

To drive the device to an intermediate state using the oscillatory driving voltage, a controller could simply apply the appropriate intermediate voltage. However, there can be more efficient ways to reach the intermediate optical state. This is partly because high driving voltages can be applied to reach the end states but are traditionally not applied to reach an intermediate state. One technique for increasing the rate at which the electrochromic device 1220 reaches a desired intermediate state is to first apply a high voltage pulse suitable for full transition (to an end state) and then back off to the voltage of the oscillating intermediate state (just described). Stated another way, an initial low frequency single pulse (low in comparison to the frequency employed to maintain the intermediate state) of magnitude and duration chosen for the intended final state can be employed to speed the transition. After this initial pulse, a higher frequency voltage oscillation can be employed to sustain the intermediate state for as long as desired.

In some embodiments, each IGU 1202 includes a component 1250 that is "pluggable" or readily-removable from IGU 1202 (e.g., for ease of maintenance, manufacture, or replacement). In some particular embodiments, each plug-in component 1250 itself includes a window controller. That is, in some such embodiments, each electrochromic device 1220 is controlled by its own respective local window controller located within plug-in component 1250. In some other embodiments, the window controller is integrated with another portion of frame 1218, between the glass panes in the secondary seal area, or within volume 1226. In some other embodiments, the window controller can be located external to IGU 1202. In various embodiments, each window controller can communicate with the IGUs 1202 it controls and drives, as well as communicate to other window controllers, the network controller, BMS, or other servers, systems, or devices (e.g., sensors), via one or more wired (e.g., Ethernet) networks or wireless (e.g., WiFi) networks, for example, via wired (e.g., Ethernet) interface 1263 or wireless (WiFi) interface 1265. See FIG. 13. Embodiments having Ethernet or Wifi capabilities are also well-suited for use in residential homes and other smaller-scale non-commercial applications. Additionally, the communication can be direct or indirect, e.g., via an intermediate node between a master controller such as network controller 1312 and the IGU 1202.

Figure 13:
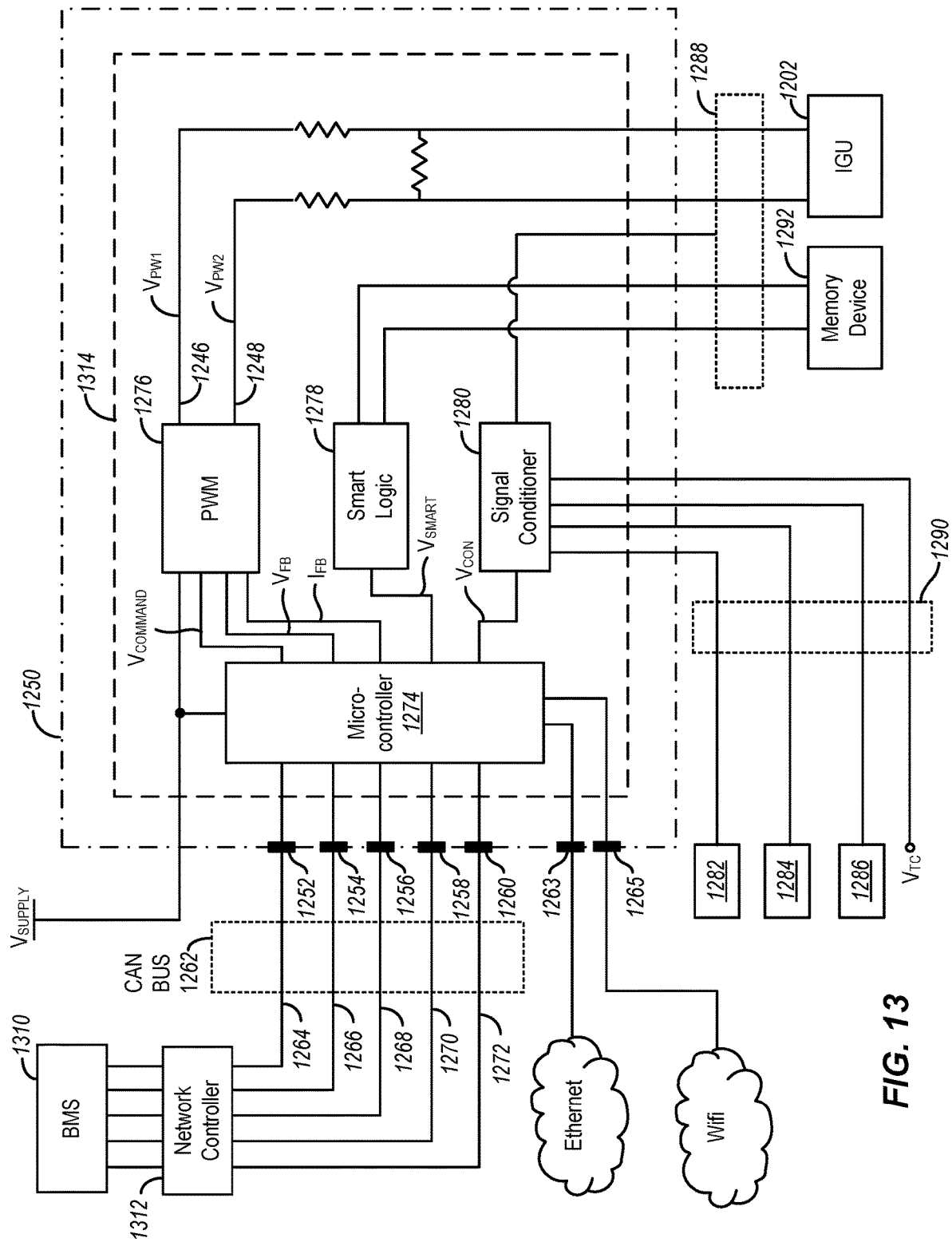
FIG. 13 illustrates a window controller and associated components.

FIG. 13 depicts a window controller 1314, which may be deployed as, for example, component 1250. In some embodiments, window controller 1314 communicates with a network controller over a communication bus 1262. For example, communication bus 1262 can be designed according to the Controller Area Network (CAN) vehicle bus standard. In such embodiments, first electrical input 1252 can be connected to a first power line 1264 while second electrical input 1254 can be connected to a second power line 1266. In some embodiments, as described above, the power signals sent over power lines 1264 and 1266 are complementary; that is, collectively they represent a differential signal (e.g., a differential voltage signal). In some embodiments, line 1268 is coupled to a system or building ground (e.g., an Earth Ground). In such embodiments, communication over CAN bus 1262 (e.g., between microcontroller 1274 and network controller 1312) may proceed along first and second communication lines 1270 and 1272 transmitted through electrical inputs/outputs 1258 and 1260, respectively, according to the CANopen communication protocol or other suitable open, proprietary, or overlying communication protocol. In some embodiments, the communication signals sent over communication lines 1270 and 1272 are complementary; that is, collectively they represent a differential signal (e.g., a differential voltage signal).

In some embodiments, component 1250 couples CAN communication bus 1262 into window controller 1314, and in particular embodiments, into microcontroller 1274. In some such embodiments, microcontroller 1274 is also configured to implement the CANopen communication protocol. Microcontroller 1274 is also designed or configured (e.g., programmed) to implement one or more drive control algorithms in conjunction with pulse-width modulated amplifier or pulse-width modulator (PWM) 1276, smart logic 1278, and signal conditioner 1280. In some embodiments, microcontroller 1274 is configured to generate a command signal $V_{COMMAND}$, e.g., in the form of a voltage signal, that is then transmitted to PWM 1276. PWM 1276, in turn, generates a pulse-width modulated power signal, including first (e.g., positive) component $V_{PW1}$ and second (e.g., negative) component $V_{PW2}$, based on $V_{COMMAND}$. Power signals $V_{PW1}$ and $V_{PW2}$ are then transmitted over, for example, interface 1288, to IGU 1202, or more particularly, to bus bars 1242 and 1244 in order to cause the desired optical transitions in electrochromic device 1220. In some embodiments, PWM 1276 is configured to modify the duty cycle of the pulse-width modulated signals such that the durations of the pulses in signals $V_{PW1}$ and $V_{PW2}$ are not equal: for example, PWM 1276 pulses $V_{PW1}$ with a first 60% duty cycle and pulses $V_{PW2}$ for a second 40% duty cycle. The duration of the first duty cycle and the duration of the second duty cycle collectively represent the duration, $t_{PWM}$ of each power cycle. In some embodiments, PWM 1276 can additionally or alternatively modify the magnitudes of the signal pulses $V_{PW1}$ and $V_{PW2}$.

In some embodiments, microcontroller 1274 is configured to generate $V_{COMMAND}$ based on one or more factors or signals such as, for example, any of the signals received over CAN bus 1262 as well as voltage or current feedback signals, $V_{FB}$ and $I_{FB}$ respectively, generated by PWM 1276. In some embodiments, microcontroller 1274 determines current or voltage levels in the electrochromic device 1220 based on feedback signals $I_{FB}$ or $V_{FB}$, respectively, and adjusts $V_{COMMAND}$ according to one or more rules or algorithms described above to effect a change in the relative pulse durations (e.g., the relative durations of the first and second duty cycles) or amplitudes of power signals $V_{PW1}$ and $V_{PW2}$ to produce voltage profiles as described above. Additionally or alternatively, microcontroller 1274 can also adjust $V_{COMMAND}$ in response to signals received from smart logic 1278 or signal conditioner 1280. For example, a conditioning signal $V_{CON}$ can be generated by signal conditioner 1280 in response to feedback from one or more networked or non-networked devices or sensors, such as, for example, an exterior photosensor or photodetector 1282, an interior photosensor or photodetector 1284, a thermal or temperature sensor 1286, or a tint command signal $V_{TC}$. For example, additional embodiments of signal conditioner 1280 and $V_{CON}$ are also described in U.S. Pat. No. 8,705,162, which is herein incorporated by reference.

In certain embodiments, $V_{TC}$ can be an analog voltage signal between 0 V and 10 V that can be used or adjusted by users (such as residents or workers) to dynamically adjust the tint of an IGU 1202 (for example, a user can use a control in a room or zone of building similarly to a thermostat to finely adjust or modify a tint of the IGUs 1202 in the room or zone) thereby introducing a dynamic user input into the logic within microcontroller 1274 that determines $V_{COMMAND}$. For example, when set in the 0 to 2.5 V range, $V_{TC}$ can be used to cause a transition to a 5% T state, while when set in the 2.51 to 5 V range, $V_{TC}$ can be used to cause a transition to a 20% T state, and similarly for other ranges such as 5.1 to 7.5 V and 7.51 to 10 V, among other range and voltage examples. In some embodiments, signal conditioner 1280 receives the aforementioned signals or other signals over a communication bus or interface 1290. In some embodiments, PWM 1276 also generates $V_{COMMAND}$ based on a signal $V_{SMART}$ received from smart logic 1278. In some embodiments, smart logic 1278 transmits $V_{SMART}$ over a communication bus such as, for example, an Inter-Integrated Circuit (PC) multi-master serial single-ended computer bus. In some other embodiments, smart logic 1278 communicates with memory device 1292 over a 1-WIRE device communications bus system protocol (by Dallas Semiconductor Corp., of Dallas, Texas).

In some embodiments, microcontroller 1274 includes a processor, chip, card, or board, or a combination of these, which includes logic for performing one or more control functions. Power and communication functions of microcontroller 1274 may be combined in a single chip, for example, a programmable logic device (PLD) chip or field programmable gate array (FPGA), or similar logic. Such integrated circuits can combine logic, control and power functions in a single programmable chip. In one embodiment, where one pane 1216 has two electrochromic devices 1220 (e.g., on opposite surfaces) or where IGU 1202 includes two or more panes 1216 that each include an electrochromic device 1220, the logic can be configured to control each of the two electrochromic devices 1220 independently from the other. However, in one embodiment, the function of each of the two electrochromic devices 1220 is controlled in a synergistic fashion, for example, such that each device is controlled in order to complement the other. For example, the desired level of light transmission, thermal insulative effect, or other property can be controlled via a combination of states for each of the individual electrochromic devices 1220. For example, one electrochromic device may be placed in a tinted state while the other is used for resistive heating, for example, via a transparent electrode of the device. In another example, the optical states of the two electrochromic devices are controlled so that the combined transmissivity is a desired outcome.

In general, the logic used to control electrochromic device transitions can be designed or configured in hardware and/or software. In other words, the instructions for controlling the drive circuitry may be hard coded or provided as software. It may be said that the instructions are provided by "programming." Such programming is understood to include logic of any form including hard coded logic in digital signal processors and other devices which have specific algorithms implemented as hardware. Programming is also understood to include software or firmware instructions that may be executed on a general purpose processor. In some embodiments, instructions for controlling application of voltage to the bus bars are stored on a memory device associated with the controller or are provided over a network. Examples of suitable memory devices include semiconductor memory, magnetic memory, optical memory, and the like. The computer program code for controlling the applied voltage can be written in any conventional computer readable programming language such as assembly language, C, C++, Pascal, Fortran, and the like. Compiled object code or script is executed by the processor to perform the tasks identified in the program.

As described above, in some embodiments, microcontroller 1274, or window controller 1314 generally, also can have wireless capabilities, such as wireless control and powering capabilities. For example, wireless control signals, such as radio-frequency (RF) signals or infra-red (IR) signals can be used, as well as wireless communication protocols such as WiFi (mentioned above), Bluetooth, Zigbee, EnOcean, among others, to send instructions to the microcontroller 1274 and for microcontroller 1274 to send data out to, for example, other window controllers, a network controller 1312, or directly to a BMS 1310. In various embodiments, wireless communication can be used for at least one of programming or operating the electrochromic device 1220, collecting data or receiving input from the electrochromic device 1220 or the IGU 1202 generally, collecting data or receiving input from sensors, as well as using the window controller 1314 as a relay point for other wireless communications. Data collected from IGU 1202 also can include count data, such as a number of times an electrochromic device 1220 has been activated (cycled), an efficiency of the electrochromic device 1220 over time, among other useful data or performance metrics.

The window controller 1314 also can have wireless power capability. For example, window controller can have one or more wireless power receivers that receive transmissions from one or more wireless power transmitters as well as one or more wireless power transmitters that transmit power transmissions enabling window controller 1314 to receive power wirelessly and to distribute power wirelessly to electrochromic device 1220. Wireless power transmission includes, for example, induction, resonance induction, RF power transfer, microwave power transfer, and laser power transfer. For example, U.S. patent application Ser. No. 12/971,576 naming Rozbicki as inventor, titled "WIRELESS POWERED ELECTROCHROMIC WINDOWS," and filed 17 Dec. 2010, incorporated by reference above, describes in detail various embodiments of wireless power capabilities.

In order to achieve a desired optical transition, the pulse-width modulated power signal is generated such that the positive component $V_{PW1}$ is supplied to, for example, bus bar 1244 during the first portion of the power cycle, while the negative component $V_{PW2}$ is supplied to, for example, bus bar 1242 during the second portion of the power cycle.

In some cases, depending on the frequency (or inversely the duration) of the pulse-width modulated signals, this can result in bus bar 1244 floating at substantially the fraction of the magnitude of $V_{PW1}$ that is given by the ratio of the duration of the first duty cycle to the total duration $t_{PWM}$ of the power cycle. Similarly, this can result in bus bar 1242 floating at substantially the fraction of the magnitude of $V_{PW2}$ that is given by the ratio of the duration of the second duty cycle to the total duration $t_{PWM}$ of the power cycle. In this way, in some embodiments, the difference between the magnitudes of the pulse-width modulated signal components $V_{PW1}$ and $V_{PW2}$ is twice the effective DC voltage across terminals 1246 and 1248, and consequently, across electrochromic device 1220. Said another way, in some embodiments, the difference between the fraction (determined by the relative duration of the first duty cycle) of $V_{PW1}$ applied to bus bar 1244 and the fraction (determined by the relative duration of the second duty cycle) of $V_{PW2}$ applied to bus bar 1242 is the effective DC voltage $V_{EFF}$ applied to electrochromic device 1220. The current IEFF through the load—electromagnetic device 1220—is roughly equal to the effective voltage VEFF divided by the effective resistance or impedance of the load.

Those of ordinary skill in the art will also understand that this description is applicable to various types of drive mechanism including fixed voltage (fixed DC), fixed polarity (time varying DC) or a reversing polarity (AC, MF, RF power etc. with a DC bias).

The controller may be configured to monitor voltage and/or current from the optically switchable device. In some embodiments, the controller is configured to calculate current by measuring voltage across a known resistor in the driving circuit. Other modes of measuring or calculating current may be employed. These modes may be digital or analog.

Electrochromic Devices

Figure 14:
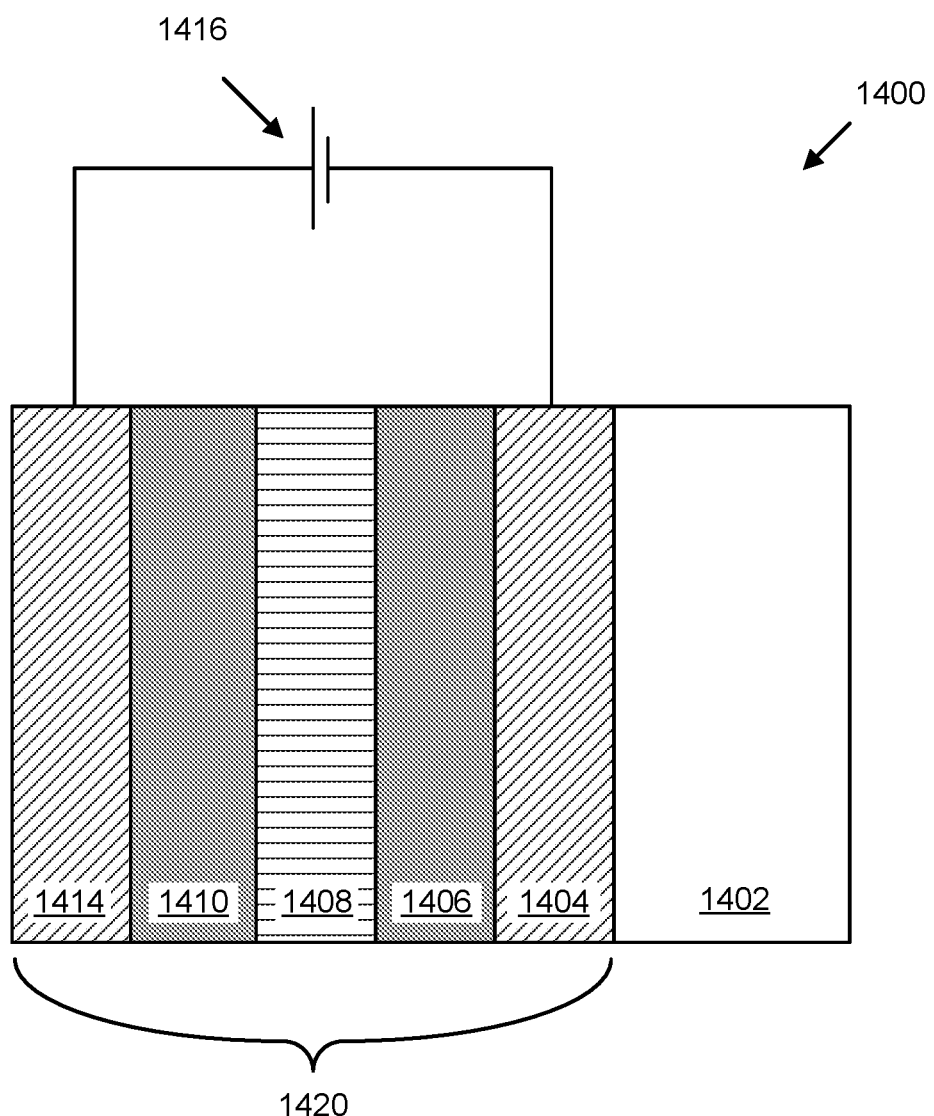
FIG. 14 is a schematic depiction of an electrochromic device in cross-section.

For context, examples of electrochromic device designs now will be described. FIG. 14 schematically depicts an electrochromic device 1400 in cross-section. Electrochromic device 1400 includes a substrate 1402, a first conductive layer (CL) 1404, a cathodically coloring electrochromic layer (EC) 1406, an ion conducting layer (IC) 1408, an anodically coloring counter electrode layer (CE) 1410, and a second conductive layer (CL), 1414. Layers 1404, 1406, 1408, 1410, and 1414 are collectively referred to as an electrochromic stack 1420. A voltage source 1416 operable to apply an electric potential across electrochromic stack 1420 effects the transition of the electrochromic device from, for example, a clear state to a tinted state (depicted). The order of layers can be reversed with respect to the substrate.

Electrochromic devices having distinct layers as described can be fabricated as all solid state and/or all inorganic devices with low defectivity. Such devices and methods of fabricating them are described in more detail in U.S. patent application Ser. No. 12/645,111, entitled, "Fabrication of Low-Defectivity Electrochromic Devices," filed on Dec. 22, 2009 and naming Mark Kozlowski et al. as inventors, and in U.S. Pat. No. 8,432,603, entitled, "Electrochromic Devices," filed on Dec. 22, 2009 and naming Zhongchun Wang et al. as inventors, both of which are incorporated by reference herein for all purposes. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

In embodiments described herein, the electrochromic device reversibly cycles between a clear state and a tinted state. In some cases, when the device is in a clear state, a potential is applied to the electrochromic stack 1420 such that available ions in the stack reside primarily in the counter electrode 1410. When the potential on the electrochromic stack is reversed, the ions are transported across the ion conducting layer 1408 to the electrochromic material 1406 and cause the material to transition to the tinted state.

Referring again to FIG. 14, voltage source 1416 may be configured to operate in conjunction with radiant and other environmental sensors. As described herein, voltage source 1416 interfaces with a device controller (not shown in this figure). Additionally, voltage source 1416 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 1402. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick. Of course, electrochromic devices are scalable to substrates smaller or larger than architectural glass. Further, the electrochromic device may be provided on a mirror of any size and shape.

On top of substrate 1402 is conductive layer 1404. In certain embodiments, one or both of the conductive layers 1404 and 1414 is inorganic and/or solid. Conductive layers 1404 and 1414 may be made from a number of different materials, including conductive oxides, thin metallic coatings, conductive metal nitrides, and composite conductors. Typically, conductive layers 1404 and 1414 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used.

The function of the conductive layers is to spread an electric potential provided by voltage source 1416 over surfaces of the electrochromic stack 1420 to interior regions of the stack, with relatively little ohmic potential drop. The electric potential is transferred to the conductive layers though electrical connections to the conductive layers. In some embodiments, bus bars, one in contact with conductive layer 1404 and one in contact with conductive layer 1414, provide the electric connection between the voltage source 1416 and the conductive layers 1404 and 1414. The conductive layers 1404 and 1414 may also be connected to the voltage source 1416 with other conventional means.

Overlaying conductive layer 1404 is electrochromic layer 1406. In some embodiments, electrochromic layer 1406 is inorganic and/or solid. The cathodically coloring electrochromic layer may contain any one or more of a number of different cathodically coloring electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, cathodically coloring electrochromic layer 1406 transfers ions to and receives ions from anodically coloring counter electrode layer 1410 to cause optical transitions.

Generally, the tinting (or change in any optical property—for example, absorbance, reflectance, and transmittance) of the electrochromic material is caused by reversible ion insertion into the material (for example, intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions ($Li^+$) and hydrogen ions ($H^+$) (that is, protons). In some cases, however, other ions will be suitable. In various embodiments, lithium ions are used to produce the electrochromic phenomena. Intercalation of lithium ions into tungsten oxide ($WO_{3-y}$ ($0<y\leq\sim0.3$)) causes the tungsten oxide to change from transparent (clear state) to blue (tinted state).

Referring again to FIG. 14, in electrochromic stack 1420, ion conducting layer 1408 is sandwiched between electrochromic layer 1406 and counter electrode layer 1410. In some embodiments, counter electrode layer 1410 is inorganic and/or solid. The counter electrode layer may comprise one or more of a number of different materials that serve as a reservoir of ions when the electrochromic device is in the clear state. During an electrochromic transition initiated by, for example, application of an appropriate electric potential, the anodically coloring counter electrode layer transfers some or all of the ions it holds to the cathodically coloring electrochromic layer, changing the electrochromic layer to the tinted state. Concurrently, in the case of NiWO, the anodically coloring counter electrode layer tints with the loss of ions.

In some embodiments, suitable anodically coloring materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), Prussian blue. Other suitable anodically coloring materials are further discussed in the following U.S. Patent Applications, each of which is incorporated by reference in its entirety: U.S. Provisional Patent Application No. 61/998, 111, filed May 2, 2014, naming Pradhan, et. al. as inventors, and U.S. Provisional Patent Application No. 61/988,107, filed May 2, 2014, and naming Gillaspie, et. al. as inventors.

When charge is removed from a counter electrode 1410 made of nickel tungsten oxide (that is, ions are transported from the counter electrode 1410 to the electrochromic layer 1406), the counter electrode layer will transition from a transparent state to a tinted state.

In the depicted electrochromic device, between electrochromic layer 1406 and counter electrode layer 1410, there is the ion conducting layer 1408. Ion conducting layer 1408 serves as a medium through which ions are transported (in the manner of an electrolyte) when the electrochromic device transitions between the clear state and the tinted state. Preferably, ion conducting layer 1408 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 1408 is inorganic and/or solid. In other embodiments, the ion conducting layer 1408 is omitted.

Examples of suitable ion conducting layers (for electrochromic devices having a distinct IC layer) include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 1408.

The electrochromic device 1400 may include one or more additional layers (not shown) such as one or more passive layers. Passive layers used to improve certain optical properties may be included in electrochromic device 1400. Passive layers for providing moisture or scratch resistance may also be included in the electrochromic device 1400. For example, the conductive layers may be treated with anti-reflective or protective oxide or nitride layers. Other passive layers may serve to hermetically seal the electrochromic device 1400.

Figure 15:
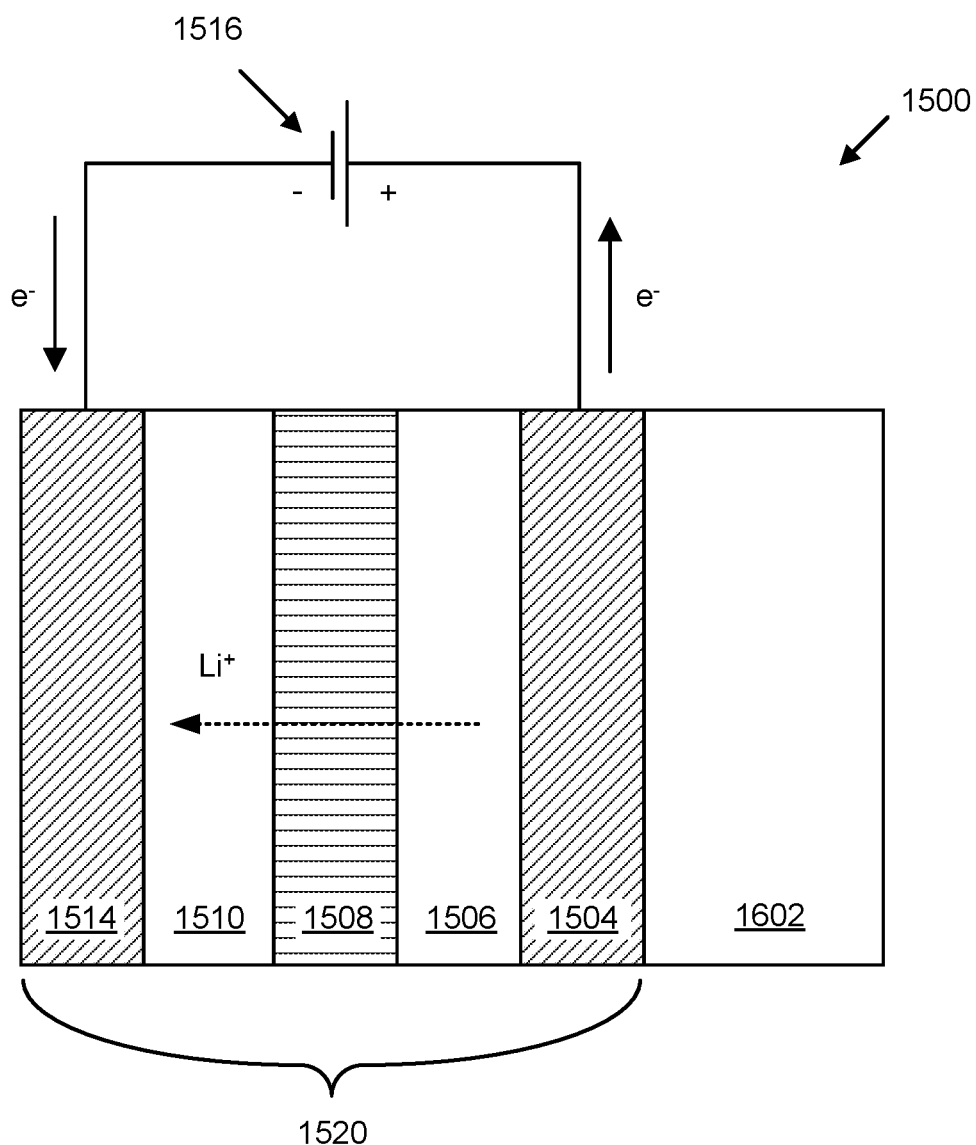
FIG. 15 is a schematic cross-section of an electrochromic device in a clear state (or transitioning to a clear state).

FIG. 15 is a schematic cross-section of an electrochromic device in a clear state (or transitioning to a clear state). In accordance with specific embodiments, an electrochromic device 1500 includes a tungsten oxide cathodically coloring electrochromic layer (EC) 1506 and a nickel-tungsten oxide anodically coloring counter electrode layer (CE) 1510. The electrochromic device 1500 also includes a substrate 1502, conductive layer (CL) 1504, ion conducting layer (IC) 1508, and conductive layer (CL) 1514.

A power source 1516 is configured to apply a potential and/or current to electrochromic stack 1520 through suitable connections (for example, bus bars) to conductive layers 1504 and 1514. In some embodiments, the voltage source is configured to apply a potential of about 2 V in order to drive a transition of the device from one optical state to another. The polarity of the potential as shown in FIG. 15 is such that the ions (lithium ions in this example) primarily reside (as indicated by the dashed arrow) in nickel-tungsten oxide anodically coloring counter electrode layer 1510.

Figure 16:
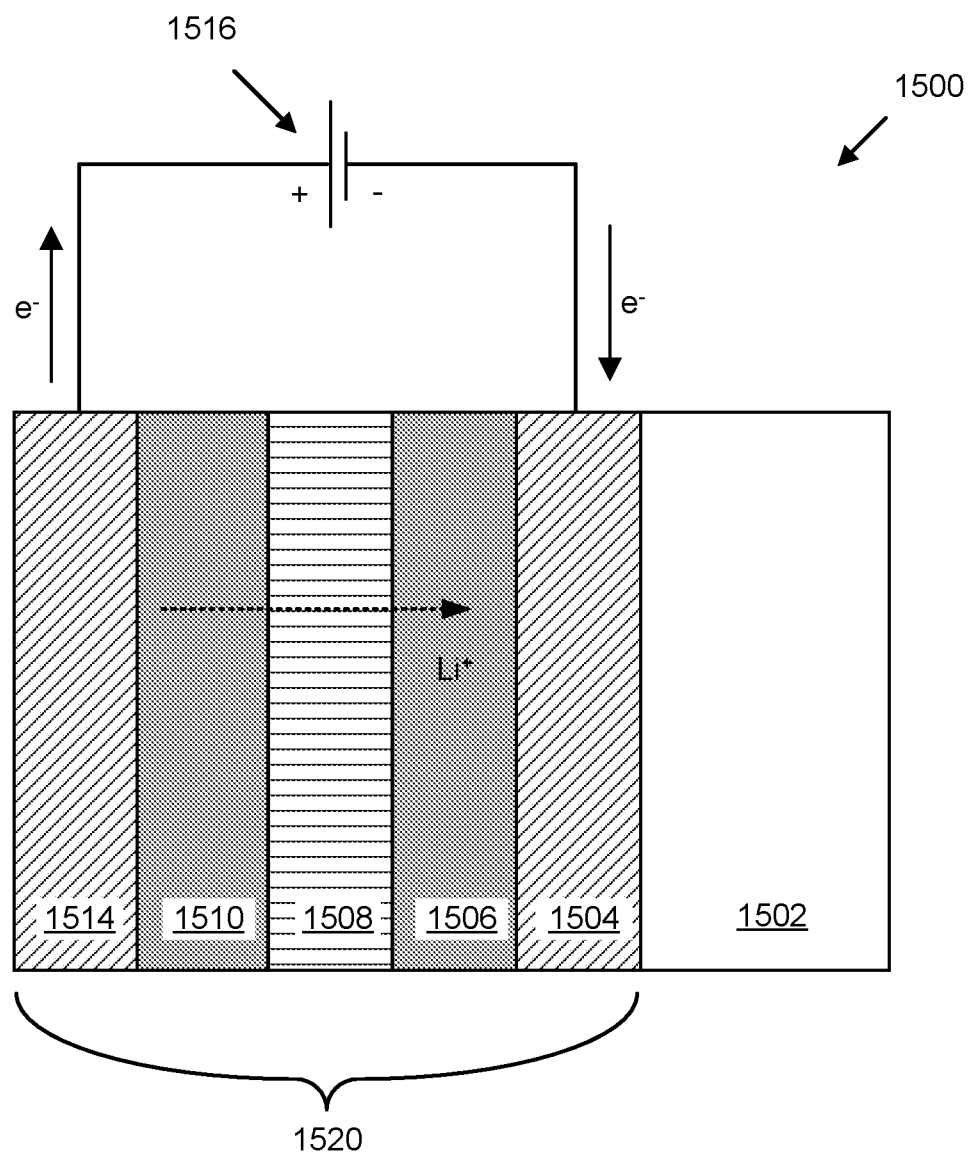
FIG. 16 is a schematic cross-section of an electrochromic device in a tinted state (or transitioning to a tinted state).
Figure 17:
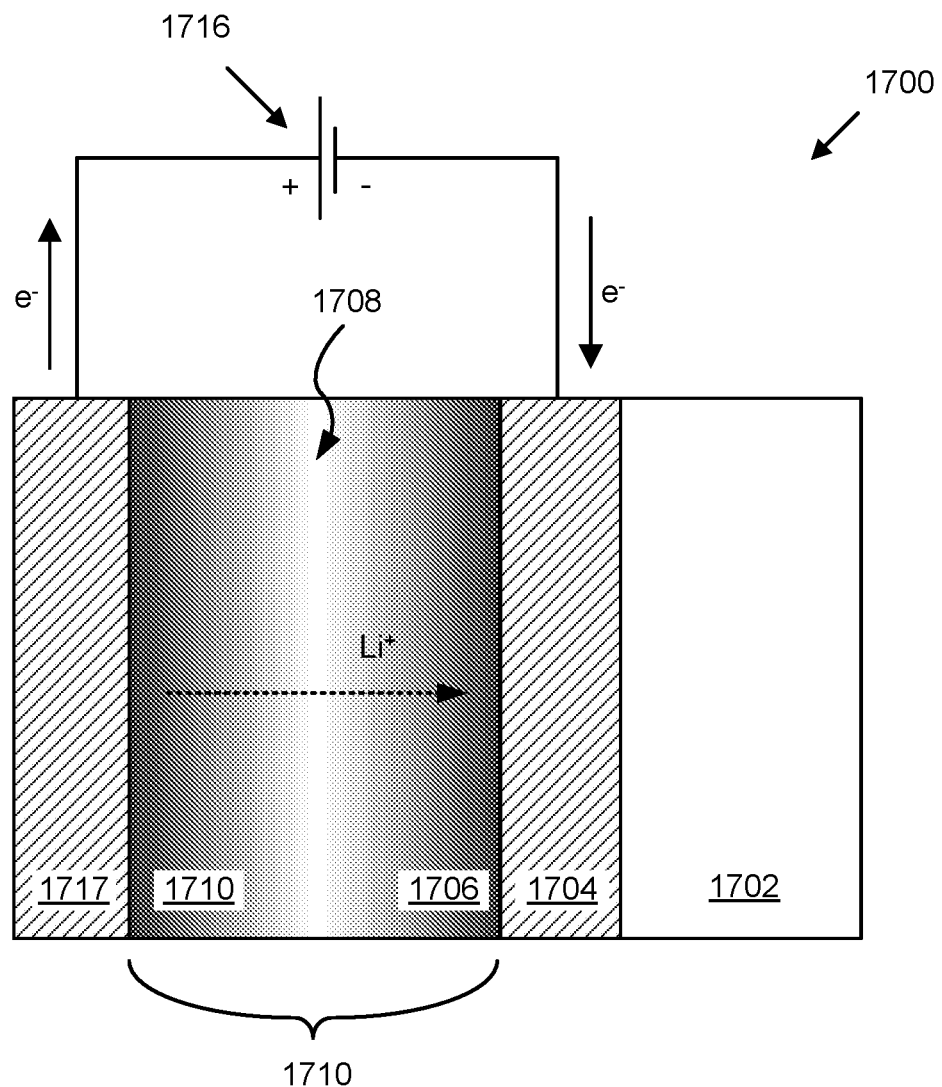
FIG. 17 is a schematic cross-section of an electrochromic device in a tinted state, where the device has an interfacial region that does not contain a distinct ion conductor layer.

FIG. 16 is a schematic cross-section of electrochromic device 1500 shown in FIG. 15 but in a tinted state (or transitioning to a tinted state). In FIG. 17, the polarity of voltage source 1516 is reversed, so that the electrochromic layer is made more negative to accept additional lithium ions, and thereby transition to the tinted state. As indicated by the dashed arrow, lithium ions are transported across the ion conducting layer 1508 to the tungsten oxide electrochromic layer 1506. The tungsten oxide electrochromic layer 1506 is shown in the tinted state. The nickel-tungsten oxide counter electrode 1510 is also shown in the tinted state. As explained, nickel-tungsten oxide becomes progressively more opaque as it gives up (deintercalates) lithium ions. In this example, there is a synergistic effect where the transition to tinted states for both layers 1506 and 1510 are additive toward reducing the amount of light transmitted through the stack and substrate.

As described above, an electrochromic device may include a cathodically coloring layer, often referred to as an electrochromic (EC) electrode layer (or more simply as an electrochromic layer) and an anodically coloring counter electrode layer, often referred to as a counter electrode (CE) layer, separated by an ionically conductive (IC) layer that is highly conductive to ions and highly resistive to electrons. As conventionally understood, the ionically conductive layer prevents shorting between the electrochromic layer and the counter electrode layer. The ionically conductive layer allows the electrochromic and counter electrodes to hold a charge and thereby maintain their clear or tinted states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed with controllers described herein. Such devices, and methods of fabricating them, are described in U.S. Pat. Nos. 8,300,298, 8,582,193, 8,764,950, 8,764,951, each of the four patents is entitled "Electrochromic Devices," each names Zhongchun Wang et al. as inventors, and each is incorporated by reference herein in its entirety.

FIG. 17 is a schematic cross-section of an electrochromic device 1700 in a tinted state, where the device has an interfacial region, 1708, which does not contain a distinct IC layer. Voltage source 1716, conductive layers 1714 and 1704, and substrate 1702 are essentially the same as described in relation to FIGS. 14 and 15. Between conductive layers 1714 and 1704 is a region 1710, which includes anodically coloring counter electrode layer 1710, cathodically coloring electrochromic layer 1706 and an interfacial region, 1708, between them, rather than a distinct IC layer. In this example, there is no distinct boundary between counter electrode layer 1710 and interfacial region 1708, nor is there a distinct boundary between electrochromic layer 1706 and interfacial region 1708. Rather, there is a diffuse transition between CE layer 1710 and interfacial region 1708, and between interfacial region 1708 and EC layer 1706.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A controller comprising a microprocessor, the controller configured to maintain substantially matching tint levels or tint rates in a plurality of electrochromic (EC) windows by:
    (a) probing the plurality of EC windows to determine an electrical response for each window, each electrical response having a magnitude;
    (b) analyzing the magnitude of the determined electrical responses for the plurality of EC windows; and
    (c) based on the magnitudes of the determined electrical responses, scaling a voltage or current applied to one or more of the plurality of EC windows to thereby match the tint levels or tint rates in each of the plurality of EC windows.

2. The controller of claim 1, wherein two or more of the plurality of EC window are included in a folding curtain wall.

3. The controller of claim 2, wherein adjacent ones of the plurality of EC windows are coupled by ribbon connectors.

4. A controller comprising a microprocessor, the controller configured to transition a plurality of electrochromic (EC) windows at substantially matching tint rates by:
    (a) determining a transition time over which the plurality of EC windows are to be transitioned from a starting optical state to an ending optical state, wherein the transition time is based, at least in part, on a minimum time over which a slowest transitioning window in the plurality of EC windows transitions from the starting optical state to the ending optical state; and
    (b) applying one or more drive conditions to each of the windows in the plurality of EC windows, wherein the one or more drive conditions applied to each window are sufficient to cause each window to transition from the starting optical state to the ending optical state within the transition time.

5. The controller of claim 4, wherein the controller, while applying the one or more drive conditions, is configured to:
    probe the plurality of EC windows to determine an electrical response for each window,
    measure the electrical response for each window,
    determine whether the electrical response for each window indicates that the window will reach the ending optical state within the transition time, and
    if it is determined that the window will reach the ending optical state within the transition time, continue to apply the driving conditions to reach the ending optical state, and
    if it is determined that the window will not reach the ending optical state within the transition time, increase a voltage and/or current applied to the window to thereby cause the window to reach the ending optical state within the transition time.

6. The controller of claim 5, wherein:
    if it is determined that the window will reach the ending optical state substantially before the transition time, the controller is configured to decrease a drive voltage and/or current applied to the window to thereby cause the window to reach the ending optical state at a time closer to the transition time than would otherwise occur without decreasing the drive voltage and/or current.

7. The controller of claim 4, wherein the transition time is based, at least in part, on a size of a largest window in the plurality of EC windows.

8. The controller of claim 7, the controller further configured to define the plurality of EC windows to be transitioned based on one or more criteria selected from the group consisting of: pre-defined zones of windows, instantaneously-defined zones of windows, window properties, and user preferences.

9. The controller of claim 8, the controller further configured to define the plurality of EC windows to be transitioned by determining a first plurality of EC windows and determining a second plurality of EC windows,
    wherein the transition time determined in (a) is a first transition time over which the first plurality of EC windows are to be transitioned, and wherein the transition time in (b) is the first transition time, the controller further configured to:
    (c) after beginning to apply the one or more drive conditions in (b) and before the first plurality of EC windows reaches the ending optical state, determine a second transition time over which the second plurality of EC windows are to be transitioned to a third optical state, wherein the third optical state may be the starting optical state, the ending optical state, or a different optical state, wherein the second transition time is based, at least in part, on a minimum time over which a slowest transitioning window in the second plurality of EC windows transitions to the third optical state, and
    (d) apply one or more drive conditions to each of the windows in the second plurality of EC windows, wherein the one or more drive conditions applied to each window are sufficient to cause each window to transition to the third optical state substantially within the second transition time.

10. The controller of claim 4, wherein each window in the plurality of EC windows comprises a memory component comprising a specified transition time for that window, and wherein (a) comprises comparing the specified transition time for each window in the plurality of EC windows to thereby determine which window is the slowest transitioning window in the plurality of EC windows.

11. The controller of claim 4, wherein two or more of the plurality of EC window are included in a folding curtain wall.

12. The controller of claim 11, wherein adjacent ones of the plurality of EC windows are coupled by ribbon connectors.

* * * * *